US012032324B2

(12) United States Patent
Morihara et al.

(10) Patent No.: US 12,032,324 B2
(45) Date of Patent: Jul. 9, 2024

(54) IMAGE FORMING APPARATUS HAVING TONER REPLENISHMENT CONTAINER CONTROL

(71) Applicant: CANON KABUSHIKI KAISHA, Tokyo (JP)

(72) Inventors: Ryo Morihara, Tokyo (JP); Kensuke Umeda, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/102,124

(22) Filed: Jan. 27, 2023

(65) Prior Publication Data

US 2023/0168623 A1 Jun. 1, 2023

Related U.S. Application Data

(63) Continuation of application No. 17/580,704, filed on Jan. 21, 2022, now Pat. No. 11,592,781, which is a (Continued)

(30) Foreign Application Priority Data

Oct. 7, 2019 (JP) ................................ 2019-184767

(51) Int. Cl.
*G03G 15/00* (2006.01)
*G03G 15/08* (2006.01)

(Continued)

(52) U.S. Cl.
CPC ......... *G03G 21/12* (2013.01); *G03G 15/0863* (2013.01); *G03G 15/0886* (2013.01);

(Continued)

(58) Field of Classification Search
CPC .......... G03G 15/0856; G03G 15/0863; G03G 15/0865; G03G 15/0877; G03G 15/0886;

(Continued)

(56) References Cited

U.S. PATENT DOCUMENTS

| | | | |
|---|---|---|---|
| 5,918,094 | A | 6/1999 | Masuda et al. |
| 7,440,705 | B2 | 10/2008 | Hatakeyama |

(Continued)

FOREIGN PATENT DOCUMENTS

| | | | |
|---|---|---|---|
| CN | 101813903 | A | 8/2010 |
| CN | 102236295 | A | 11/2011 |

(Continued)

OTHER PUBLICATIONS

Chinese Office Action dated Sep. 29, 2023, in related Chinese Patent Application No. 202011067689.1.

(Continued)

*Primary Examiner* — Sophia S Chen
(74) *Attorney, Agent, or Firm* — VENABLE LLP

(57) ABSTRACT

An image forming apparatus to and from which a replenishment container accommodating toner is detachable and which forms an image on a recording material includes an apparatus body, and a cartridge including an image bearing member, a developer container to accommodate toner, and a developing portion to develop an electrostatic latent image formed on the image bearing member into a toner image by using the toner. A replenishment port allows replenishment of toner from the replenishment container, which is arranged outside of the image forming apparatus, to the developer container therethrough in a state where the replenishment container is attached to the replenishment port, and a controller notifies a user of information related to a toner amount if it is determined that a lifetime of the cartridge will expire before a sum of toner accommodated in the developer container and toner accommodated in the replenishment container is consumed.

11 Claims, 25 Drawing Sheets

Related U.S. Application Data continuation of application No. 17/037,803, filed on Sep. 30, 2020, now Pat. No. 11,262,686.

(51) Int. Cl.
*G03G 21/12* (2006.01)
*G03G 21/16* (2006.01)

(52) U.S. Cl.
CPC ....... *G03G 15/556* (2013.01); *G03G 21/1633* (2013.01); *G03G 21/1647* (2013.01)

(58) Field of Classification Search
CPC .... G03G 15/553; G03G 15/556; G03G 21/12; G03G 21/1633; G03G 21/1647; G03G 21/1676
See application file for complete search history.

(56) References Cited

U.S. PATENT DOCUMENTS

| | | | | |
|---|---|---|---|---|
| 7,978,989 | B2 | 7/2011 | Nagano et al. | |
| 8,649,693 | B2 | 2/2014 | Mitsui | |
| 8,666,266 | B2 | 3/2014 | Ajima | |
| 11,209,762 | B2 | 12/2021 | Lim et al. | |
| 11,592,781 | B2 * | 2/2023 | Morihara | G03G 21/12 |
| 2015/0063874 | A1 | 3/2015 | So et al. | |
| 2018/0284681 | A1 | 10/2018 | Yabuki | |
| 2018/0307172 | A1 | 10/2018 | Ohshika | |
| 2020/0292960 | A1 | 9/2020 | Suzuki et al. | |
| 2020/0292966 | A1 | 9/2020 | Umeda et al. | |
| 2021/0103235 | A1 | 4/2021 | Oshima et al. | |
| 2021/0103242 | A1 | 4/2021 | Umeda et al. | |

FOREIGN PATENT DOCUMENTS

| | | | |
|---|---|---|---|
| CN | 102736462 | A | 10/2012 |
| CN | 103207548 | A | 7/2013 |
| JP | H08-30084 | A | 2/1996 |
| JP | H09-190068 | A | 7/1997 |
| JP | H11-231631 | A | 8/1999 |
| JP | 2006-267528 | A | 10/2006 |
| JP | 2011-186176 | A | 9/2011 |
| JP | 2016-184027 | A | 10/2016 |

OTHER PUBLICATIONS

Japanese Office Action dated Aug. 29, 2023, in related Japanese Patent Application No. 2019-184767.

* cited by examiner

IMAGE FORMING APPARATUS HAVING TONER REPLENISHMENT CONTAINER CONTROL

BACKGROUND OF THE INVENTION

Field of the Invention

The present invention relates to an image forming apparatus that forms an image on a recording material.

Description of the Related Art

Typically, an image forming apparatus of an electrophotographic system forms an image on a recording material by developing an electrostatic latent image formed on the surface of a photosensitive member into a toner image by using toner, and then transferring the toner image from the photosensitive member onto the recording material. As methods for replenishing an image forming apparatus with toner consumed by repetitively performing image formation, a process cartridge system and a consecutive replenishment system are known. The process cartridge system is a system in which a photosensitive member and a developer container accommodating toner are integrated as a process cartridge, and the process cartridge is replaced by a brand-new one when all toner in the developer container is consumed.

Meanwhile, Japanese Patent Laid-Open No. H08-30084 discloses a developing unit of a consecutive replenishment system that includes a toner conveyance path through which toner is supplied to a developing roller, and a developer supply box connected to the toner conveyance path, and that supplies toner from the developer supply box to the toner conveyance path in accordance with a detection result of a toner remainder amount.

In recent years, demand from users for a wider variety of use of the image forming apparatus has been increasing in addition to the process cartridge system and the consecutive replenishment system described above.

SUMMARY OF THE INVENTION

According to a first aspect of the present invention, an image forming apparatus to and from which a replenishment container accommodating toner is attachable and detachable and which is configured to form an image on a recording material, the image forming apparatus including an apparatus body, a cartridge attachable to and detachable from the apparatus body, the cartridge comprising an image bearing member, a developer container configured to accommodate toner, a developing portion configured to develop an electrostatic latent image formed on the image bearing member into a toner image by using the toner accommodated in the developer container, and a replenishment port configured to allow replenishment of toner from the replenishment container, which is arranged outside of the image forming apparatus, to the developer container therethrough in a state where the replenishment container is attached to the replenishment port, a replenishment restriction portion configured to switch between a restricting state in which toner replenishment through the replenishment port is restricted and an allowing state in which toner replenishment through the replenishment port is allowed, a toner remainder amount detection portion whose output value changes on a basis of an amount of toner accommodated in the developer container, and a controller configured to, when the replenishment container is attached to the replenishment port, maintain the replenishment restriction portion in the restricting state in a case where a second printable sheet number is larger than a first printable sheet number, the first printable sheet number being obtained from a lifetime of the cartridge, the second printable sheet number being obtained from a sum of the amount of toner accommodated in the developer container and an amount of toner accommodated in the replenishment container.

According to a second aspect of the present invention, an image forming apparatus to and from which a replenishment container accommodating toner is attachable and detachable and which is configured to form an image on a recording material, the image forming apparatus including an apparatus body, a cartridge attachable to and detachable from the apparatus body, the cartridge comprising an image bearing member, a developer container configured to accommodate toner, a developing portion configured to develop an electrostatic latent image formed on the image bearing member into a toner image by using the toner accommodated in the developer container, and a replenishment port configured to allow replenishment of toner from the replenishment container, which is arranged outside of the image forming apparatus, to the developer container therethrough in a state where the replenishment container is attached to the replenishment port, a toner remainder amount detection portion whose output value changes on a basis of an amount of toner accommodated in the developer container, a display portion, and a controller configured to, when the replenishment container is attached to the replenishment port, display a warning prompting replacement of the cartridge on the display portion on a basis of the output value of the toner remainder amount detection portion.

According to a third aspect of the present invention, an image forming apparatus to and from which a replenishment container accommodating toner is attachable and detachable and which is configured to communicate with an information processing apparatus comprising a display portion and form a toner image on a recording material, the image forming apparatus including an apparatus body, a cartridge attachable to and detachable from the apparatus body, the cartridge comprising an image bearing member, a developer container configured to accommodate toner, a developing portion configured to develop an electrostatic latent image formed on the image bearing member into a toner image by using the toner accommodated in the developer container, and a replenishment port configured to allow replenishment of toner from the replenishment container, which is arranged outside of the image forming apparatus, to the developer container therethrough in a state where the replenishment container is attached to the replenishment port, a toner remainder amount detection portion whose output value changes on a basis of an amount of toner accommodated in the developer container, and a controller configured to, when the replenishment container is attached to the replenishment port, display a warning prompting replacement of the cartridge on the display portion on a basis of the output value of the toner remainder amount detection portion.

Further features of the present invention will become apparent from the following description of exemplary embodiments with reference to the attached drawings.

DESCRIPTION OF THE EMBODIMENTS

Exemplary embodiments of the present invention will be described below with reference to drawings.

First Embodiment (1) Image Forming Apparatus

Figure 1A:
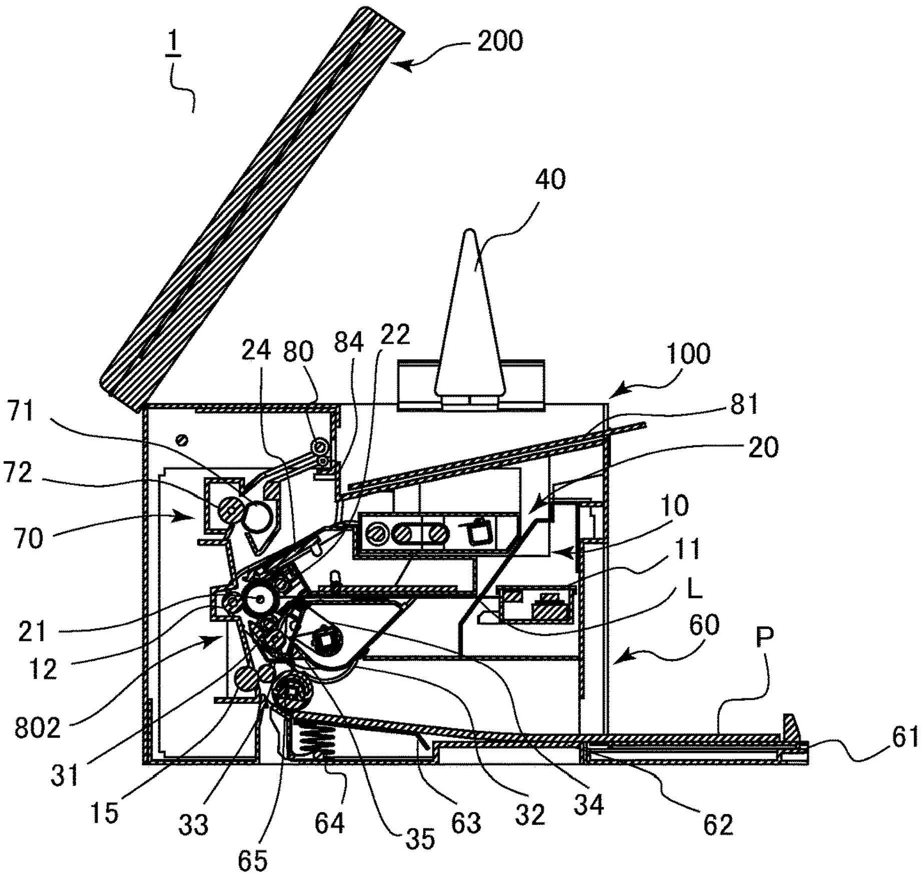
FIG. 1A is a section view of an image forming apparatus according to a first embodiment.

FIG. 1A is a schematic diagram illustrating a configuration of an image forming apparatus 1 according to a first embodiment. The image forming apparatus 1 is a monochromatic printer that forms an image on a recording material on the basis of image information input from an external device. Examples of the recording material include sheet materials of different natures. Examples of the sheet materials include paper sheets such as regular paper sheets and cardboards, plastic films such as sheets for overhead projectors, sheets having irregular shapes such as envelops and index sheets, and cloths.

(1-1) Overall Configuration

Figure 1B:
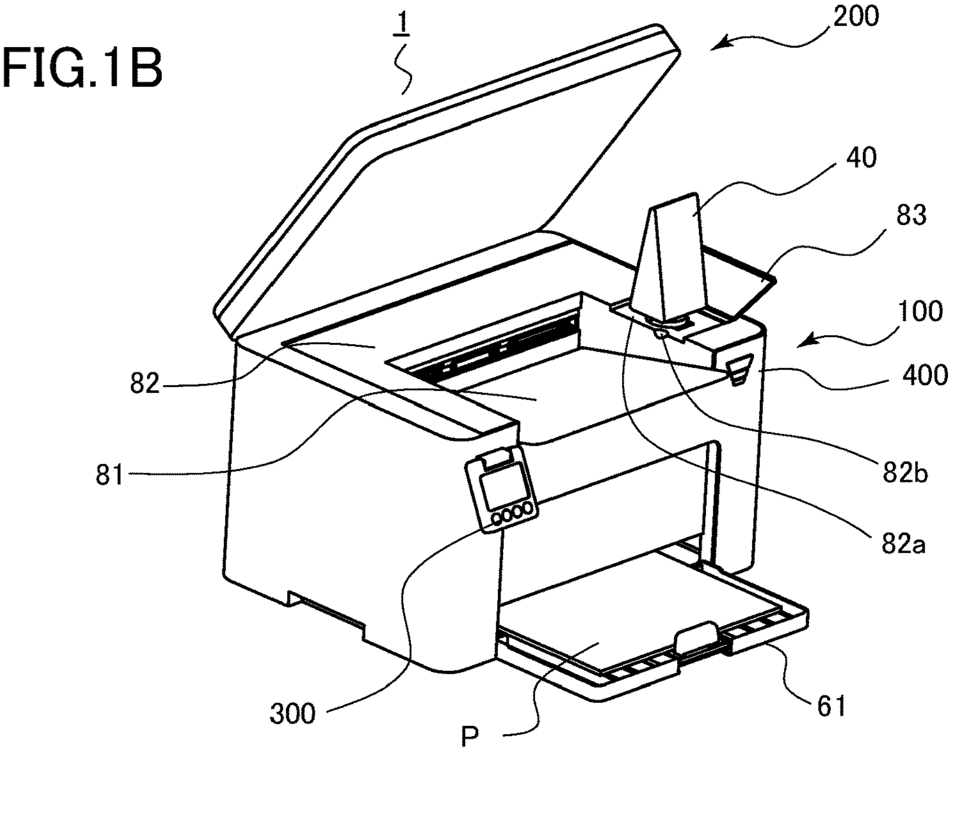
FIG. 1B is a perspective view of the image forming apparatus according to the first embodiment.

As illustrated in FIGS. 1A and 1B, the image forming apparatus 1 includes a printer body 100 serving as an apparatus body, a reading apparatus 200 openably and closably supported on the printer body 100, and an operation portion 300 attached to an exterior surface of the printer body 100. The printer body 100 includes an image forming portion 10, a feeding portion 60, a fixing portion 70, and a discharge roller pair 80. The feeding portion 60 feeds a recording material to the image forming portion 10, and the image forming portion 10 forms a toner image on the recording material. The fixing portion 70 fixes the toner image formed by the image forming portion 10 onto the recording material, and the discharge roller pair 80 discharges the recording material having passed through the fixing portion 70 to the outside of the apparatus. In addition, a direct replenishment system in which toner is directly replenished from the outside of the image forming apparatus 1 by using a toner pack 40 filled with toner for replenishment is employed for a process cartridge 20 of the present embodiment.

The image forming portion 10 is an image forming portion of an electrophotographic system including a scanner unit 11, the process cartridge 20, and a transfer roller 12. The process cartridge 20 includes a photosensitive drum 21, a charging roller 22 disposed in the vicinity of the photosensitive drum 21, a developing roller 31, and a cleaning blade 24.

The photosensitive drum 21 serving as an image bearing member of the present embodiment is a photosensitive member formed in a cylindrical shape. The photosensitive drum 21 of the present embodiment includes a drum-shaped base body formed from aluminum, and a photosensitive layer formed from a negatively-chargeable organic photoconductor on the base body. In addition, the photosensitive drum 21 is rotationally driven by a motor at a predetermined process speed in a predetermined direction, which is a clockwise direction in FIG. 1A.

The charging roller 22 comes into contact with the photosensitive drum 21 at a predetermined pressure contact force, and thus forms a charging portion. In addition, a desired charging voltage is applied to the charging roller 22 from a charging high-voltage power source, and thus the charging roller 22 uniformly charges the surface of the photosensitive drum 21 to a predetermined potential. In the present embodiment, the photosensitive drum 21 is negatively charged by the charging roller 22.

The scanner unit 11 radiates laser light L corresponding to image information input from an external device or the reading apparatus 200 onto the photosensitive drum 21 by using a polygonal mirror, and thus exposes the surface of the photosensitive drum 21 in a scanning manner. As a result of this exposure, an electrostatic latent image corresponding to the image information is formed on the surface of the photosensitive drum 21. To be noted, the scanner unit 11 is not limited to a laser scanner unit. For example, a light-emitting diode: LED exposing unit including an LED array in which a plurality of LEDs are arranged along the longitudinal direction of the photosensitive drum 21 may be employed.

A developing unit 802 includes a developing roller 31 serving as a developer bearing member configured to bear a developer, a developer container 32 serving as a frame member of the developing unit 802, and a supply roller 33 capable of supplying the developer to the developing roller 31. The developing roller 31 and the supply roller 33 are rotatably supported by the developer container 32. In addition, the developing roller 31 is disposed in an opening portion of the developer container 32 so as to oppose the photosensitive drum 21. The supply roller 33 is rotatably in contact with the developing roller 31, and toner serving as the developer accommodated in the developer container 32 is applied on the surface of the developing roller 31 by the supply roller 33. The developer container is also called a developer storage container.

The developing unit 802 of the present embodiment employs a contact developing system as a developing system. That is, a toner layer born on the developing roller 31 serving as a developing portion comes into contact with the photosensitive drum 21 in a developing portion serving as a developing region where the photosensitive drum 21 and the developing roller 31 oppose each other. A developing voltage is applied to the developing roller 31 from a developing high-voltage power source. Under the influence of the developing voltage, the toner born on the developing roller 31 transfers from the developing roller 31 onto the surface of the photosensitive drum 21 in accordance with the potential distribution of the surface of the photosensitive drum 21, and thus the electrostatic latent image is developed into a toner image. To be noted, in the present embodiment, a reversal development system is employed. That is, the toner image is formed by the toner attaching to a region where the amount of charge is reduced by being exposed in an exposing step on the surface of the photosensitive drum 21 charged in a charging step.

In addition, in the present embodiment, toner which has a particle diameter of 6 μm and whose normal charging polarity is a negative polarity is used. For example, a polymer toner generated by a polymerization method is employed as the toner of the present embodiment. In addition, the toner of the present embodiment is a so-called nonmagnetic one-component developer that does not contain a magnetic component, and is born on the developing roller 31 mainly by an intermolecular force and an electrostatic force, that is, an image force. However, a one-component developer containing a magnetic component may be used. In addition, in some cases, the one-component developer contains additives for adjusting the fluidity and charging performance of the toner in addition to the toner particles. Examples of the additives include wax and silica fine particles. In addition, a two-component developer constituted by a nonmagnetic toner and a magnetic carrier may be used as the developer. In the case of using a magnetic developer, a cylindrical developing sleeve in which a magnet is disposed is used as the developer bearing member. That is, the developer contained in the developer container 32 is not limited to a one-component developer containing only a toner component, and may be a two-component developer containing toner and carrier.

An agitation member 34 serving as an agitation portion is provided inside the developer container 32. The agitation member 34 is driven to pivot, and thus agitates the toner in the developer container 32 and conveys the toner toward the developing roller 31 and the supply roller 33. In addition, the agitation member 34 has a function of circulating toner not used for development and peeled off from the developing roller 31 in the developer container 32, and thus making the toner in the developer container 32 uniform.

In addition, a developing blade 35 that regulates the amount of toner born on the developing roller 31 is disposed at an opening portion of the developer container 32 where the developing roller 31 is disposed. In accordance with the rotation of the developing roller 31, the toner supplied to the surface of the developing roller 31 passes through a portion where the developing roller 31 and the developing blade 35 oppose each other, thus forms a uniform thin layer, and is negatively charged as a result of frictional charging.

The feeding portion 60 includes a front door 61 supported to be openable and closable with respect to the printer body 100, a supporting tray 62, an inner plate 63, a tray spring 64, and a pickup roller 65. The supporting tray 62 constitutes a bottom surface of a recording material accommodating space exposed by opening the front door 61, and the inner plate 63 is supported on the supporting tray 62 so as to be capable of ascending and descending. The tray spring 64 urges the inner plate 63 upward, and presses a recording material P supported on the inner plate 63 against the pickup roller 65. To be noted, the front door 61 closes the recording material accommodating space in the state of being closed with respect to the printer body 100, and supports the recording material P together with the supporting tray 62 and the inner plate 63 in the state of being open with respect to the printer body 100.

The transfer roller 12 serving as a transfer portion transfers the toner image formed on the photosensitive drum 21 of the process cartridge 20 onto the recording material. To be noted, although a direct transfer system in which the toner image formed on the image bearing member is directly transferred from the image bearing member onto the recording material will be described in the present embodiment, an intermediate transfer system in which the toner image is transferred from the image bearing member via an intermediate transfer member such as an intermediate transfer belt may be employed. In that case, for example, a transfer unit constituted by an intermediate transfer belt, a primary transfer roller that transfers the toner image from the photosensitive drum onto the intermediate transfer belt through primary transfer, and a secondary transfer roller that transfers the toner image from the intermediate transfer belt onto the recording material functions as a transfer portion.

The fixing portion 70 is a thermal fixation system that performs an image fixing process by heating and melting the toner on the recording material. The fixing portion 70 includes a fixing film 71, a fixing heater such as a ceramic heater that heats the fixing film 71, a thermistor that measures the temperature of the fixing heater, and a pressurizing roller 72 that comes into pressure contact with the fixing film 71.

Next, an image forming operation of the image forming apparatus 1 will be described. When a command for image formation is input to the image forming apparatus 1, an image forming process by the image forming portion 10 is started on the basis of image information input from an external computer connected to the image forming apparatus 1 or image information input from the reading apparatus 200. The scanner unit 11 radiates laser light L toward the photosensitive drum 21 on the basis of the input image information. At this time, the photosensitive drum 21 has been charged by the charging roller 22 in advance, and an electrostatic latent image is formed on the photosensitive drum 21 by being irradiated with the laser light L. Then, this electrostatic latent image is developed by the developing roller 31, and a toner image is formed on the photosensitive drum 21.

In parallel with the image forming process described above, the pickup roller 65 of the feeding portion 60 delivers out the recording material P supported on the front door 61, the supporting tray 62, and the inner plate 63. The recording material P is fed to the registration roller pair 15 by the pickup roller 65, and the skew thereof is corrected by abutting a nip of the registration roller pair 15. In addition, the registration roller pair 15 is driven in accordance with a transfer timing of the toner image obtained from the start time of exposure performed by the scanner unit 11, and conveys the recording material P to a transfer portion that is a nip portion formed between the transfer roller 12 and the photosensitive drum 21.

A transfer voltage is applied to the transfer roller 12 from the transfer high-voltage power source, and the toner image born on the photosensitive drum 21 is transferred onto the recording material P conveyed by the registration roller pair 15. After the transfer, transfer residual toner on the surface of the photosensitive drum 21 is removed by the cleaning blade 24, which is an elastic blade in contact with the photosensitive drum 21. The recording material P onto which the toner image has been transferred is conveyed to the fixing portion 70 and passes through a nip portion formed between the fixing film 71 and the pressurizing roller 72 of the fixing portion 70, and thus the toner image is heated and pressurized. As a result of this, the toner particles melt and then adhere to the recording material P. Thus, the toner image is fixed to the recording material P. The recording material P having passed through the fixing portion 70 is discharged to the outside of the image forming apparatus 1 by a discharge roller pair 80, and is supported on a discharge tray 81 formed on an upper portion of the printer body 100.

The discharge tray 81 is inclined upward toward the downstream side in a discharge direction of the recording material, and trailing ends of recording materials discharged onto the discharge tray 81 are aligned by a regulating surface 84 by sliding down the discharge tray 81.

(1-2) Openable and Closable Part of Image Forming Apparatus

Figure 2A:
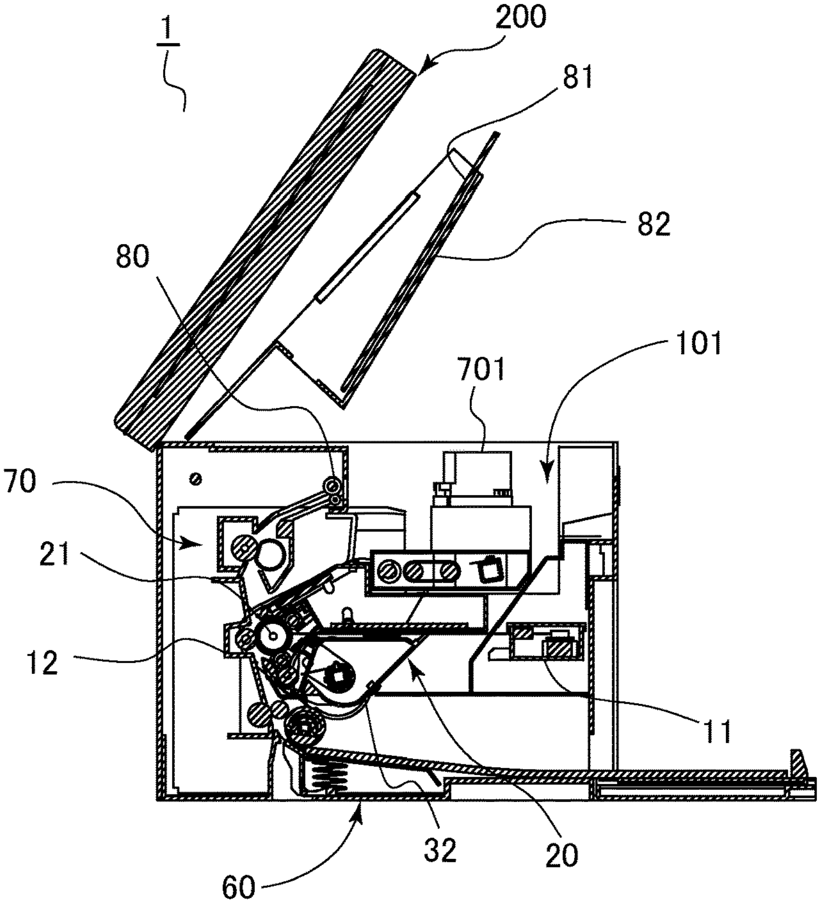
FIG. 2A is a section view of the image forming apparatus according to the first embodiment.
Figure 2B:
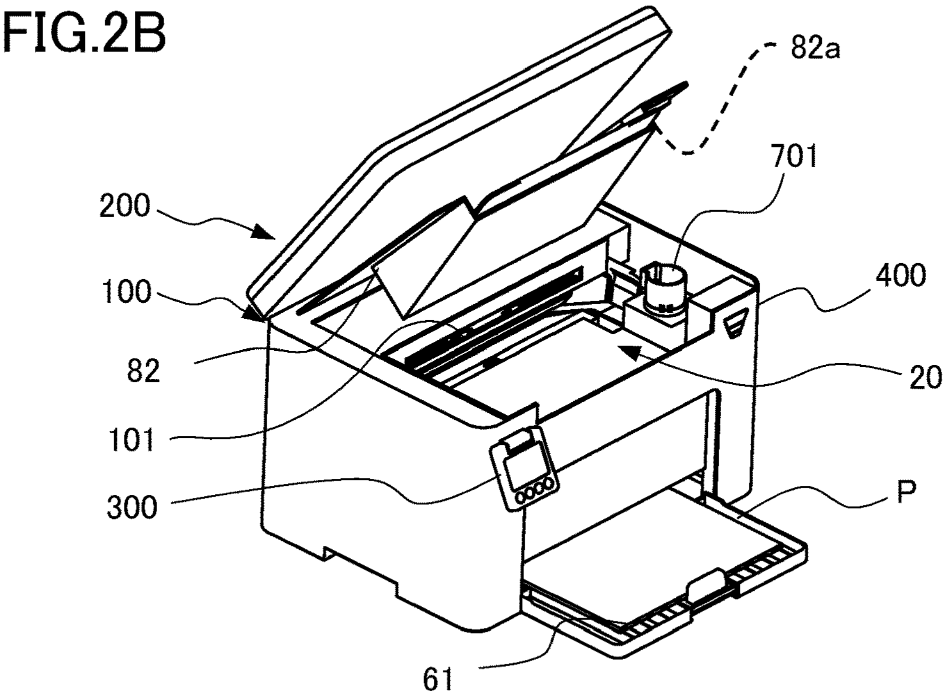
FIG. 2B is a perspective view of the image forming apparatus according to the first embodiment.
Figure 3:
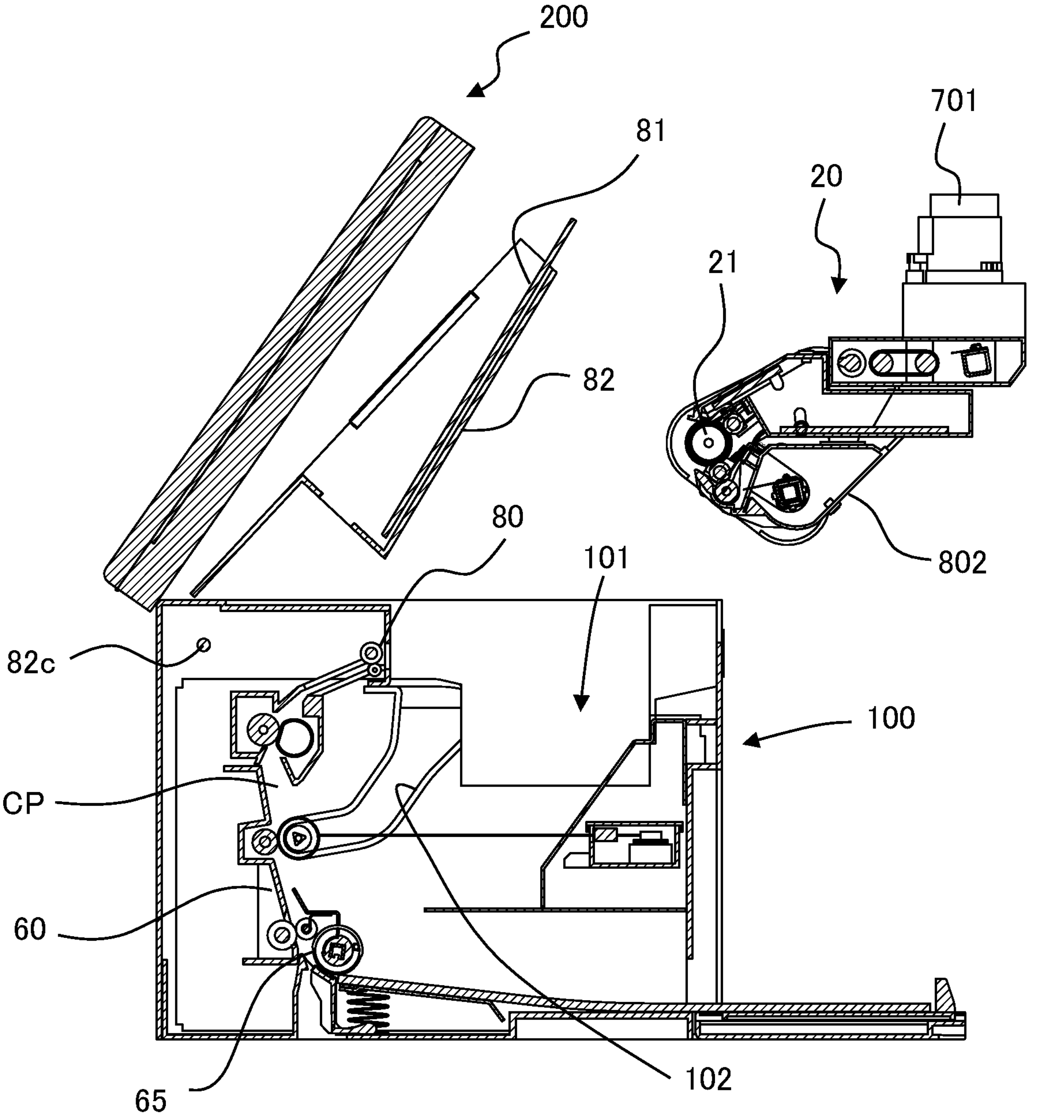
FIG. 3 is a diagram for describing attachment and detachment of a process cartridge according to the first embodiment.

As illustrated in FIGS. 2A, 2B, and 3, a first opening portion 101 opening upward is provided in an upper portion of the printer body 100. The first opening portion 101 is covered by a top cover 82 during use as illustrated in FIG. 1B, and the process cartridge 20 is exposed by opening the top cover 82 upward as illustrated in FIG. 2B. The top cover 82 is supported so as to be openable and closable with respect to the printer body 100 by rotating around a rotation shaft 82*c* illustrated in FIG. 3 extending in the left-right direction, and the discharge tray 81 is provided on the upper surface thereof. The top cover 82 is opened from the front side toward the rear side when the reading apparatus 200 is opened with respect to the printer body 100. To be noted, the reading apparatus 200 and the top cover 82 are configured to be held in a state of being open and a state of being closed, by a holding mechanism such as a hinge mechanism.

For example, the user opens the top cover 82 together with the reading apparatus 200 in the case where jam of the recording material has occurred in a conveyance path CP which the recording material fed by the pickup roller 65 passes through. Then, the user accesses the process cartridge 20 through the first opening portion 101 exposed by opening the top cover 82, and pulls out the process cartridge 20 along a cartridge guide 102. A projection portion 21*a* provided on an end portion of the process cartridge 20 in the axial direction of the photosensitive drum 21 illustrated in FIG. 5A slides on the cartridge guide 102, and thus the process cartridge 20 is guided by the cartridge guide 102.

Then, as a result of the process cartridge 20 being pulled out to the outside through the first opening portion 101, a space through which a hand can reach the inside of the conveyance path CP is generated. The user can put their hand in the printer body 100 through the first opening portion 101 to access the recording material causing the jam in the conveyance path CP, and thus remove the recording material causing the jam.

Figure 4A:
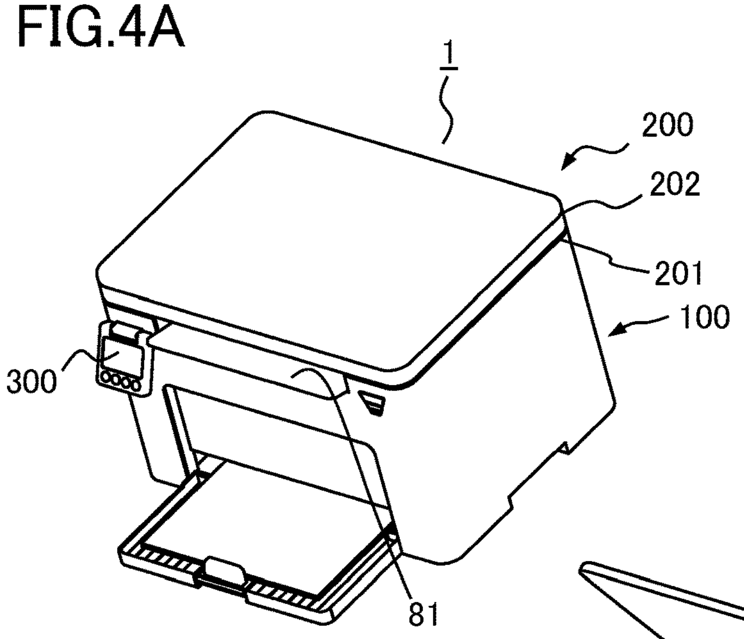
FIG. 4A is a diagram for describing an openable and closable member of the image forming apparatus according to the first embodiment.
Figure 4B:
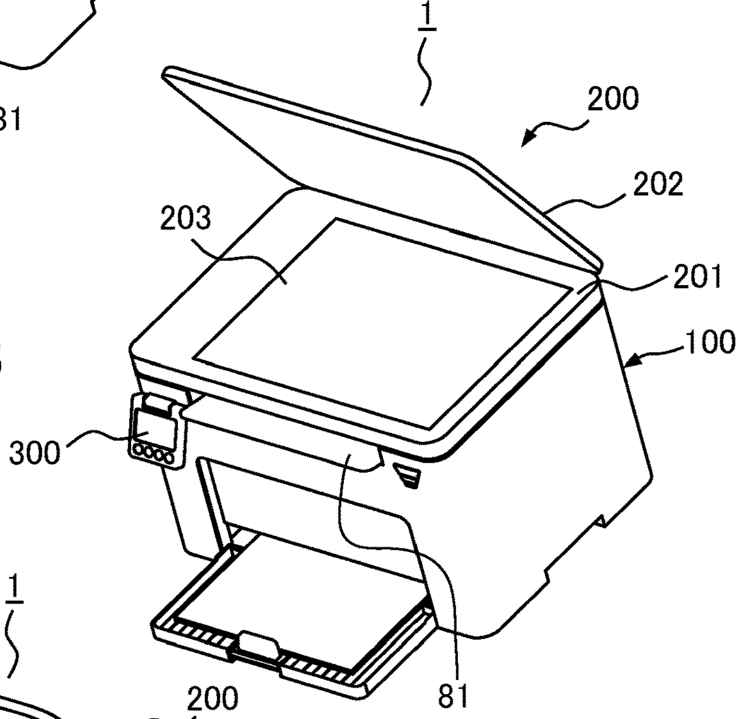
FIG. 4B is a diagram for describing the openable and closable member of the image forming apparatus according to the first embodiment.
Figure 4C:
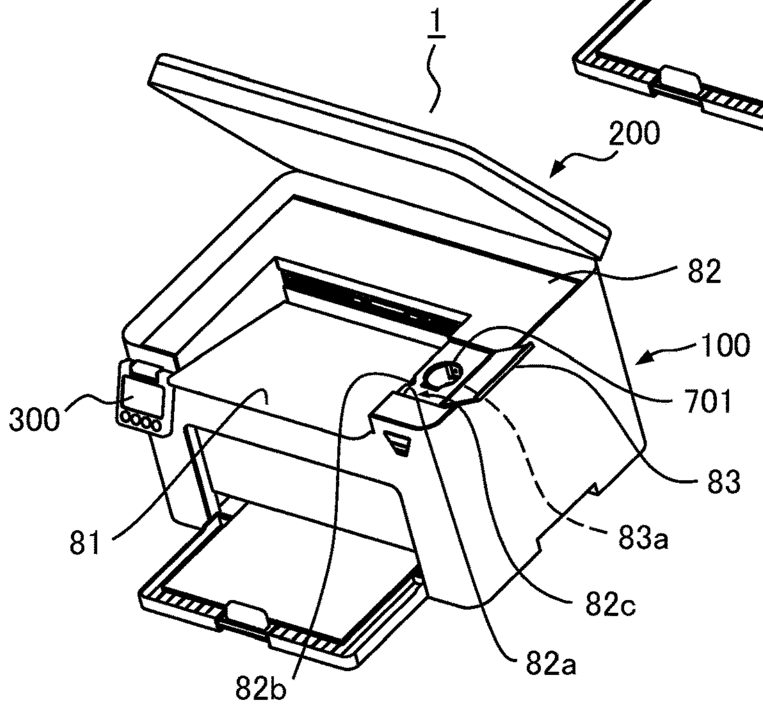
FIG. 4C is a diagram for describing the openable and closable member of the image forming apparatus according to the first embodiment.

In addition, in the present embodiment, an opening/closing member 83 is openably and closably provided on the top cover 82 as illustrated in FIGS. 1B and 4C. An opening portion 82*a* opening upward is provided in the upper surface of the top cover 82 on which the discharge tray 81 is provided, and the opening portion 82*a* is covered by closing the opening/closing member 83. The opening/closing member 83 and the opening portion 82*a* are provided on the right side of the op cover 82. In addition, the opening/closing member 83 is supported on the top cover 82 so as to be openable and closable about a pivot shaft 83*a* extending in the front-rear direction, and is opened to the right by hooking a finger through a groove portion 82*b* provided on the top cover 82. The opening/closing member 83 is formed in an approximately L-shape in accordance with the shape of the top cover 82. To be noted, the opening/closing member 83 is not limited to the opening/closing mechanism described above. For example, the opening/closing member 83 may be disposed on the top cover 82 so as to cover a replenishment container attaching portion 701 and configured to open and close the opening portion 82*a* by sliding and pivoting on the upper surface of the top cover 82 about a pivot shaft perpendicular to the top cover 82. Here, sliding on the upper surface of the top cover 82 means that the movement of the opening/closing member 83 in the pivot axis direction is restricted.

The opening portion 82*a* is opened so as to expose the replenishment container attaching portion 701 provided in an upper portion of the process cartridge 20 for toner replenishment. By opening the opening/closing member 83, the user can access the replenishment container attaching portion 701 without opening the top cover 82. The user can replenish the process cartridge 20 with toner by attaching a toner pack 40 to the replenishment container attaching portion 701.

In the present embodiment, a system in which the user replenishes the process cartridge 20 with toner from the toner pack 40 filled with toner for replenishment illustrated in FIGS. 1A and 1B in a state in which the process cartridge 20 is still attached to the image forming apparatus 1, that is, a direct replenishment system, is employed. Therefore, an operation of taking out the process cartridge 20 from the printer body 100 and replacing the process cartridge 20 by a brand-new process cartridge in the case where the amount of toner remaining in the process cartridge 20 has become small becomes unnecessary, and therefore the usability can be improved. To be noted, the image forming apparatus 1 and the toner pack 40 constitute an image forming system.

To be noted, in the present embodiment, the reading apparatus 200 is provided in an upper portion of the image forming apparatus 1, and in the case of opening the opening/closing member 83, the reading apparatus 200 needs to be opened first to expose the top cover 82. However, a configuration in which the reading apparatus 200 is omitted and the opening/closing member 83 is exposed in an upper portion of the image forming apparatus 1 from the beginning may be employed.

(1-3) Reading Apparatus

As illustrated in FIGS. 4A and 4B, the image reading apparatus 200 includes a reading unit 201 including an unillustrated reading portion therein, and a pressure plate 202 openably and closably supported by the reading unit 201. A platen glass 203 that transmits light emitted from the reading portion and supports a document placed thereon is provided on the upper surface of the reading unit 201.

In the case of reading an image of a document by the reading apparatus 200, the user places the document on the platen glass 203 in a state in which the pressure plate 202 is open. Then, the pressure plate 202 is closed to suppress displacement of the document on the platen glass 203, and a reading command is output to the image forming apparatus 1 by, for example, operating the operation portion 300. When the reading operation is started, the reading portion in the reading unit 201 reciprocates in a sub-scanning direction, that is, in the left-right direction in a state of facing the operation portion 300 of the image forming apparatus 1 on the front side. The reading portion receives light reflected on the document by a light receiving portion while radiating light onto the document from a light emitting portion, and reads the image of the document by performing photoelectric conversion.

To be noted, in the description below, the front-rear direction, left-right direction, and up-down direction of the image forming apparatus 1 are defined on the basis of a state of facing the operation portion 300 on the front side as a standard. The up-down direction corresponds to the gravity direction. The positional relationship between members attachable to and detachable from the printer body 100 such as the process cartridge 20 will be described on the basis of a state where the members are attached to the printer body 100. In addition, the "longitudinal direction" of the process cartridge 20 refers to an axial direction of the photosensitive drum 21.

(1-4) Configuration of Process Cartridge

Figure 5A:
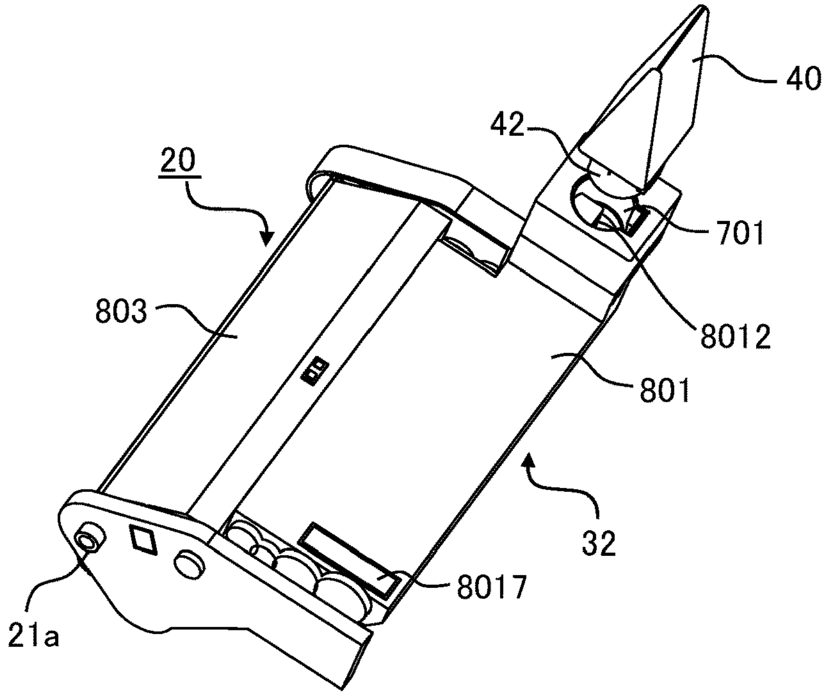
FIG. 5A is a diagram for describing a configuration of the process cartridge according to the first embodiment.
Figure 5B:
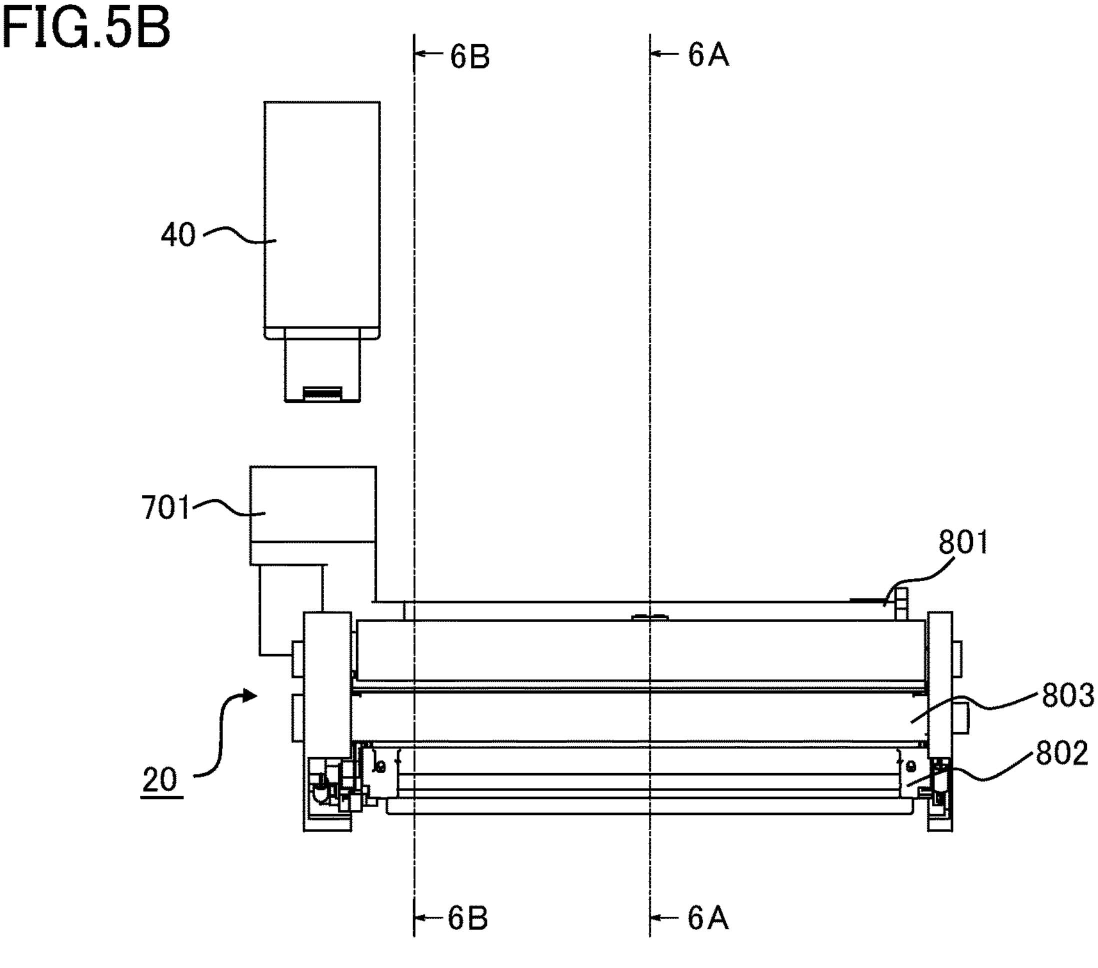
FIG. 5B is a diagram for describing the configuration of the process cartridge according to the first embodiment.
Figure 6A:
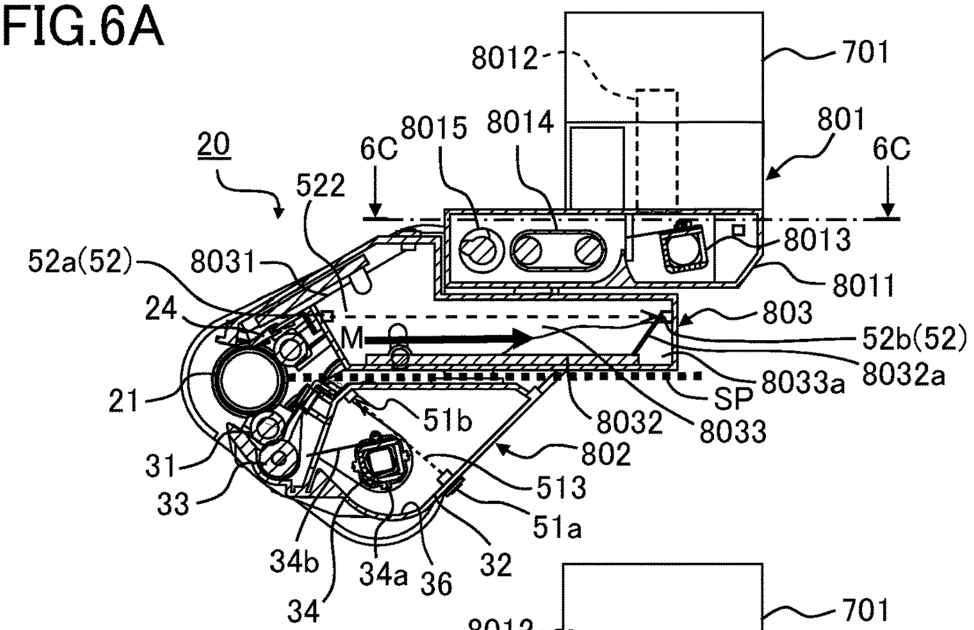
FIG. 6A is a diagram for describing the configuration of the process cartridge according to the first embodiment.
Figure 6B:
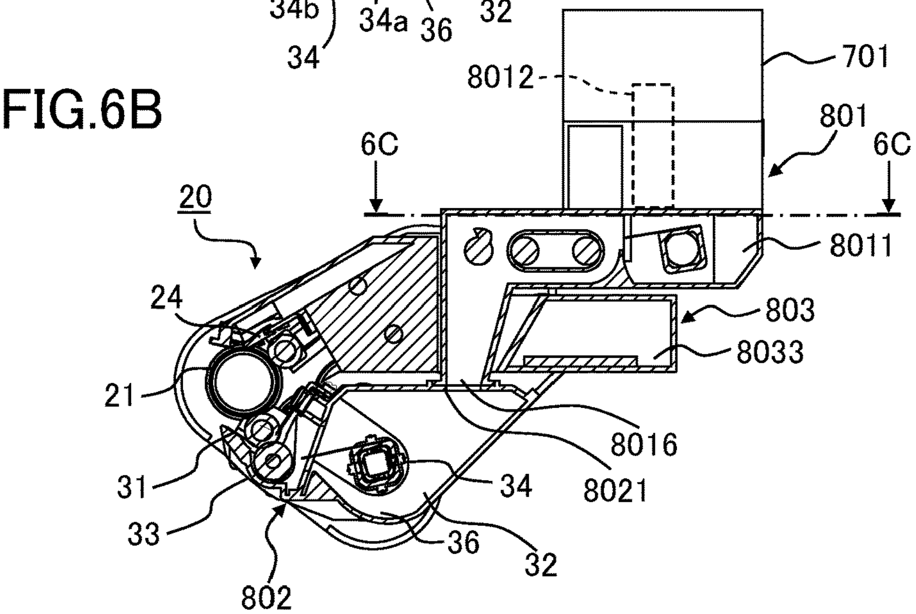
FIG. 6B is a diagram for describing the configuration of the process cartridge according to the first embodiment.
Figure 6C:
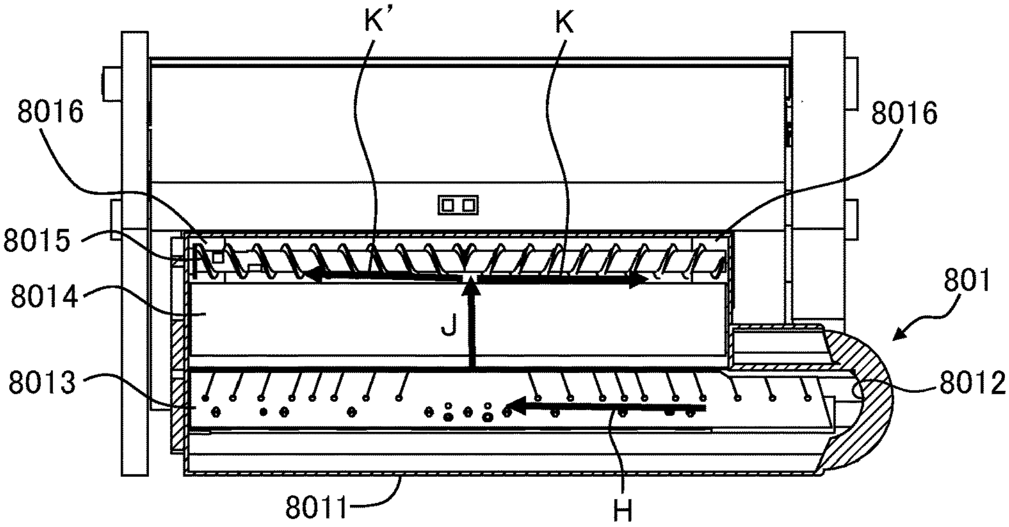
FIG. 6C is a diagram for describing the configuration of the process cartridge according to the first embodiment.

Next, a configuration of the process cartridge 20 will be described. FIG. 5A is a perspective view of the process cartridge 20 and the toner pack 40, and FIG. 5B is a side view of the process cartridge 20 and the toner pack 40. FIG. 6A is a section view taken along a line 6A-6A of FIG. 5B, FIG. 6B is a section view taken along a line 6B-6B of FIG. 5B, and FIG. 6C is a section view taken along a line 6C-6C of FIGS. 6A and 6B. To be noted, in FIGS. 5A to 6C, the outer shape of the replenishment container attaching portion 701 is illustrated in a simplified manner. For the detailed shape, see, for example, FIG. 9A.

As illustrated in FIGS. 5A to 6C, the process cartridge 20 is constituted by a toner receiving unit 801, a developing unit 802, and a cleaning unit 803. The toner receiving unit 801, the cleaning unit 803, and the developing unit 802 are arranged in this order from the upper side to the lower side in the gravity direction. Each unit will be sequentially described below.

The toner receiving unit 801 is disposed in an upper portion of the process cartridge 20. A toner storage portion 8011 constituted by a frame member that stores toner is provided in the toner receiving unit 801, and the replenishment container attaching portion 701 that couples to a toner pack 40 is provided at an end portion of the toner receiving unit 801. To be noted, the frame member constituting the toner storage portion 8011 may be made up of a single member or a combination of a plurality of members. The replenishment container attaching portion 701 includes a replenishment port 8012 through which toner discharged from the toner pack 40 is received. The detailed configuration of the replenishment container attaching portion 701 and attachment of the toner pack 40 to the replenishment container attaching portion 701 will be described later.

Further, a first conveyance member 8013, a second conveyance member 8014, and a third conveyance member 8015 are provided inside the toner receiving unit 801. The first conveyance member 8013 conveys, in an arrow direction H illustrated in FIG. 6C toward a center portion of the toner storage portion 8011, toner that has fallen into an end portion of the toner storage portion 8011 in the longitudinal direction through the replenishment port 8012. The second conveyance member 8014 conveys the toner conveyed by the first conveyance member 8013, in an arrow J direction illustrated in FIG. 6C perpendicular to the longitudinal direction, to an upper portion of the developing unit 802, that is, to discharge ports 8016. The third conveyance member 8015 receives the toner from the second conveyance member 8014 mainly at a center portion in the longitudinal direction, and conveys the toner to a first side and a second side in the longitudinal direction, that is, in an arrow K direction and an arrow K' direction. To be noted, the first to third conveyance members are operated so as to move the toner, and can be therefore also referred to as first to third developer moving members.

When the toner from the toner pack 40 serving as a replenishment container flows into the toner receiving unit 801, air also flows in. The replenishment container is also called a developer supply container. The toner receiving unit 801 includes an air filter 8017 illustrated in FIG. 5A for allowing the air to flow in the arrow H direction when replenishing toner, such that it is easier to replenish toner. This air filter 8017 suppresses blowout of the toner from the replenishment port 8012 occurring as a result of the inner pressure of the toner receiving unit 801 increasing when replenishing toner and part of the air flowing in a direction opposite to the arrow H direction.

Further, the discharge ports 8016 illustrated in FIG. 6B for discharging toner from the toner storage portion 8011 to the developer container 32 of the developing unit 802 are respectively provided at two end portions of the toner receiving unit 801 in the longitudinal direction. The toner having reached the discharge ports 8016 by being conveyed by the third conveyance member 8015 falls into the developer container 32 in accordance with the gravity. To be noted, a conveyance member may be further provided in paths of the discharge ports 8016 to help the toner movement in accordance with the gravity.

The developing unit 802 positioned in a lower portion of the process cartridge 20 includes openings 8021 illustrated in FIG. 6B that receive the toner discharged through the discharge ports 8016. Unillustrated sealing members are provided between the discharge ports 8016 and the openings 8021 such that the toner does not leak through a gap between the discharge ports 8016 and the openings 8021.

The toner having fallen into the toner receiving unit 801 from the toner pack 40 through the replenishment port 8012 is conveyed in the toner receiving unit 801 by the first conveyance member 8013, the second conveyance member 8014, and the third conveyance member 8015. Then, the toner is delivered from the toner receiving unit 801 to the developing unit 802 through the discharge ports 8016 and openings 8021 provided at the two end portions in the longitudinal direction. In this manner, the toner supplied through the replenishment port 8012, which is positioned at an end portion of the process cartridge 20 in the longitudinal direction and away from the developer container 32 in the horizontal direction as viewed in the longitudinal direction, is conveyed in the process cartridge 20 and reaches the developer container 32.

As described above, the toner storage portion 8011 of the toner receiving unit 801 and the developer container 32 of the developing unit 802 communicate with each other, and thus constitute a storage container defining a space to store the toner in the process cartridge 20. Therefore, in the present embodiment, the replenishment port 8012 for replenishing toner from the outside is provided as a part of the storage container of the process cartridge 20. However, a replenishment port directly connected to the replenishment container may be provided in the printer body, and the process cartridge may receive the toner through this replenishment port. In this case, a part of the process cartridge 20 excluding the replenishment port is detachable from the image forming apparatus 1 as illustrated in FIG. 3.

The toner supplied to the developing unit 802 through the openings 8021 is stored in a conveyance chamber 36 formed in the developer container 32 constituted by a frame member of the developing unit 802 as illustrated in FIGS. 6A and 6B. To be noted, the frame member constituting the developer container 32 may be constituted by a single member or a combination of a plurality of members. Here, an agitation member 34 is provided in the conveyance chamber 36. The agitation member 34 includes a shaft member **34*a* provided near the rotation center of the agitation member 34, and a blade portion 34*b* extending in the radial direction from the shaft member 34*a*. In section view, toner within the rotation trajectory of the distal end of the blade portion 34*b* is pushed and moved in accordance with the movement of the blade portion 34*b*. The toner replenished through the openings 8021 is conveyed toward the developing roller 31, the supply roller 33, and the developing blade 35 while being agitated by the agitation member 34**.

The cleaning unit 803 includes a fourth conveyance member 8031, a fifth conveyance member 8032, and a waste toner chamber 8033 constituted by a frame member as illustrated in FIGS. 6A and 6B. To be noted, the frame member constituting the waste toner chamber 8033 may be made up of a single member or a combination of a plurality of members. The waste toner chamber 8033 is a space for storing collected matter, that is, so-called waste toner, such as transfer residual toner collected from the photosensitive drum 21 by the cleaning blade 24, and is independent from the inner spaces of the toner receiving unit 801 and the developing unit 802. The waste toner collected by the cleaning blade 24 is conveyed in an arrow M direction by the fourth conveyance member 8031 and the fifth conveyance member 8032, and is gradually accumulated starting from the front side of a rear portion **8033*a* of the waste toner chamber 8033**.

Here, a laser passing space SP that is a gap which the laser light L emitted from the scanner unit 11 illustrated in FIG. 1A toward the photosensitive drum 21 can pass through is defined between the cleaning unit 803 and the developing unit 802 as illustrated in FIG. 6A. As described above, the discharge ports 8016 and the openings 8021 for delivering the toner from the toner receiving unit 801 to the developing unit 802 are provided at end portions of the respective units in the longitudinal direction. Therefore, toner replenished from the outside of the image forming apparatus 1, particularly through the replenishment port 8012 opening in the upper surface of the apparatus, can be conveyed to the developer container 32 provided in a lower portion of the process cartridge 20 while securing the laser passing space SP in a configuration of a small size as the whole of the process cartridge 20.

(1-5) Configuration of Toner Pack

Figure 7A:
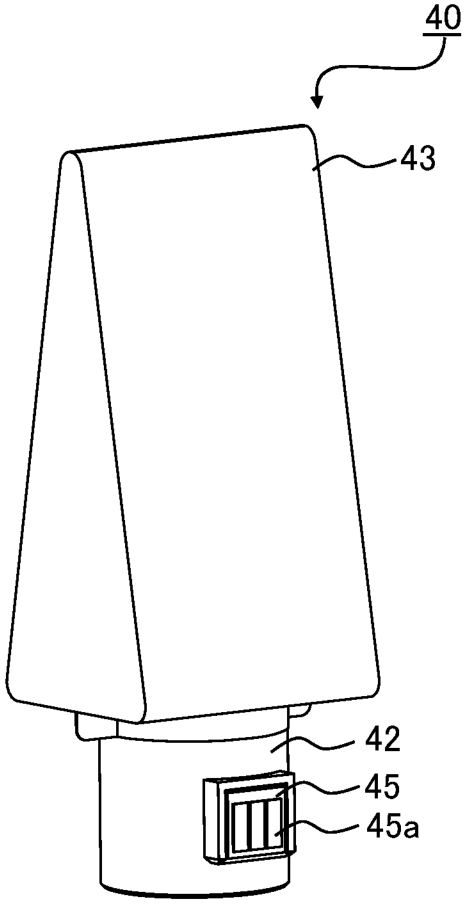
FIG. 7A is a perspective view of a toner pack according to the first embodiment.
Figure 7B:
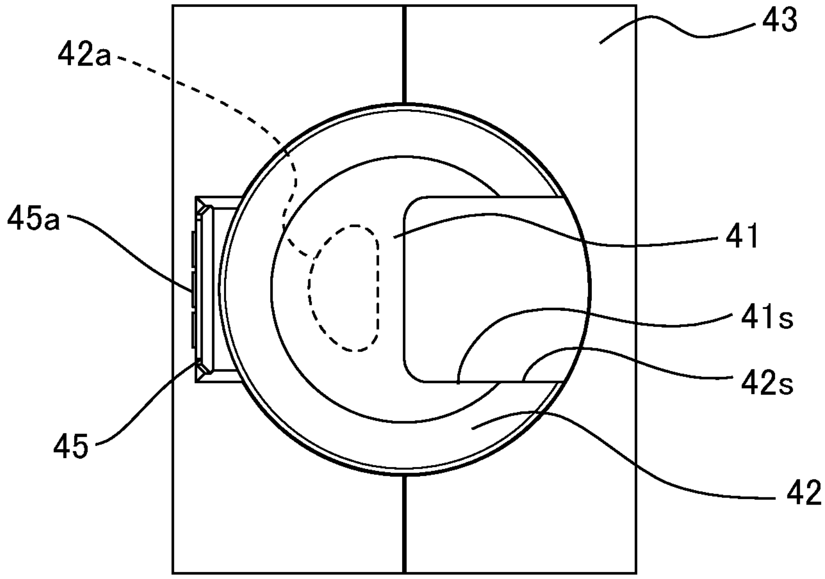
FIG. 7B is a side view of the toner pack according to the first embodiment.
Figure 8A:
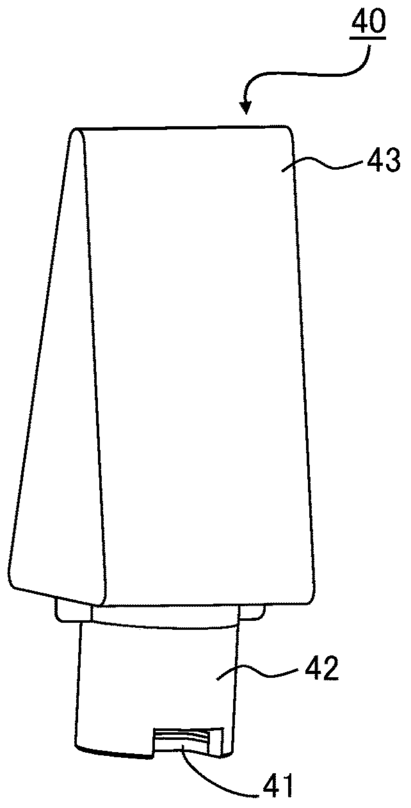
FIG. 8A is a perspective view of the toner pack according to the first embodiment.
Figure 8B:
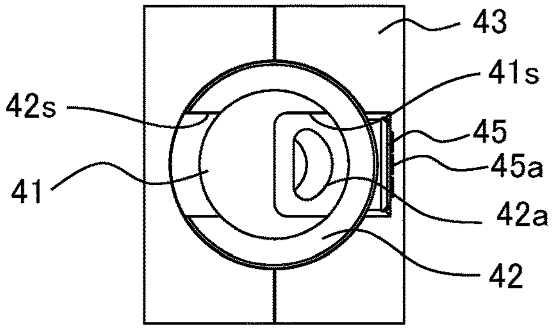
FIG. 8B is a side view of the toner pack according to the first embodiment.
Figure 8C:
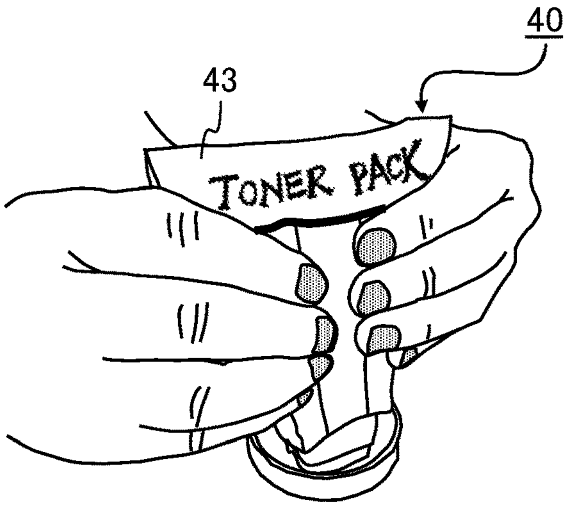
FIG. 8C is a diagram illustrating how toner is discharged.

The configuration of the toner pack 40 will be described. FIG. 7A is a perspective view of the toner pack 40 in a state in which a shutter member 41 is closed, and FIG. 7B is a bottom view thereof. FIG. 8A is a perspective view of the toner pack 40 in a state in which the shutter member 41 is open, FIG. 8B is a bottom view thereof, and FIG. 8C illustrates how the user squeezes the toner pack 40 with hands when replenishing toner. In addition, FIG. 12 is a perspective view of the toner pack 40 in the state in which the shutter member 41 is closed as viewed from below.

Figure 9A:
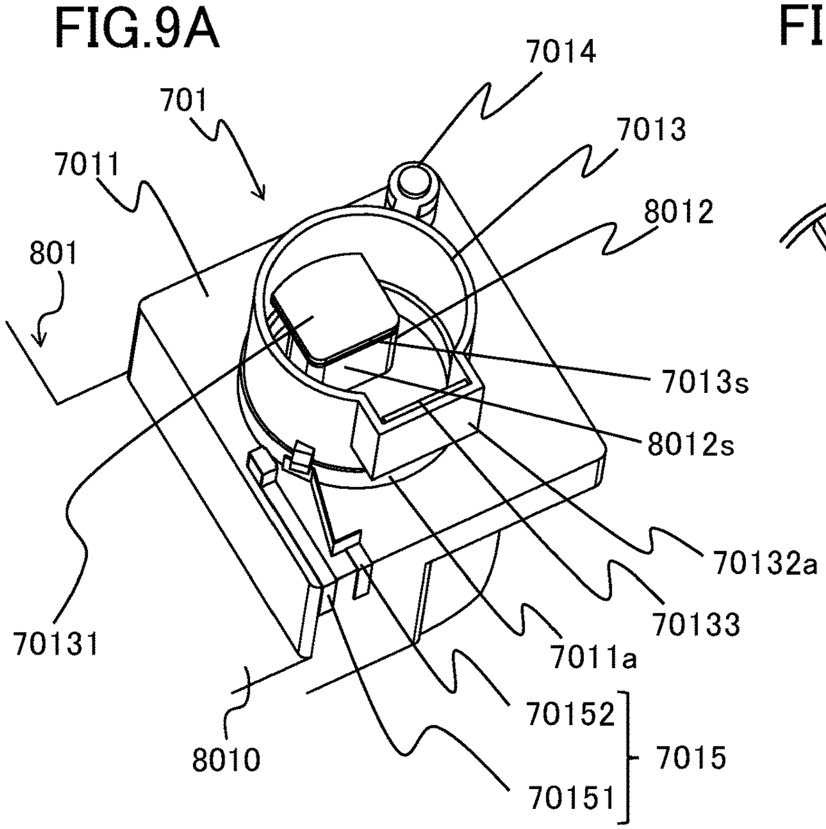
FIG. 9A is a perspective view of a replenishment container attaching portion according to the first embodiment.
Figure 9C:
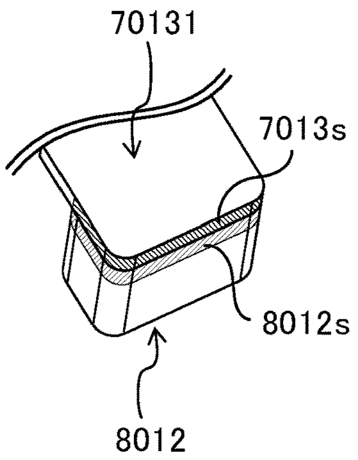
FIG. 9C is an enlarged view of the replenishment container attaching portion according to the first embodiment.
Figure 9B:
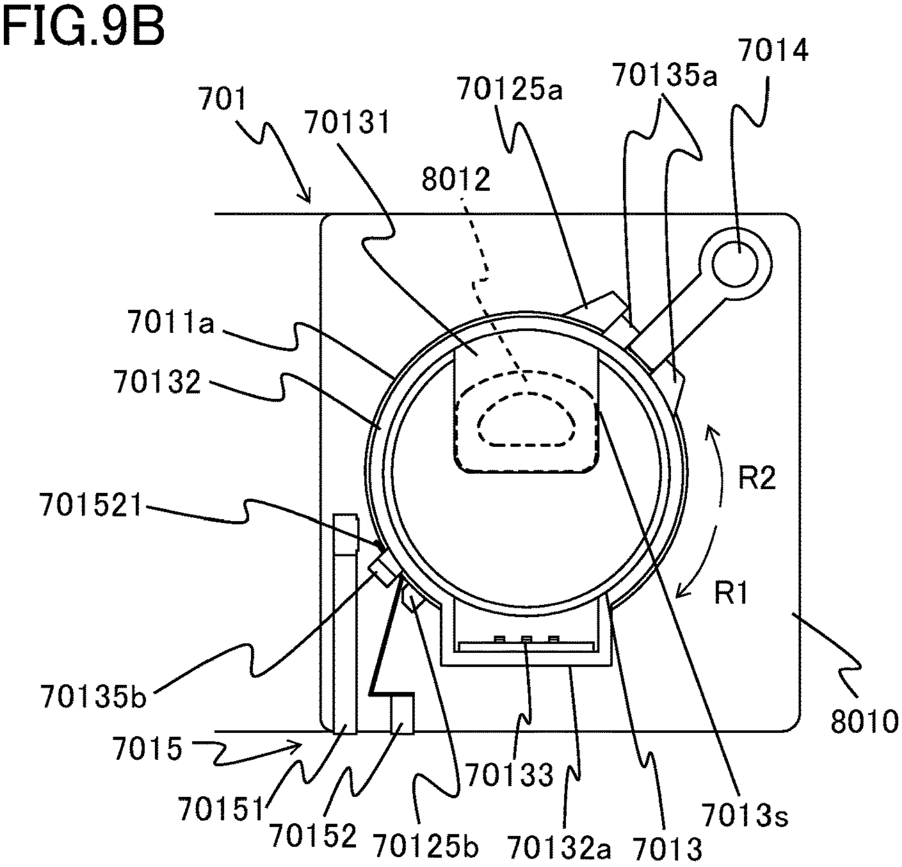
FIG. 9B is a top view of the replenishment container attaching portion according to the first embodiment.

As illustrated in FIGS. 7A to 8C, the toner pack 40 serving as an example of a replenishment container includes a bag member 43 filled with toner, a discharge portion 42 formed from resin and attached to the bag member 43, and the shutter member 41 capable of opening and closing an opening portion of the discharge portion 42. A memory unit 45 serving as a storage portion that stores information of the toner pack 40 is attached to the discharge portion 42. The memory unit 45 includes, as a contact portion 45*a* that comes into contact with a contact portion 70133 of the replenishment container attaching portion 701 that is illustrated in FIGS. 9A and 9B and will be described later, a plurality of metal plates serving as metal terminals exposed to the outside of the toner pack 40. In addition, as a material of the bag member 43, polypropylene resin, polyethylene terephthalate resin, cardboards, paper, and so forth can be employed. In addition, the thickness of the bag member 43 can be set to 0.01 mm to 1.2 mm. In addition, the thickness is further preferably 0.05 mm to 1.0 mm from the viewpoint of squeezablity for the user and the durability of the bag.

Figure 12:
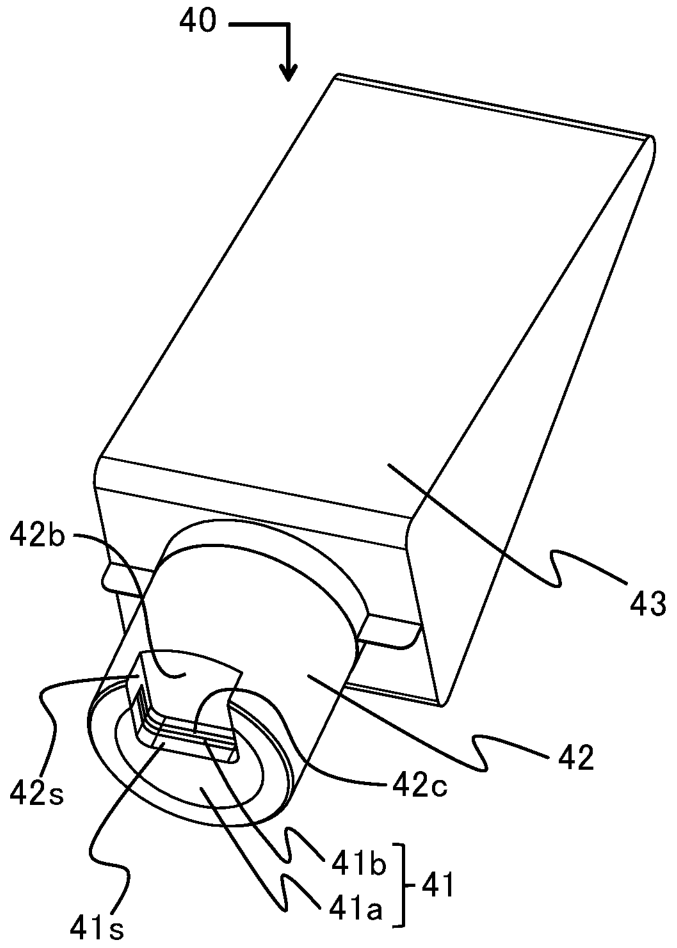
FIG. 12 is a perspective view of the toner pack according to the first embodiment.

As illustrated in FIGS. 7B, 8B, and 12, the shutter member 41 has a shape obtained by cutting out a part of a disk relatively rotatable with respect to the discharge portion 42. A side surface of the shutter member 41 extending in a thickness direction at the cutout portion functions as an engagement surface 41*s*. Meanwhile, the discharge portion 42 also has a shape having a cutout portion therein. The cutout portion of the discharge portion 42 includes an engagement surface 42*s* parallel to the engagement surface 41*s*. Further, a discharge port 42*a* is provided at a position at approximately 180° from the engagement surface 42*s* in the circumferential direction of the discharge port 42*a*. To be noted, details of the engagement surface 41*s* and 42*s* are illustrated in FIG. 12.

As illustrated in FIGS. 7B and 12, when the positions of the cutouts of the shutter member 41 and the discharge portion 42 as viewed from above or below are aligned, the discharge port 42*a* is covered by the shutter member 41. This state will be referred to as a closed state. As illustrated in FIG. 8B, when the shutter member 41 rotates by 180° with respect to the discharge portion 42, the discharge port 42*a* is exposed through the cutout portion of the shutter member 41, and the inner space of the bag member 43 communicates with a space outside the toner pack 40. To be noted, as illustrated in FIG. 12, the shutter member 41 preferably has a structure in which a sealing layer 41*b* formed from an elastic material such as a sponge is stuck on a body portion 41*a* having stiffness. In this case, the sealing layer 41*b* is in firm contact with a sealing layer 42*c* covering a peripheral edge portion of the discharge port 42*a* in the closed state, and thus toner leakage is suppressed. The sealing layer 42*c* is illustrated in FIG. 12, and is formed from an elastic material such as a sponge similarly to the sealing layer 41*b*.

As will be described later, when replenishing the image forming apparatus 1 with toner from the toner pack 40, the toner pack 40 is inserted in and coupled to the replenishment container attaching portion 701 by aligning the discharge portion 42 with a predetermined position. Then, when the discharge portion 42 is rotated by 180°, the discharge portion 42 relatively rotates with respect to the shutter member 41 to open the discharge port 42*a*, and the toner in the bag member 43 falls into the toner receiving unit 801 in accordance with the gravity. At this time, the shutter member 41 does not relatively move with respect to the replenishment container attaching portion 701.

As illustrated in FIG. 8C, the user squeezes the bag member 43 in the state in which the toner pack 40 is attached to the replenishment container attaching portion 701 and rotated by 180°, and thus can promote discharge of toner from the toner pack 40.

To be noted, although the shutter member 41 that is rotatable has been described as an example herein, the shutter member may be omitted, and a shutter member of a slide type may be used instead of the rotary shutter member 41. In addition, the shutter member 41 may be configured to be broken by attaching the toner pack 40 to a replenishment port 8012 or rotating the toner pack 40 in an attached state, or may have a detachable lid structure such as a sticker.

In addition, it is preferable that a protective cap is attached to the discharge portion 42 of an unused toner pack 40 such that toner does not leak during transport or the like. For example, the protective cap engages with the cutout portions of the shutter member 41 and the discharge portion 42 in a state of being attached to the discharge portion 42 so as to restrict relative rotation of the shutter member 41 and the discharge portion 42. By removing the protective cap, it becomes possible for the user to attach the toner pack 40 to the replenishment container attaching portion 701.

(1-6) Configuration of Replenishment Container Attaching Portion

A shutter opening/closing mechanism of the toner pack 40 and the toner receiving unit 801, and a locking mechanism of the shutter member 41 will be described. FIG. 9A is a perspective view of the replenishment container attaching portion 701, and FIG. 9B is a top view of the replenishment container attaching portion 701. The replenishment container attaching portion 701 includes the replenishment port 8012, a replenishment port shutter 7013, a locking member 7014, and a rotation detection portion 7015.

The replenishment port 8012 is an opening portion communicating with the toner storage portion 8011 of the toner receiving unit 801 illustrated in FIG. 6, and is fixed to the frame member 8010 of the toner receiving unit 801. The replenishment port shutter 7013 includes a lid portion 70131 covering the replenishment port 8012, a cylindrical portion 70132 that receives the discharge portion 42 of the toner pack 40, and the contact portion 70133 connected to the contact portion 45*a* of the memory unit 45 of the toner pack 40 illustrated in FIG. 8B. In FIG. 9A, a part of the cylindrical portion 70132 covering the contact portion 70133 is indicated as a cylindrical portion 70132*a*. The replenishment port shutter 7013 is a member in which the lid portion 70131, the cylindrical portion 70132, and the contact portion 70133 are integrated, and is rotatably attached to the frame member 8010 of the toner receiving unit 801. Each conductor exposed on the contact portion 70133 is electrically connected to a controller of the image forming apparatus 1 incorporated in the printer body 100, via wiring provided in the process cartridge 20 and contacts between the process cartridge 20 and the printer body 100.

The rotation detection portion 7015 serving as a rotation detection sensor is a mechanism that detects the rotation of the replenishment port shutter 7013. The rotation detection portion 7015 of the present embodiment is constituted by two conductive leaf springs 70151 and 70152. The leaf spring 70152 springs in a clockwise direction, and when pressed by a projection portion 70135*a* provided on an outer periphery of the replenishment port shutter 7013, comes into contact with the leaf spring 70151 at a distal end portion 701521. That is, the rotation detection portion 7015 is an electric circuit configured such that a connected state and disconnected state thereof switch in accordance with the rotation angle, that is, rotational position of the replenishment port shutter 7013. As will be described later, a controller 90 of the image forming apparatus 1 illustrated in FIG. 19 recognizes whether or not the discharge port 42*a* of the toner pack 40 communicates with the replenishment port 8012 of the replenishment container attaching portion 701, on the basis of whether the rotation detection portion 7015 is in the connected state or the disconnected state. In other words, the controller 90 can determine that the replenishment operation by the user using the toner pack 40 has been normally performed at least up to the communication between the discharge port 42*a* and the replenishment port 8012.

As illustrated in FIGS. 9A to 10C, a plurality of projection portions 70135*a* and 70135*b* are provided at an outer peripheral portion of the cylindrical portion 70132 of the replenishment port shutter 7013. In addition, the frame member 8010 includes a shutter supporting portion 7011, and the shutter supporting portion 7011 rotatably supports the cylindrical portion 70132 of the replenishment port shutter 7013. A plurality of projection portions 70125*a* and 70125*b* are also provided on the cylindrical portion 7011*a* of the shutter supporting portion 7011. The plurality of projection portions 70125*a* and 70125*b* are positioned below the projection portion 70135*a* illustrated on the right side in FIG. 10A in the gravity direction. The projection portion 70125*b* allows the projection portion 70135*a* illustrated on the right side in FIG. 10A to pass through by rotational movement. In contrast, the projection portion 70135*a* illustrated on the left side in FIG. 10A is positioned at the same height as the projection portion 70135*a* illustrated on the right side of FIG. 10A, and extends downward to such a height as to overlap with the projection portions 70125*a* and 70125*b*. Therefore, the projection portion 70125*b* comes into contact with the projection portion 70135*a* illustrated on the left side in FIG. 10A depending on the rotation angle, that is, rotational position of the replenishment port shutter 7013, and thus restricts rotational movement of the projection portion 70135*a* illustrated on the left side in FIG. 10A.

In addition, before the replenishment port shutter 7013 rotates in an R1 direction, the projection portion 70125*a* comes into contact with the projection portion 70135*a* illustrated on the left side, and restricts the rotational movement of the projection portion 70135*a* in an R2 direction. In addition, the projection portion 70135*a* illustrated on the right side in FIG. 10A abuts the locking member 7014, and thus the rotational movement of the locking member 7014 in the R1 direction is restricted. In addition, after the replenishment port shutter 7013 has rotated in the R1 direction, the projection portion 70135*b* abuts the locking member 7014 that has moved to a locking position, and thus restricts the rotational movement of the locking member 7014 in the R2 direction. In addition, the projection portion 70135*a* illustrated on the right side in FIG. 10A abuts the projection portion 70125*b*, and thus restricts further rotational movement of the projection portion 70135*a* in the R1 direction. To be noted, the rotation direction of the replenishment port shutter 7013 is the R1 direction when attaching the toner pack 40, and is the R2 direction when detaching the toner pack 40.

Figure 11A:
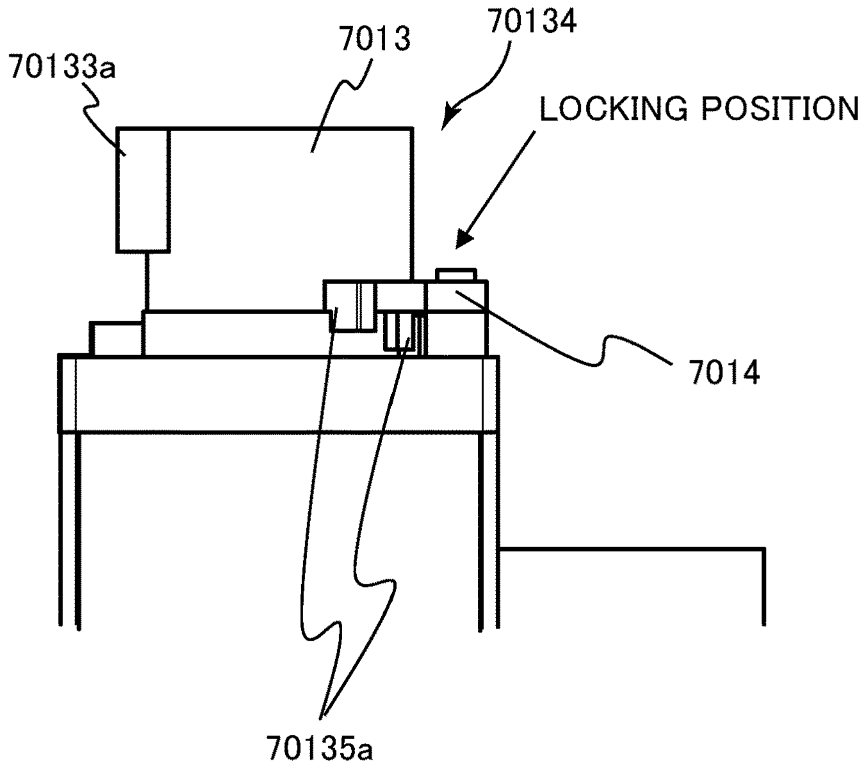
FIG. 11A is a diagram illustrating a position of a locking member according to the first embodiment.
Figure 11B:
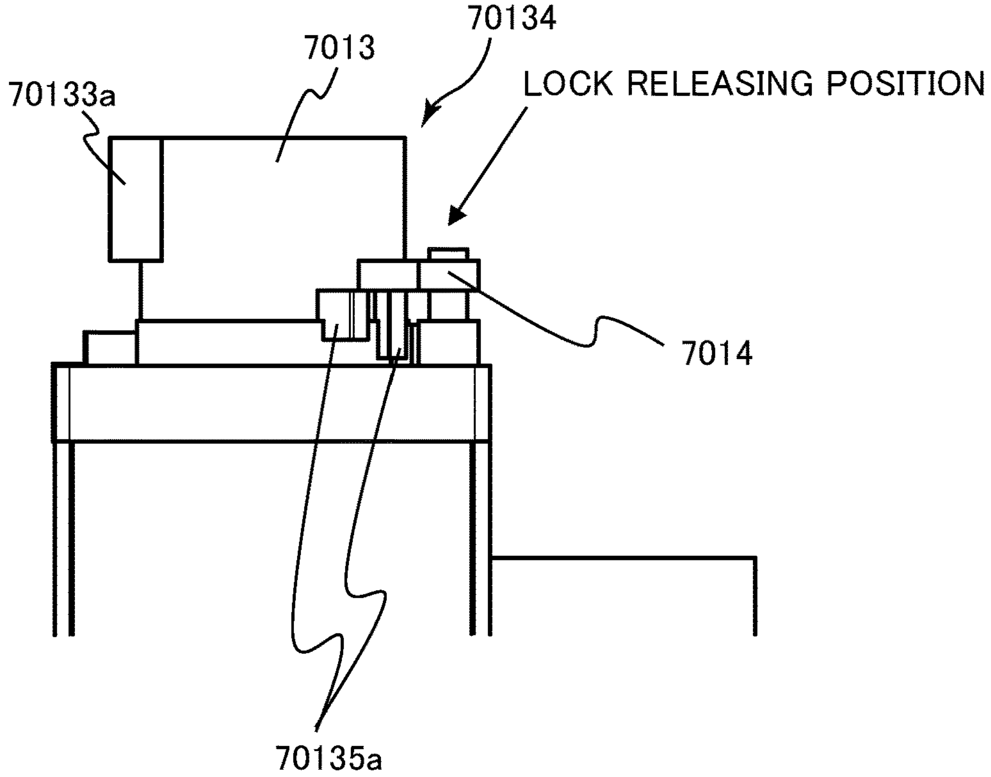
FIG. 11B is a diagram illustrating a position of the locking member according to the first embodiment.

The locking member 7014 is a member that restricts the rotation of the replenishment port shutter 7013. FIG. 11A illustrates a state in which the locking member 7014 is in the locking position, and FIG. 11B illustrates a state in which the locking member 7014 is in a lock releasing position. The locking member 7014 can be switched between the locking position serving as a restricting position and the lock releasing position serving as an allowing position by moving in the up-down direction. As illustrated in FIGS. 9B and 11A, when the locking member 7014 abuts the projection portion 70135*a* of the replenishment port shutter 7013 in the locking position, the rotation of the replenishment port shutter 7013 is restricted. When the locking member 7014 moves to the lock releasing position as illustrated in FIG. 11B, the locking member 7014 retracts from the movement trajectory of the projection portion 70135*a* drawn when the replenishment port shutter 7013 moves, and thus the rotation of the replenishment port shutter 7013 is allowed.

(1-7) Pressing Mechanism of Locking Member

Figure 13:
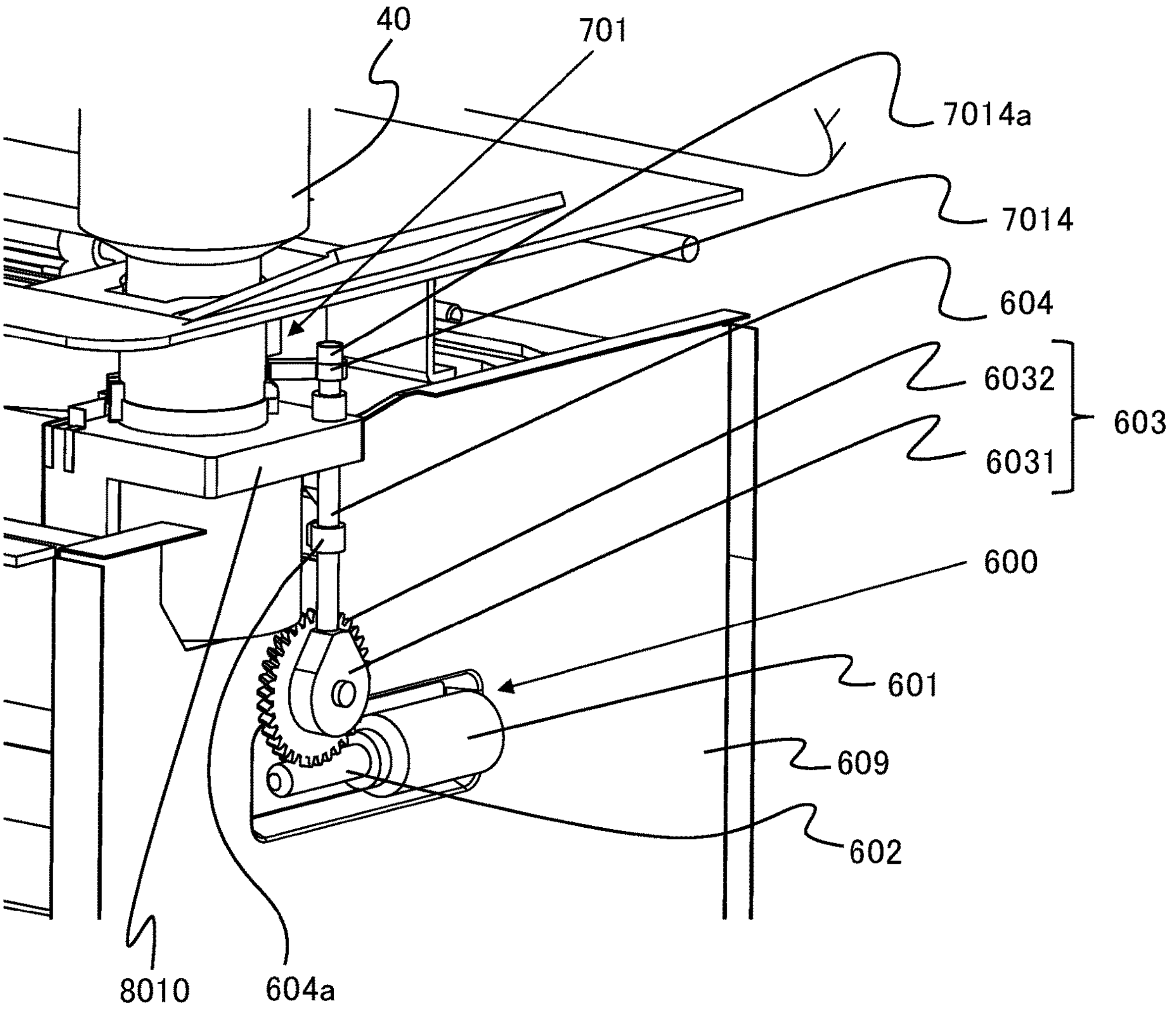
FIG. 13 is a diagram illustrating a pressing mechanism of the locking member according to the first embodiment.

FIG. 13 illustrates a pressing mechanism 600 that moves the locking member 7014 between the locking position and the lock releasing position. The pressing mechanism 600 includes a motor 601, an input gear 602, a cam gear 603, and an advancing/retracting pin 604. The input gear 602 is a crossed helical gear attached to an output shaft of the motor 601. The cam gear 603 includes a gear portion 6032 constituted by a helical gear that engages with the input gear 602, and a cam portion 6031 for reciprocating the advancing/retracting pin 604.

The advancing/retracting pin 604 is supported by a holding member so as to be linearly movable in the gravity direction and an opposite direction thereto in the vertical direction. When the motor 601 rotates, the cam gear 603 is rotated via the input gear 602, the advancing/retracting pin 604 reciprocates in the up-down direction by being pressed by the cam portion 6031, and in accordance with this, the locking member 7014 also moves up and down between the locking position and the lock releasing position. FIG. 13 illustrates a locked state.

To be noted, although a combination of a helical gear and a crossed helical gear has been used as the drive transmission configuration of the pressing mechanism 600 of the present embodiment, the configuration is not limited to this as long as the rotation of the motor can be converted into a linear motion. For example, a bevel gear may be used, or the input gear 602 may be removed and the cam gear 603 may be directly driven by the motor 601. In addition, an actuator that outputs a linear motion such as a solenoid may be used as the drive source instead of the motor 601.

In addition, each member constituting the pressing mechanism 600 illustrated in FIG. 13 is supported by the frame member 609 of the printer body 100, and the advancing/retracting pin 604 is supported by a guide portion 604*a* so as to be capable of reciprocating in the up-down direction. The guide portion 604*a* is provided in the casing of the printer body 100. Meanwhile, a pivot shaft 7014*a* of the locking member 7014 is held by a holding portion provided on the frame member 8010 of the toner receiving unit 801 so as to be pivotable and slidable in the vertical direction. Therefore, when replacing the process cartridge 20, the locking member 7014 is also replaced, and the pressing mechanism 600 is left in the printer body 100. The pivot shaft 7014*a* and the advancing/retracting pin 604 are formed as separate members. When the locking member 7014 is in the lock releasing position, the advancing/retracting pin 604 is away from the locking member 7014, and the process cartridge 20 is detached from the body with the advancing/retracting pin 604 left in the body. However, the configuration is not limited to this, and for example, the pivot shaft 7014*a* of the locking member 7014 may be supported by the printer body 100.

(1-8) Procedure of Replenishment Operation Using Toner Pack

Figure 10A:
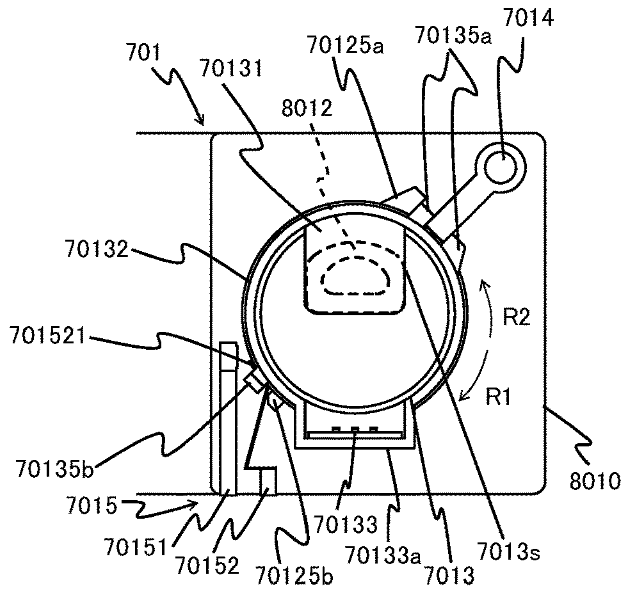
FIG. 10A is a diagram for describing an operation of the replenishment container attaching portion according to the first embodiment.
Figure 10B:
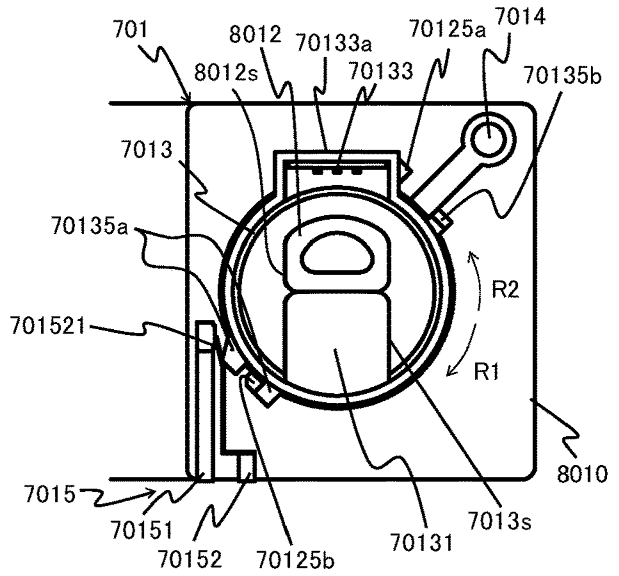
FIG. 10B is a diagram for describing the operation of the replenishment container attaching portion according to the first embodiment.
Figure 10C:
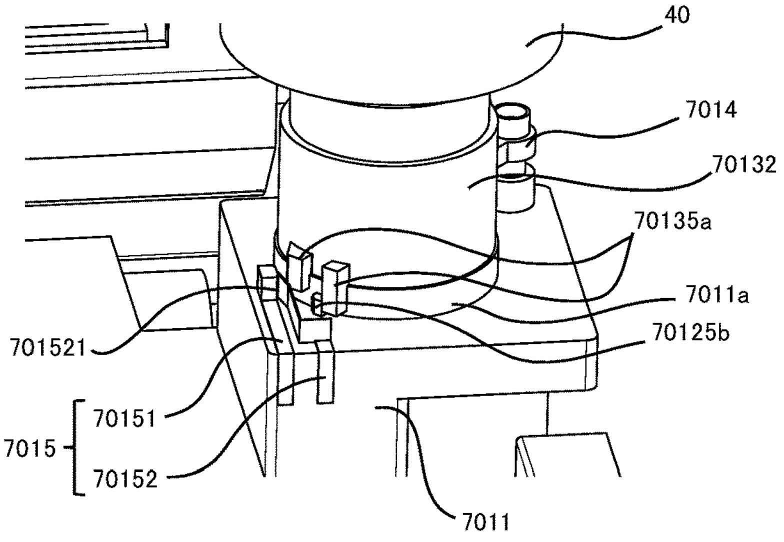
FIG. 10C is a diagram for describing the operation of the replenishment container attaching portion according to the first embodiment.

A procedure of the operation performed when detaching the toner pack 40 after attaching the toner pack 40 to the replenishment container attaching portion 701 and replenishing toner will be described on the basis of the configuration of the toner pack 40, the replenishment container attaching portion 701, and the pressing mechanism 600 described above. FIG. 10A is a top view of the replenishment container attaching portion 701 when the replenishment port 8012 is in the closed state, and FIG. 10B is a top view of the replenishment container attaching portion 701 when the replenishment port 8012 is in the open state. FIG. 10C is a perspective view of the replenishment container 701 in a state in which the replenishment port 8012 is in the open state.

As illustrated in FIG. 10A, the replenishment port shutter 7013 in the closed state is fixed so as to be unrotatable with respect to the replenishment port 8012 by the projection portion 70135*a* abutting the locking member 7014 positioned in the locking position in the rotation direction. At this time, the lid portion 70131 of the replenishment port shutter 7013 completely blocks the replenishment port 8012. In addition, the leaf springs 70151 and 70152 of the rotation detection portion 7015 are separated from each other, and the rotation detection portion 7015 is in the disconnected state.

When inserting the toner pack 40 in the replenishment container attaching portion 701, the user aligns the cutout portions of the discharge portion 42 of the toner pack 40 and the shutter member 41 illustrated in FIG. 12 with the replenishment port 8012 and the lid portion 70131 of the replenishment port shutter 7013 and inserts the toner pack 40. In this case, the engagement surface 42*s* of the discharge portion 42 engages with an engagement surface 7013*s* illustrated in FIG. 9C, which is a side surface of the lid portion 70131, and the engagement surface 41*s* of the shutter member 41 engages with an engagement surface 8012*s* illustrated in FIG. 9C, which is provided on an outer peripheral portion of the replenishment port 8012. At this time, the discharge portion 42 engaging with the lid portion 70131 of the replenishment port shutter 7013 is unrotatable until the lock of the replenishment port shutter 7013 by the locking member 7014 is released later, and becomes rotatable together with the replenishment port shutter 7013 after the release of the lock. In addition, the shutter member 41 of the toner pack 40 is in an unrotatable state by engaging with the replenishment port 8012 fixed to the frame member 8010 of the toner receiving unit 801. To be noted, as a different engagement mechanism of the lid portion 70131 and the discharge portion 42, a projection portion projecting upward may be provided on the upper surface of the lid portion 70131 and a recess portion that engages with this projection portion may be provided on a lower surface 42*b* of the discharge portion 42 illustrated in FIG. 12.

In addition, by inserting the toner pack 40, the contact portion 45*a* of the memory unit 45 illustrated in FIGS. 7A and 7B comes into contact with the contact portion 70133 of the replenishment container attaching portion 701, and information stored in the memory unit 45 is read by the controller 90 of the image forming apparatus 1. The memory unit 45 stores information indicating whether or not toner is in the toner pack 40, that is, whether or not the toner pack 40 has been already used. This information will be also referred to as a brand-new product flag. When the controller 90 reads the brand-new product flag and determines that the toner pack 40 currently attached includes toner, that is, the toner pack 40 currently attached has not been used, the controller 90 controls the pressing mechanism 600 to push up the locking member 7014. As a result of this, the locking member 7014 moves from the locking position to the lock releasing position illustrated in FIG. 11B.

In the state in which the locking member 7014 has moved to the lock releasing position, the locking member 7014 is separated from the projection portion 70135*a* of the replenishment port shutter 7013, and thus the replenishment port shutter 7013 becomes rotatable in the R1 direction of FIGS. 10A an 10B. However, since the projection portion 70125*a* provided on the frame member 8010 of the toner receiving unit 801 interferes with the projection portion 70135*a* illustrated in FIG. 10A, rotation of the replenishment port shutter 7013 in the R2 direction is restricted. That is, in FIG. 10A, the projection portions 70125*a* and 70125*b* are positioned below the projection portions 70135*a* and 70135*b* such that the projection portions 70135*a* and 70135*b* can move and pass the projection portions 70125*a* and 70125*b* in the rotation direction.

When the user grabs the toner pack 40 and rotates the discharge portion 42 or a portion of the bag member 43 close to the discharge portion 42 by 180° in the R1 direction, a state illustrated in FIG. 10B is taken. The replenishment port shutter 7013 also rotates by 180° together with the discharge portion 42 of the toner pack 40, thus the lid portion 70131 moves from the position covering the replenishment port 8012, and the replenishment port 8012 is exposed. The side surface of the lid portion 70131 is pushed by the engagement surface 42*s*, which is a part of the discharge portion 42 that is rotating, and thus the lid portion 70131 rotationally moves together with the engagement surface 42*s*. In addition, as a result of the discharge portion 42 rotating by 180° in a state in which the shutter member 41 is fixed, the discharge port 42*a* of the toner pack 40 illustrated in FIG. 8B is exposed, and faces the replenishment port 8012. As a result of this, the inner space of the toner pack 40 and the inner space of the toner receiving unit 801 communicate with each other through the discharge port 42*a* and the replenishment port 8012, and the toner stored in the bag member 43 flows down into the toner storage portion 8011.

The toner having fallen into the toner storage portion 8011 is, as described above, conveyed inside the toner receiving unit 801, reaches the developer container 32, and becomes available for a developing process. To be noted, a configuration in which the developing unit 802 can perform the developing process as long as toner of an amount required for maintaining the image quality remains in the developer container 32 even before the newly replenished toner reaches the developer container 32 may be employed. That is, a configuration in which toner can be supplied to the developer container from a replenishment container disposed outside the image forming apparatus regardless of whether or not the image forming operation by the image forming portion 10 illustrated in FIG. 1A is being performed may be employed.

In addition, the projection portion 70125*b* is disposed so as to abut the projection portion 70135*a* of the replenishment port shutter 7013 when the replenishment port shutter 7013 is rotated by 180° in the R1 direction from the state of FIG. 10A as illustrated in FIG. 10B. That is, the projection portion 70125*b* is also positioned below the projection portions 70135*a* and 70135*b* similarly to the projection portion 70125*a*. As a result of this, pivoting of the replenishment port shutter 7013 beyond 180° in the R1 direction is restricted. At the same time, the projection portion 70135*a* of the replenishment port shutter 7013 presses the leaf spring 70152 of the rotation detection portion 7015, and the distal end portion 701521 thereof is brought into contact with the leaf spring 70151. When the rotation detection portion 7015 is in the connected state, the controller 90 recognizes that the replenishment port shutter 7013 has transitioned to the open state, and operates the pressing mechanism 600 to move the locking member 7014 again to the locking position. Then, the locking member 7014 engages with the projection portion 70135*b* of the replenishment port shutter 7013 to restrict the rotation in the R2 direction, and thus the replenishment port shutter 7013 and the toner pack 40 both becomes unrotatable in any direction.

Further, in the state of FIG. 10B in which the discharge portion 42 of the toner pack 40 and the replenishment port shutter 7013 have been rotated by 180°, the lid portion 70131 of the replenishment port shutter 7013 covers an upper portion of the shutter member 41 of the toner pack 40. Therefore, when it is attempted to pick up the toner pack 40 from the replenishment container attaching portion 701, the shutter member 41 interferes with the lid portion 70131, and the movement of the toner pack 40 is restricted. Therefore, detachment of the toner pack 40 from the replenishment container attaching portion 701 is suppressed unless the user performs the detachment operation of the toner pack 40 in accordance with a predetermined procedure that will be described below.

After the start of discharge of toner from the toner pack 40, if a condition for determining that the discharge of toner has been completed is satisfied, the controller 90 operates the pressing mechanism 600 to move the locking member 7014 to the lock releasing position. In the present embodiment, completion of the discharge of toner is determined on the basis of the time elapsed from the time point at which the rotation detection portion 7015 has transitioned to the connected state.

After the locking member 7014 has moved to the lock releasing position, the user can detach the toner pack 40 by following a procedure reversed from the procedure performed when attaching the toner pack 40. That is, the user grabs the discharge portion 42 of the toner pack 40 or a part of the bag member 43 close to the discharge portion 42, and rotates the toner pack 40 by 180° in the R2 direction, which is opposite to the direction of rotation at the time of attachment. In this case, the replenishment port shutter 7013 rotates by 180° together with the discharge portion 42, and the replenishment port 8012 is covered by the lid portion 70131 of the replenishment port shutter 7013 as illustrated in FIG. 10A. In addition, the projection portion 70135*a* of the replenishment port shutter 7013 illustrated on the left side in FIG. 10A abuts the projection portion 70125*a*, and thus the rotation of the replenishment port shutter 7013 beyond 180° in the R2 direction is restricted.

In the state in which the discharge portion 42 of the toner pack 40 has been rotated by 180° in the R2 direction, the position of the cutout portion of the discharge portion 42 and the position of the cutout portion of the shutter member 41 are aligned as illustrated in FIG. 12. Therefore, even if the toner pack 40 is moved upward, the shutter member 41 does not interfere with the lid portion 70131 of the replenishment port shutter 7013, and therefore the user can detach the toner pack 40 from the replenishment container attaching portion 701 by grabbing and lifting the toner pack 40.

To be noted, in the course of rotating the replenishment port shutter 7013 by 180° in the R2 direction, the projection portion 70135*a* is separated from the leaf spring 70152, and the rotation detection portion 7015 returns to the disconnected state. Then, the controller 90 recognizes that the replenishment port shutter 7013 has transitioned to the closed state, and operates the pressing mechanism 600 to move the locking member 7014 to the locking position. As a result of this, the replenishment container attaching portion 701 transitions back to the initial state as before the toner replenishment operation is performed. For example, the controller 90 may determine that a predetermined condition to move the locking member 7014 to the lock releasing position is satisfied when a predetermined time has elapsed after the rotation detection portion 7015 has transitioned to the connected state. To be noted, the trigger for moving the locking member 7014 to the locking position may be loss of connection between the contact portion 70133 of the replenishment container attaching portion 701 and the contact portion 45*a* of the toner pack 40 illustrated in FIG. 7 caused by detachment of the toner pack 40 from the replenishment container attaching portion 701.

Although the positional relationship is set such that the discharge port 42*a* of the toner pack 40 and the replenishment port 8012 communicate with each other after the rotation by 180° in the present embodiment, the rotation angle required for the communication may be changed as long as the detachment of the toner pack 40 is made possible by an operation similar to that of the present embodiment.

(1-9) Panel

Next, a panel 400 will be described. For example, the Panel 400 is provided on the front surface of the casing of the printer body 100 as illustrated in FIGS. 1B and 14A to 14C. The panel 400 is an example of a display portion that displays information related to the remainder amount of toner in the developer container 32, or a remaining capacity of the developer container 32. The panel 400 is constituted by a liquid crystal panel including a plurality of indicators. In the present embodiment, three indicators 4001, 4002, and 4003 are arranged in this order from the upper side to the lower side in the vertical direction. The panel 400 indicates the amount of toner that can be added to the developer container 32 for replenishment by the display of the indicators 4001 to 4003 that changes stepwise. The controller 90 constantly updates the display of the panel 400 on the basis of replenishment operation completion recognition that will be described later. In addition, in the case where the completion of the replenishment operation is not reflected on the toner remainder amount, the toner remainder amount may be detected subsequently, and the display of the panel 400 may be updated. For example, in the case where the controller 90 has detected by an optical sensor denoted by 51*a* and 51*b* that actually the toner has not been sufficiently replenished after the light of the indicator 4002 has been turned on, the controller 90 updates the display of the panel 400 by turning off the light of the indicator 4002. In addition, the lowermost indicator 4003 also indicates whether the toner in the developer container 32 is at a Low level or at an Out level. To be noted, the Low level is a level at which, although the developer container 32 needs to be replenished with toner, at least toner of an amount required for maintaining the image quality remains and the image forming operation can be still performed. The Out level is a level at which almost no toner remains in the developer container 32 and the image forming operation cannot be performed.

In the illustrated configuration example of the panel 400, lights of the three indicators 4001 to 4003 all being off indicates that the toner in the developer container 32 is at the Out level. This state serves as a fourth state.

Figure 14A:
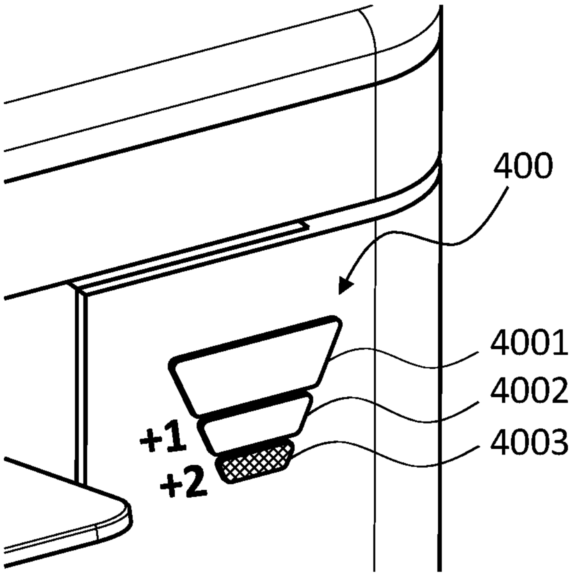
FIG. 14A is a diagram illustrating a panel according to the first embodiment.

In the case where only the light of the lower indicator 4003 is on as illustrated in FIG. 14A, the toner remainder amount in the developer container 32 is at the Low level. In this state, lights of two of the indicators are off, and therefore it can be seen that toner of an amount corresponding to two toner packs 40 can be added for replenishment. This state serves as a third state. In addition, it can be also seen that toner of an amount corresponding to two toner packs 40 can be added for replenishment from the fact that lights of number panels "+1" and "+2" next to the indicators are on.

Figure 14B:
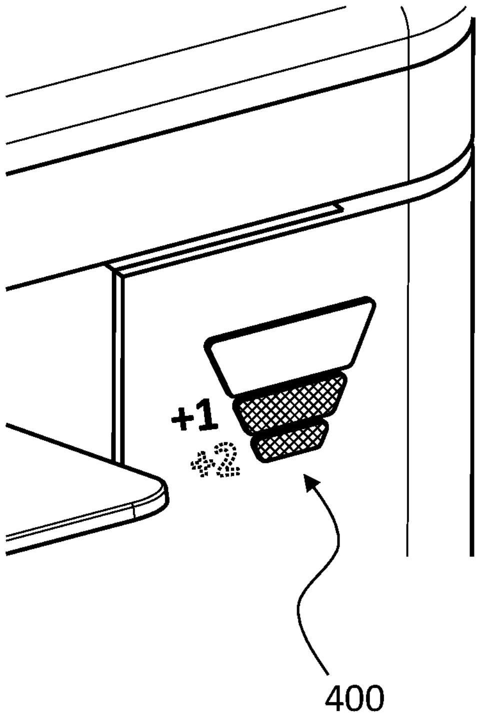
FIG. 14B is a diagram illustrating the panel according to the first embodiment.

In the case where lights of the middle and lower indicators 4002 and 4003 are on and the light of the upper indicator 4001 is off as illustrated in FIG. 14B, the toner remainder amount in the developer container 32 is larger than that of the Low level and smaller than that of a Full level in which the developer container 32 is full. In this state, the light of one indicator is off, and therefore it can be seen that, for example, toner of an amount corresponding to one toner pack 40 can be added for replenishment. This state serves as a second state. In addition, it can be also seen that toner of an amount corresponding to one toner pack 40 can be added for replenishment from the fact that the light of the number panel "+1" next to an indicator is on and the light of the number panel "+2" next to an indicator is off.

Figure 14C:
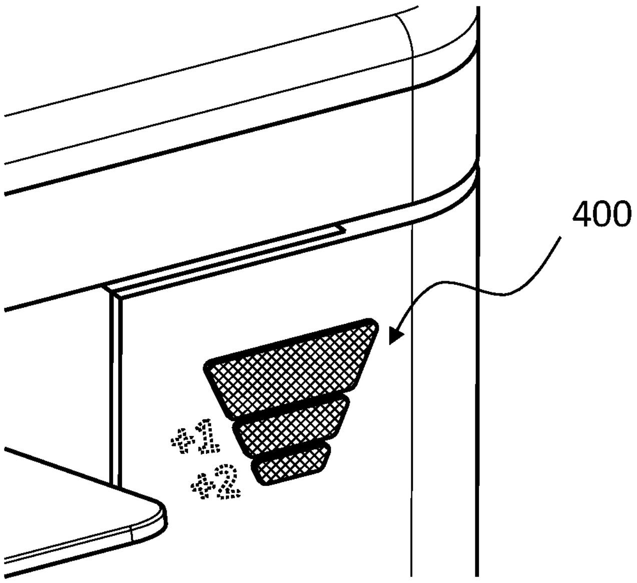
FIG. 14C is a diagram illustrating the panel according to the first embodiment.

In the case where all the three indicators 4001 to 4003 are on as illustrated in FIG. 14C, the toner remainder amount in the developer container 32 is at the Full level. In this state, light of no indicator is off, and therefore it can be seen that, for example, no toner can be added for replenishment from the toner pack 40. This state serves as a first state. In addition, it can be also seen that no toner can be added for replenishment from the toner pack 40 from the fact that the lights of the number panels "+1" and "+2" next to the indicators are off.

To be noted, the panel 400 illustrated in FIGS. 14A to 14C is an example of a display portion whose display content changes in accordance with the toner remainder amount in the developer container 32, and a different configuration may be employed. For example, the panel may be constituted by a combination of a light source such as an LED or an incandescent lamp and a diffusion lens instead of a liquid crystal panel. Alternatively, a configuration in which the indicators are omitted and only the number panels are used or a configuration in which the number panels are omitted and only the indicators are used may be employed.

In addition, the number and display method of the indicators of the panel 400 may be appropriately modified. For example, the user may be prompted to replenish toner by flickering the light of the lower indicator in the case where the toner remainder amount in the developer container 32 is at the Low level.

(2) First Modification Example

Next, a first modification example in which a toner bottle unit having a bottle shape is used as another example of a replenishment container instead of the toner pack having a bag shape will be described with reference to FIGS. 15A to 15D. To be noted, this tonner bottle unit is configured to be attachable to and detachable from the replenishment container attaching portion 701 described above similarly to the toner pack 40 described above. Therefore, description of elements of the image forming apparatus that are the same as in the first embodiment will be omitted.

(2-1) Configuration of Toner Bottle Unit

Figure 15A:
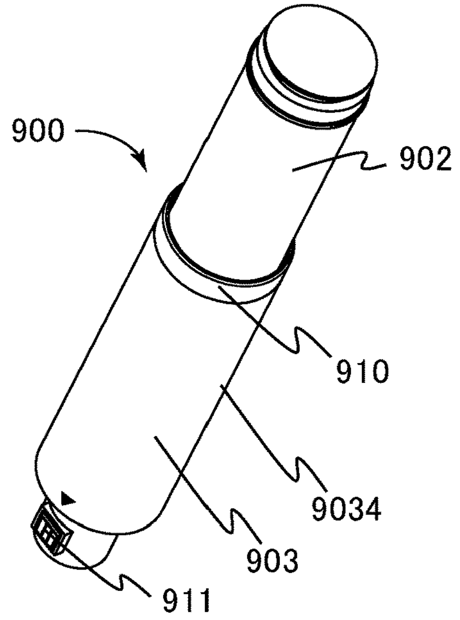
FIG. 15A is a perspective view of a toner bottle unit according to a first modification example.
Figure 15B:
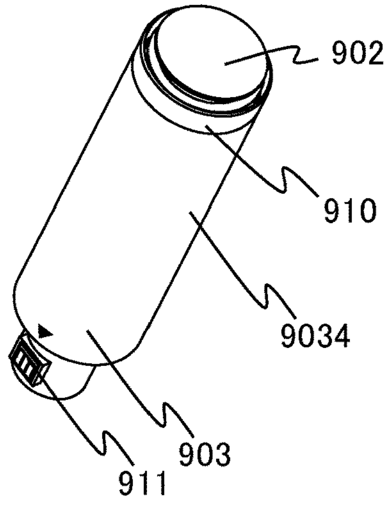
FIG. 15B is a perspective view of the toner bottle unit according to the first modification example.
Figure 15C:
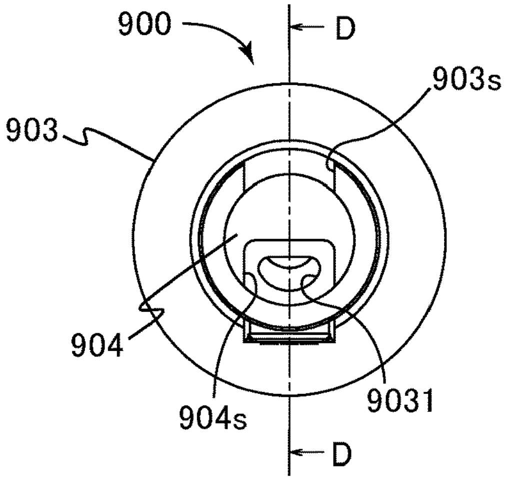
FIG. 15C is a side view of the toner bottle unit according to the first modification example.

FIG. 15A is a perspective view of a toner bottle unit 900 illustrating the external appearance thereof, and FIG. 15B is a perspective view of the toner bottle unit 900 after discharge of toner. FIG. 15C is a diagram illustrating the toner bottle unit 900 as viewed from the lower side of a piston, and FIG. 15D is a section view of the toner bottle unit 900 taken along a line D-D of FIG. 15C.

Figure 16A:
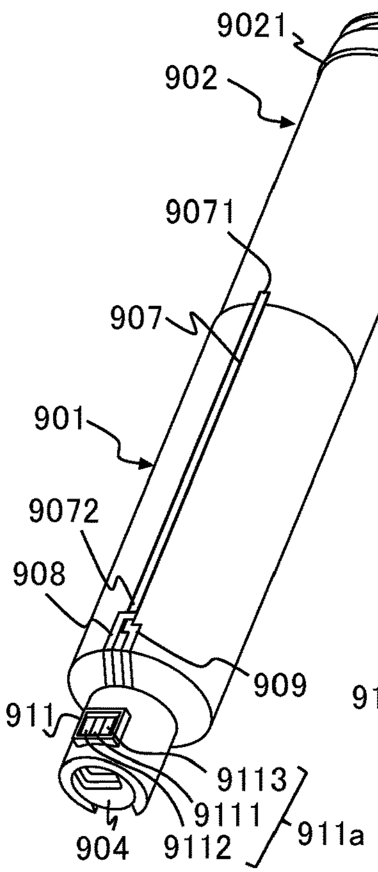
FIG. 16A is a diagram for describing an inner configuration of the toner bottle unit according to the first modification example.
Figure 16B:
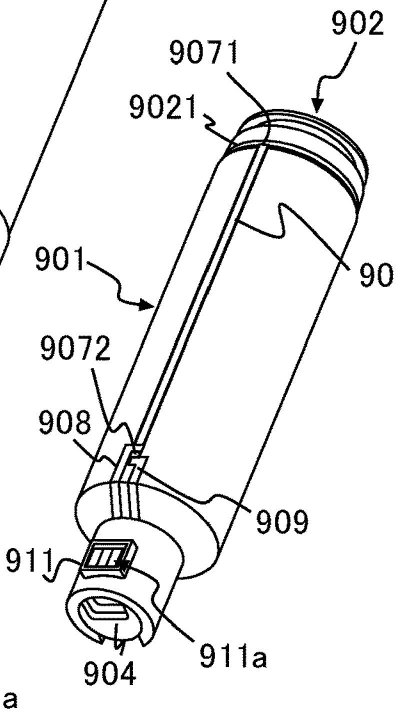
FIG. 16B is a diagram for describing the inner configuration of the toner bottle unit according to the first modification example.
Figure 16C:
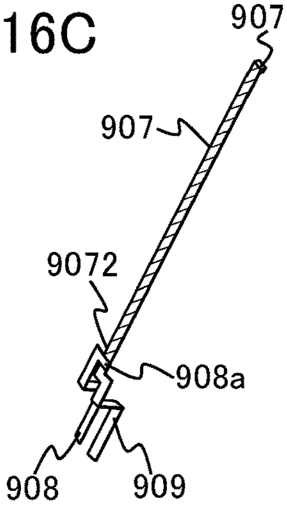
FIG. 16C is a diagram for describing the inner configuration of the toner bottle unit according to the first modification example.
Figure 16D:
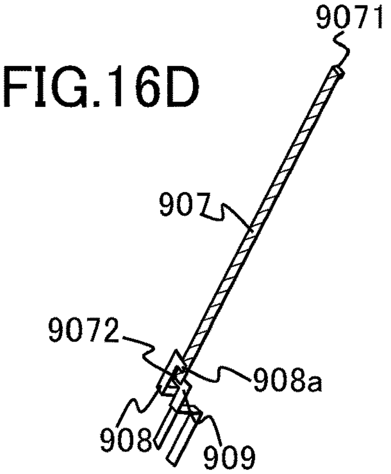
FIG. 16D is a diagram for describing the inner configuration of the toner bottle unit according to the first modification example.
Figure 16E:
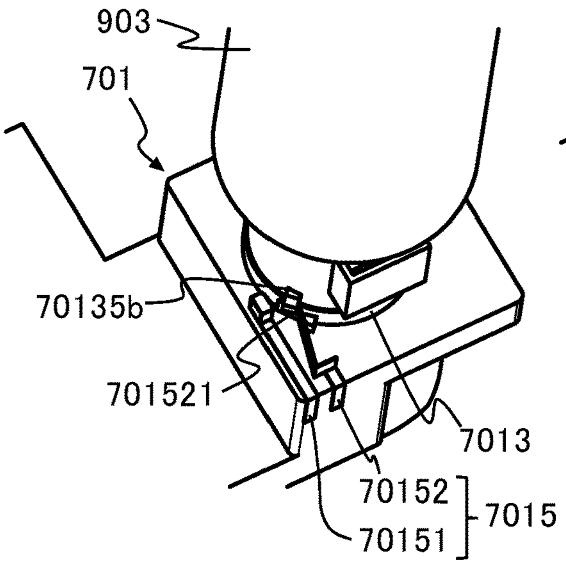
FIG. 16E is a diagram for describing detection of rotation of the toner bottle unit.
Figure 16F:
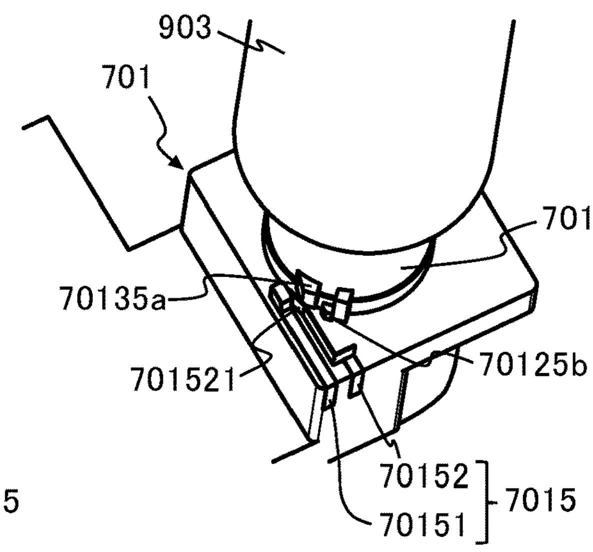
FIG. 16F is a diagram for describing detection of rotation of the toner bottle unit.

In addition, FIG. 16A is a perspective view of the toner bottle unit 900 in which illustration of an outer cylinder 903 illustrated in FIG. 15A is omitted, and FIG. 16B is a perspective view of the toner bottle unit 900 after the discharge of toner in which illustration of the outer cylinder 903 is omitted. FIG. 16C is a diagram illustrating a state before a push-in operation of a component related to push-in detection of the toner bottle unit 900, and FIG. 16D is a diagram illustrating a state after the push-in operation of the component related to push-in detection. FIG. 16E is a diagram illustrating a state before a rotating operation of a component related to rotation detection of the toner bottle unit 900, and FIG. 16F is a diagram illustrating a state after the rotating operation of the component related to the rotation detection of the toner bottle unit 900.

Figure 15D:
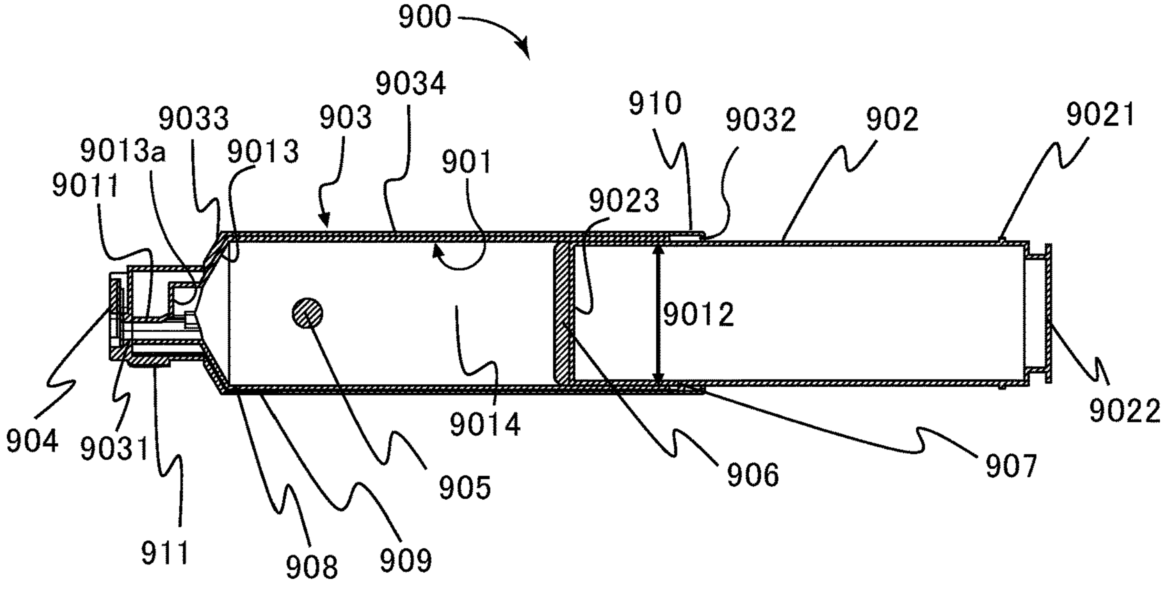
FIG. 15D is a section view of the toner bottle unit according to the first modification example.

As illustrated in FIGS. 15A and 15D, the toner bottle unit 900 roughly includes the outer cylinder 903, an inner cylinder 901, a piston 902, a shutter member 904, and a memory unit 911. The outer cylinder 903 and the inner cylinder 901 have cylindrical shapes, the inner cylinder 901 is fit inside the outer cylinder 903, and the piston 902 is fit inside the inner cylinder 901 and is slidable with respect to the inner cylinder 901. In the description below, the direction in which the piston 902 moves, that is, the direction of the axis of the outer cylinder 903 and the inner cylinder 901 will be referred to as the axial direction of the toner bottle unit 900. In addition, the piston 902 serves as an example of a pressing member.

The inner cylinder 901 includes a toner storage portion 9014 that has a cylindrical shape and stores toner, a bottom portion 9013 provided on a first end side in the axial direction, and a discharge port 9011 provided in the bottom portion 9013. The inner cylinder 901 has a cylindrical shape in which a first end portion of the toner storage portion 9014 in the axial direction is closed by the bottom portion 9013. An opening portion 9012 is provided on a second end side of the toner storage portion 9014, and the piston 902 is inserted in the toner storage portion 9014 through the opening portion 9012. In addition, a weight member 905 having a spherical shape and movable in the toner storage portion 9014 is included in the inner cylinder 901.

The outer cylinder 903 includes an inner cylinder accommodating portion 9034 having a cylindrical shape that accommodates the toner storage portion 9014 of the inner cylinder 901 therein, a bottom portion 9033 provided on the first end side in the axial direction, and a discharge port 9031 provided in the bottom portion 9033. The outer cylinder 903 has a cylindrical shape in which a first end portion of the inner cylinder accommodating portion 9034 in the axial direction is closed by the bottom portion 9033 similarly to the inner cylinder 901, and holds the inner cylinder 901 relatively unmovably. An opening portion 9032 through which the piston 902 is inserted is provided on the second end side of the inner cylinder accommodating portion 9034.

The discharge port 9011 of the inner cylinder 901 has a thin cylindrical shape extending from the bottom portion

9013 toward the first end side in the axial direction. The discharge port 9031 of the outer cylinder 903 is provided at a position corresponding to the discharge port 9011 of the inner cylinder 901 in the bottom portion 9033. The discharge port 9031 of the outer cylinder 903 is a discharge port through which the toner stored in the toner storage portion 9014 is discharged to the outside of the toner bottle unit 900. To be noted, a retracting space 9013*a* for the weight member 905 to retract into so as not to block the discharge port 9011 when pushing the piston 902 in is provided adjacent to the discharge port 9011 of the inner cylinder 901.

To be noted, the bottom portion 9013 of the inner cylinder 901 has an inclined shape whose sectional area is smaller on the discharge port side in the axial direction, particularly a conical shape whose inner diameter is smaller on the discharge port side in the axial direction. The bottom portion 9033 of the outer cylinder 903 opposing the bottom portion 9013 of the inner cylinder 901 also has a similar inclined shape. The discharge port 9011 of the inner cylinder 901 and the retracting space 9013*a* are provided at a vertex portion of the inclined shape of the bottom portion 9033. The weight member 905 has a spherical shape, and is guided by the bottom portion 9013 to move to the retracting space 9013*a* by the gravity.

The piston 902 includes an elastic member 906 attached to a first end portion 9023 on the first end side in the axial direction, that is, on the discharge port side, and a push-in rib 9021 provided in the vicinity of a second end portion 9022 on the second end side, which is a part that the user pushes when pushing in the piston 902. The elastic member 906 is configured to come into contact with the inner circumferential surface of the toner storage portion 9014 with no gap therebetween, and has a function of suppressing leakage of toner when pushing in the piston 902. In addition, the push-in rib 9021 is a projection shape projecting outward in the radial direction from the outer circumferential surface of the piston 902.

The configuration of the shutter member 904 is similar to that of the shutter member 41 provided in the toner pack 40 described above. That is, as illustrated in FIG. 15C, the shutter member 904 has a shape of a disk partially cut out and relatively rotatable with respect to the outer cylinder 903. A side surface of the shutter member 904 extending in the thickness direction in the cutout portion functions as an engagement surface 904*s*. Meanwhile, the outer cylinder 903 also has a shape with a cutout. The outer cylinder 903 includes an engagement surface 903*s* parallel to the engagement surface 904*s* in the cutout portion. In addition, the discharge port 9031 is provided at a position away from the engagement surface 903*s* by approximately 180° in the circumferential direction of the outer cylinder 903.

FIG. 15C illustrates a state in which the discharge port 9031 is already exposed, but in the state at the time when the toner bottle unit 900 is shipped, the positions of the cutout engagement surfaces 903*s* and 904*s* of the shutter member 904 and the outer cylinder 903 are aligned. In this case, the discharge port 9031 is covered by the shutter member 904, and the sealed state of the toner storage portion 9014, that is, the closed state is maintained. As illustrated in FIG. 15C, when the shutter member 904 is rotated by 180° with respect to the outer cylinder 903, the discharge port 9031 is exposed through the cutout portion of the shutter member 904, thus the sealing of the toner storage portion 9014 is cancelled, and it becomes possible to discharge the toner. This state corresponds to the open state. The configuration of the discharge port 9031, the engagement surface 903*s*, and the shutter member 904 are basically the same as the configuration described with reference to FIGS. 7A to 8C and 12.

A memory unit 911 serving as a storage portion that stores information of the toner bottle unit 900 is attached to a portion near the discharge port 9031 of the outer cylinder 903. The memory unit 911 includes a plurality of metal plates 9111, 9112, and 9113 illustrated in FIG. 16A exposed to the outside of the toner bottle unit 900 as a contact portion 911*a* that comes into contact with the contact portion 70133 of the replenishment container attaching portion 701 illustrated in FIG. 9A.

(2-2) Push-In Detection Mechanism of Piston

In addition, as illustrated in FIGS. 16A and 16C, as a push-in detection mechanism that detects a push-in operation of the piston 902, a push-in detection rod 907, a first contact plate 908, and a second contact plate 909 are disposed between the outer cylinder 903 and the inner cylinder 901. The push-in detection rod 907 is formed from an insulating material such as a resin, and the first contact plate 908 and the second contact plate 909 are formed from a conductive material such as metal. The push-in detection rod 907 includes a contact cancelling portion 9072 on the first end side in the axial direction, that is, on the discharge port side, and a piston contact portion 9071 capable of abutting the push-in rib 9021 of the piston 902 on the second end side in the axial direction. The push-in detection rod 907 moves in the axial direction in accordance with the push-in operation of the piston 902 as a result of the push-in rib 9021 pressing the piston contact portion 9071.

For example, the push-in detection rod 907 is fit in a groove shape defined in the axial direction in the outer circumferential surface of the inner cylinder 901 or the inner circumferential surface of the outer cylinder 903, and is thus held so as to be movable in the axial direction with respect to the inner cylinder 901 and the outer cylinder 903 while the movement of the push-in detection rod 907 in a direction perpendicular to the axial direction is restricted. In addition, the piston contact portion 9071 has a shape bent perpendicularly to the axial direction, that is, a shape bent into an L shape such that the push-in rib 9021 more reliably abuts the piston contact portion 9071. To be noted, although the push-in rib 9021 is provided to extend all around the piston 902 on the outer circumferential surface of the piston 902 in FIG. 16A, a configuration in which the push-in rib 9021 is formed in only a position corresponding to the piston contact portion 9071 in the circumferential direction may be employed.

The first contact plate 908 and the second contact plate 909 are metal plates whose connected state and disconnected state are switched in accordance with the position of the push-in detection rod 907 formed from an insulating resin. A brand-new product detection method of the toner bottle unit 900 using the first contact plate 908 and the second contact plate 909 will be described later.

In addition, a cylinder cover 910 illustrated in FIG. 15A is provided at an end portion of the outer cylinder 903 on the opening portion side so as to suppress dropping of the push-in detection rod 907. That is, the cylinder cover 910 defining the opening portion 9032 of the outer cylinder 903 is narrowed such that the edge of the opening portion 9032 is further on the inside than the outer edge of the piston contact portion 9071 illustrated in FIG. 16B in the radial direction as illustrated in FIG. 15D. Therefore, even when a force to move the push-in detection rod 907 toward the opening portion side in the axial direction is applied, the piston contact portion 9071 interferes with the cylinder cover 910, and therefore the push-in detection rod 907 does not drop from the toner bottle unit 900.

(2-3) Brand-New/Used Determination of Toner Bottle Unit

Next, a configuration for detecting whether the toner bottle unit 900 is unused, that is, brand-new, or used when attaching the toner bottle unit 900 to the replenishment container attaching portion 701 will be described. As illustrated in FIGS. 16C and 16D, the contact cancelling portion 9072 of the push-in detection rod 907 is positioned near the first contact plate 908 and the second contact plate 909.

FIG. 16C corresponds to a state before the piston push-in illustrated in FIG. 16A, and the first contact plate 908 and the second contact plate 909 are in contact with each other and thus are in the connected state. At this time, it is preferable that the one of the first contact plate 908 and the second contact plate 909 that are formed from metal is formed in a leaf spring shape and is in pressure contact with the other. In addition, for example, the conduction between the first contact plate 908 and the second contact plate 909 can be made more reliable by applying a conductive grease on the contact surfaces of the first contact plate 908 and the second contact plate 909.

FIG. 16D corresponds to a state after the piston push-in illustrated in FIG. 16B, and the first contact plate 908 and the second contact plate 909 are in the disconnected state. In this state, the contact cancelling portion 9072 of the push-in detection rod 907 pushed in by the push-in rib 9021 gets between the first contact plate 908 and the second contact plate 909, and thus physically separate the first contact plate 908 and the second contact plate 909. At least the contact cancelling portion 9072 of the push-in detection rod 907 is formed from an insulating material, and the conduction between the first contact plate 908 and the second contact plate 909 is disconnected in the state of FIG. 16D in which the contact cancelling portion 9072 is present therebetween.

The first contact plate 908 and the second contact plate 909 are connected to different metal plates among the plurality of metal plates 9111 to 9113, at end portions opposite to end portions that come into contact with the contact cancelling portion 9072 of the push-in detection rod 907. Here, the first contact plate 908 is connected to the metal plate 9111, and the second contact plate 909 is connected to the metal plate 9113. In this case, whether the toner bottle unit 900 is in a state before the piston push-in or in a state after the piston push-in, that is, whether the toner bottle unit 900 is unused or used can be determined by detecting whether a current is generated when a minute voltage is applied between the metal plates 9111 and 9113. That is, in a state in which the toner bottle unit 900 is attached to the replenishment container attaching portion 701, the controller 90 of the image forming apparatus 1 can determine whether the toner bottle unit 900 is used or unused, on the basis of presence/absence of conduction between the metal plates 9111 and 9113. In addition, the controller 90 can determine that the replenishment operation by the user has been finished, on the basis of disconnection between the first contact plate 908 and the second contact plate 909. On the basis of this determination, the controller 90 performs display control of the panel 400 described above. In addition, the controller 90 writes, in the memory unit 45 and in accordance with the change in the conduction between the metal plates 9111 and 9113, a brand-new product flag indicating whether or not the toner bottle unit 900 is used. The brand-new product flag being 1 corresponds to being brand-new, and the brand-new product flag being 0 corresponds to having been used.

To be noted, in the case of the configuration described above, the memory unit 911 is preferably disposed in a circuit connecting the metal plates 9111 and 9112. As a result of this, the controller 90 of the image forming apparatus can access the memory unit 911 through the metal plates 9111 and 9112 while monitoring the push-in operation of the toner bottle unit 900 via the metal plates 9111 and 9113.

(2-4) Rotation Detection of Toner Bottle Unit

Next, a method for detecting the rotation of the toner bottle unit 900 will be described with reference to FIGS. 16E and 16F. To be noted, the rotation detection method of the present embodiment is the same as in the embodiment described above in which the toner pack 40 is used, except that the shutter member 904 that seals the discharge port of the replenishment container is attached to the outer cylinder 903 of the toner bottle unit 900.

As illustrated in FIGS. 16E and 16F, the two conductive leaf springs 70151 and 70152 are provided in the replenishment container attaching portion 701 of the process cartridge 20 as the rotation detection portion 7015. In addition, the projection portion 70135*b* is provided on an outer peripheral portion of the replenishment port shutter 7013.

As illustrated in FIG. 16E, in a state before the toner bottle unit 900 inserted in the replenishment container attaching portion 701 is rotated, the distal end portion 701521 of the leaf spring 70152 is not in contact with the leaf spring 70151, and therefore the rotation detection portion 7015 is in the disconnected state. That is, no current flows when a minute voltage is applied between the leaf springs 70151 and 70152. As illustrated in FIG. 16F, when the toner bottle unit 900 is rotated by 180°, the leaf spring 70152 is pressed by the projection portion 70135*a*, thus the distal end portion 701521 comes into contact with the leaf spring 70151, and the rotation detection portion 7015 is switched to the connected state. In this state, a current flows when a minute voltage is applied between the plate springs 70151 and 70152. The controller 90 of the image forming apparatus 1 recognizes whether or not the discharge port 9031 of the toner bottle unit 900 and the replenishment port 8012 of the replenishment container attaching portion 701 communicate with each other, on the basis of whether the rotation detection portion 7015 is in the connected state or in the disconnected state.

(2-5) Flow of Replenishment Operation Using Toner Bottle Unit

A series of operation for detaching the toner bottle unit 900 after attaching the toner bottle unit 900 to the replenishment container attaching portion 701 and replenishing toner will be described. To be noted, description of elements same as in the embodiment described above where the toner pack 40 is used will be omitted.

First, the user attaches an unused toner bottle unit 900 to the replenishment container attaching portion 701. Specifically, the cutout engagement surfaces 903*s* and 904*s* of the outer cylinder 903 and the shutter member 904 illustrated in FIG. 15C are aligned with the replenishment port 8012 and the lid portion 70131 of the replenishment port shutter 7013, and the toner bottle unit 900 is inserted. In this case, the engagement surface 903*s* of the outer cylinder 903 engages with the engagement surface 7013*s*, which is a side surface of the lid portion 70131, and the engagement surface 904*s* of the shutter member 904 engages with the engagement surface 8012*s* provided on an outer peripheral portion of the replenishment port 8012. At this time, the outer cylinder 903 engaging with the lid portion 70131 of the replenishment port shutter 7013 is unrotatable until the lock of the replenishment port shutter 7013 by the locking member 7014 is released later, and becomes rotatable together with the replenishment port shutter 7013 after the release of the lock. In addition, the shutter member 904 is in an unrotatable state by engaging with the replenishment port 8012 fixed to the frame member 8010 of the toner receiving unit 801. Further, the leaf springs 70151 and 70152 of the rotation detection portion 7015 are away from each other, and the rotation detection portion 7015 is in the disconnected state as illustrated in FIG. 16E.

In the case where an unused toner bottle unit 900 is inserted in the replenishment container attaching portion 701, the controller 90 recognizes that the toner bottle unit 900 is brand-new by the brand-new product detection mechanism described above. The controller 90 may recognize the conduction between the metal plates 9111 and 9113 or make determination by reading the brand-new product flag in the memory unit 45. The brand-new product flag being 1 corresponds to being brand-new, and the brand-new product flag being 0 corresponds to having been used. In this case, the controller 90 operates the pressing mechanism 600 to move the locking member 7014 to the lock releasing position, and thus the toner bottle unit 900 becomes rotatable.

Then, when the user grabs the toner bottle unit 900 and rotates the toner bottle unit 900 by 180°, the shutter member 904 and the replenishment port shutter 7013 are opened, and the discharge port 9031 of the toner bottle unit 900 and the replenishment port 8012 of the replenishment container attaching portion 701 communicate with each other. The operation of opening the shutter member 904 and the replenishment port shutter 7013 in accordance with the rotation of the toner bottle unit 900 is similar to the case of the toner pack 40 described with reference to FIGS. 10A and 10B.

As illustrated in FIG. 16F, in a state in which the toner bottle unit 900 is rotated by 180°, the distal end portion 701521 of the leaf spring 70152 pressed by the projection portion 70135*b* of the replenishment port shutter 7013 comes into contact with the leaf spring 70151. When the rotation detection portion 7015 is switched to the connected state in this manner, the controller 90 of the image forming apparatus 1 detects that the rotation operation of the toner bottle unit 900 has been performed. That is, the controller 90 recognizes that the sealing by the shutter member 904 and the replenishment port shutter 7013 has been cancelled and the discharge port 42*a* of the toner pack 40 and the replenishment port 8012 of the replenishment container attaching portion 701 communicate with each other. In addition, the controller 90 operates the pressing mechanism 600 to move the locking member 7014 to the locking position, and thus restricts the rotation of the toner bottle unit 900.

Next, the user presses the piston 902 of the toner bottle unit 900 to start discharge of toner. The toner having fallen into the toner storage portion 8011 is conveyed inside the toner receiving unit 801 and reaches the developer container 32. Also in the present modification example, when the piston 902 is pushed to the deepest position, the push-in detection mechanism described above detects that the push-in operation of the piston 902 has been completed. That is, as illustrated in FIG. 16B, the push-in rib 9021 of the piston 902 presses the piston contact portion 9071 of the push-in detection rod 907, and thus the push-in detection rod 907 moves accompanied by the piston 902.

Then, as illustrated in FIG. 16D, the contact cancelling portion 9072 of the push-in detection rod 907 disconnects the conduction between the first contact plate 908 and the second contact plate 909. The controller 90 of the image forming apparatus 1 recognizes the completion of the push-in of the piston 902 on the basis of the fact that no longer a current flows even if a voltage is applied between the metal plate 9111 connected to the first contact plate 908 and the metal plate 9113 connected to the second contact plate 909. That is, in the present modification example, detection of completion of the push-in operation of the piston 902 by the push-in detection mechanism serves as a condition for determining that discharge of toner is completed. To be noted, a configuration in which the controller 90 rewrites the brand-new product flag in the memory unit 911 in the case where the conduction between the first contact plate 908 and the second contact plate 909 is disconnected, and determines that the discharge of toner has been completed on the basis of the rewriting of the brand-new flag may be employed.

The controller 90 that has detected the completion of discharge of toner from the toner bottle unit 900 operates the pressing mechanism 600 again to move the locking member 7014 to the lock releasing position, and thus makes the toner bottle unit 900 rotatable. The user grabs the toner bottle unit 900 and rotates the toner bottle unit 900 by 180°. In this case, the discharge port 9031 of the toner bottle unit 900 is covered by the shutter member 904, and the replenishment port 8012 of the replenishment container attaching portion 701 is covered by the lid portion 70131 of the replenishment port shutter 7013. In addition, the leaf springs 70151 and 70152 are separated as illustrated in FIG. 16E, and the rotation detection portion 7015 returns to the disconnected state. Then, the controller 90 recognizes that the replenishment port shutter 7013 has been switched to the closed state, and operates the pressing mechanism 600 to move the locking member 7014 to the locking position. As a result of this, the replenishment container attaching portion 701 returns to the initial state before the toner replenishment.

(3) Second Modification Example

Next, a second modification example in which the configuration of the process cartridge is different will be described. The present modification example has the same elements as in the first embodiment except for elements related to the process cartridge, and therefore description of the same elements will be omitted.

(3-1) Process Cartridge

Figure 17A:
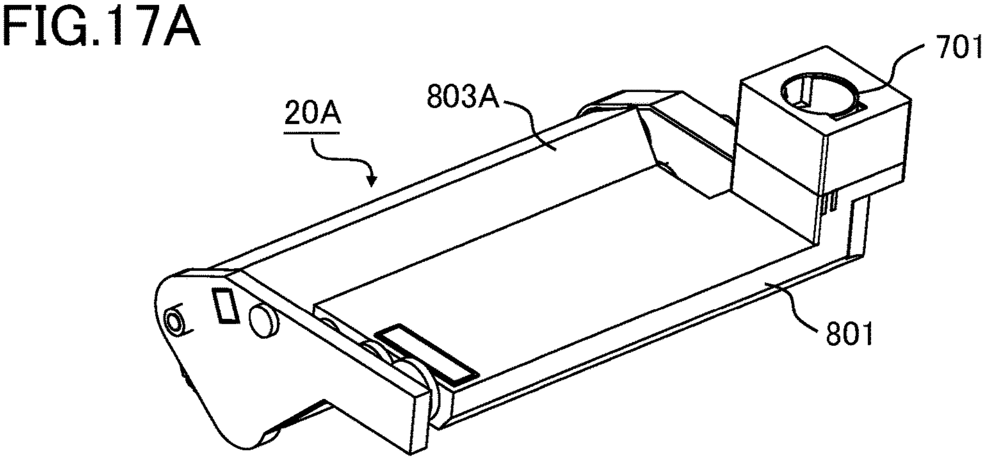
FIG. 17A is a perspective view of a process cartridge according to a second modification example.
Figure 17B:
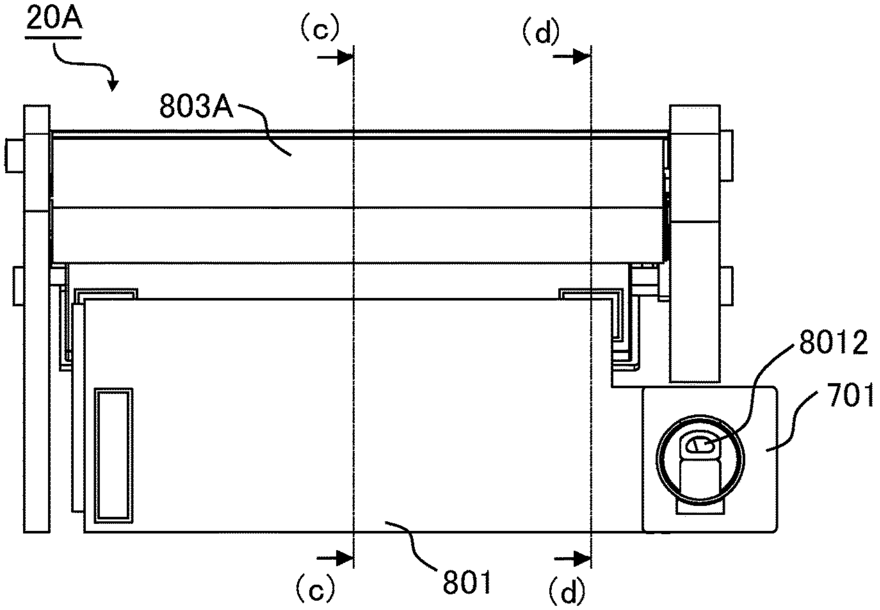
FIG. 17B is a top view of the process cartridge according to the second modification example.
Figure 17C:
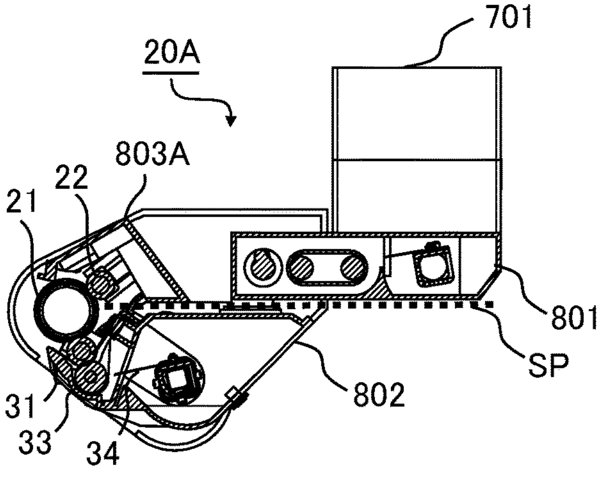
FIG. 17C is a section view of the process cartridge according to the second modification example.
Figure 17D:
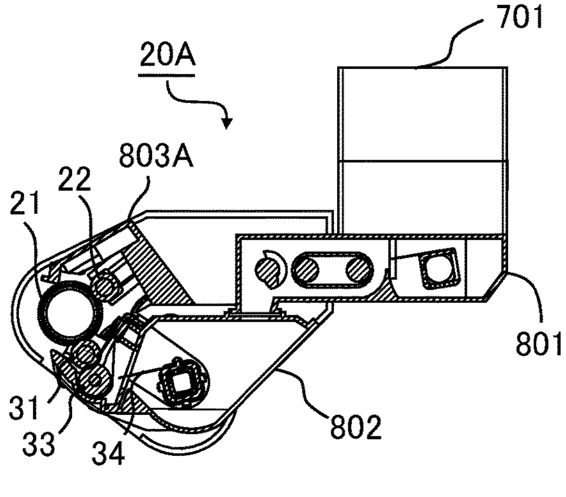
FIG. 17D is a section view of the process cartridge according to the second modification example.

FIGS. 17A to 17D are respectively a perspective view, a side view, a section view, and another section view of a process cartridge 20A according to the present modification example. FIGS. 17C and 17D are section views taken at cutting positions respectively illustrated in FIG. 17B.

As illustrated in FIGS. 17A to 17D, the process cartridge 20A of the present modification example includes the toner receiving unit 801, the developing unit 802, and a drum unit 803A. In contrast with the first embodiment, the drum unit 803A does not include the cleaning blade 24 that cleans the surface of the photosensitive drum 21 or the waste toner chamber 8033 illustrated in FIG. 6A that accommodates waste toner. This is because a cleanerless configuration is employed in the present modification example. In the cleanerless configuration, the transfer residual toner remaining on the surface of the photosensitive drum 21 without being transferred onto the recording material is collected into the developing unit 802 and reused is employed. To be noted, for example, nonmagnetic or magnetic one-component developer is also used herein.

In the illustrated example, the developing unit 802 is positioned in a lower portion of the process cartridge 20A, and the toner receiving unit 801 and the drum unit 803A are positioned above the developing unit 802 in the gravity direction. Although the toner receiving unit 801 and the drum unit 803A do not overlap as viewed in the gravity direction as illustrated in FIG. 17B, the two may be aligned in the up-down direction at least partially. In addition, the toner receiving unit 801 is disposed in the space where the cleaning blade 24 and the waste toner chamber 8033 are provided in the first embodiment. The configuration of the replenishment container attaching portion 701 provided in the toner receiving unit 801 is the same as in the first embodiment, and FIGS. 17A to 17D illustrate a simplified shape thereof.

A laser passing space SP serving as a gap for the laser light L emitted from the scanner unit 11 illustrated in FIG. 1A toward the photosensitive drum 21 to pass through is defined between the developing unit 802, the drum unit 803A, and the toner receiving unit 801. In addition, it is preferable that, in the drum unit 803A, a pre-exposing unit for removing the electrostatic latent image by radiating light onto the surface of the photosensitive drum 21 is disposed downstream of the transfer portion and between the transfer portion and the charging roller 22 in the rotation direction of the photosensitive drum 21.

(3-2) Behavior of Toner in Cleanerless Configuration

The behavior of toner in the cleanerless configuration will be described. The transfer residual toner remaining on the photosensitive drum 21 in the transfer portion is removed in accordance with the following procedure. The transfer residual toner includes a mixture of toner that is positively charged and toner that is negatively charged but does not have enough charges. The charges on the photosensitive drum 21 after transfer is removed by the pre-exposing unit, and by causing uniform electrical discharge from the charging roller 22, the transfer residual toner is charged again to a negative polarity. The transfer residual toner recharged to a negative polarity by the charging portion reaches the developing portion in accordance with the rotation of the photosensitive drum 21. Then, the surface region of the photosensitive drum 21 having passed the charging portion is exposed by the scanner unit 11 and an electrostatic latent image is drawn thereon in a state in which the transfer residual toner is still attached thereto.

Here, the behavior of the transfer residual toner having reached the developing portion will be described for an exposed portion and a non-exposed portion of the photosensitive drum 21 separately. In the developing portion, the transfer residual toner attached to the non-exposed portion of the photosensitive drum 21 is transferred onto the developing roller 31 due to the potential difference between the developing voltage and the potential of the non-exposed portion of the photosensitive drum 21, that is, the dark potential, and is collected into the developer container 32. This is because assuming that the normal charging polarity of the toner is a negative polarity, the polarity of the developing voltage applied to the developing roller 31 is relatively positive with respect to the potential of the non-exposed portion. To be noted, the toner collected into the developer container 32 is dispersed in the toner in the developer container 32 by being agitated by the agitation member 34, and is used for the developing process again by being born on the developing roller 31.

In contrast, the transfer residual toner attached to the exposed portion of the photosensitive drum 21 is not transferred from the photosensitive drum 21 to the developing roller 31 in the developing portion, and remains on the surface of the photosensitive drum 21. This is because assuming that the normal charging polarity of the toner is a negative polarity, the polarity of the developing voltage applied to the developing roller 31 is further negative with respect to the potential of the exposed portion, that is, light potential. The transfer residual toner remaining on the surface of the photosensitive drum 21 is born on the photosensitive drum 21 moved to the transfer portion together with other particles of toner transferred from the developing roller 31 onto the exposed portion, and is transferred onto the recording material in the transfer portion.

By employing the cleanerless configuration, a space for installing a collection container for collecting the transfer residual toner or the like becomes unnecessary, thus the size of the image forming apparatus 1 can be further reduced, and the cost of printing can be reduced by reusing the transfer residual toner.

(4) Third Modification Example

Next, a third modification example in which the configuration of the process cartridge is different from any embodiments described above will be described. The present modification example has the same elements as in the first embodiment except for elements related to the process cartridge, and therefore description of the same elements will be omitted.

(4-1) Third Mode of Process Cartridge

Figure 18A:
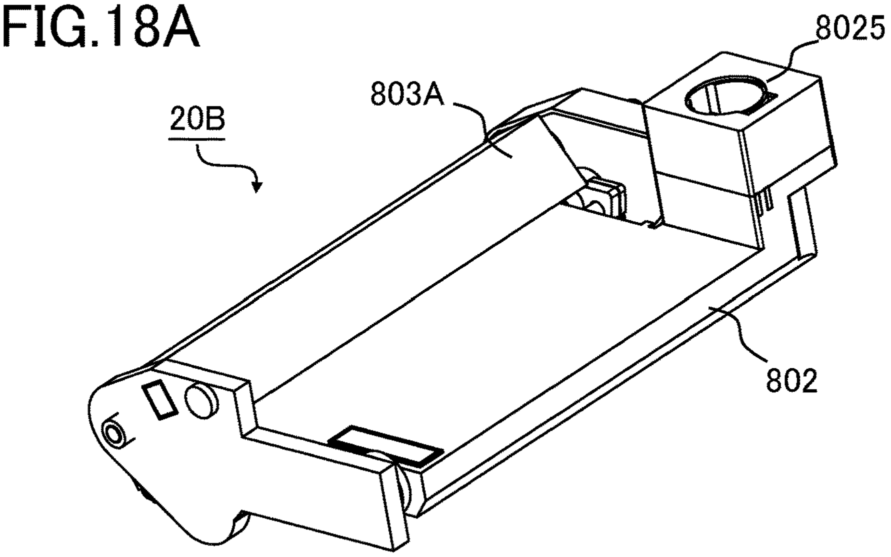
FIG. 18A is a perspective view of a process cartridge according to a third modification example.
Figure 18B:
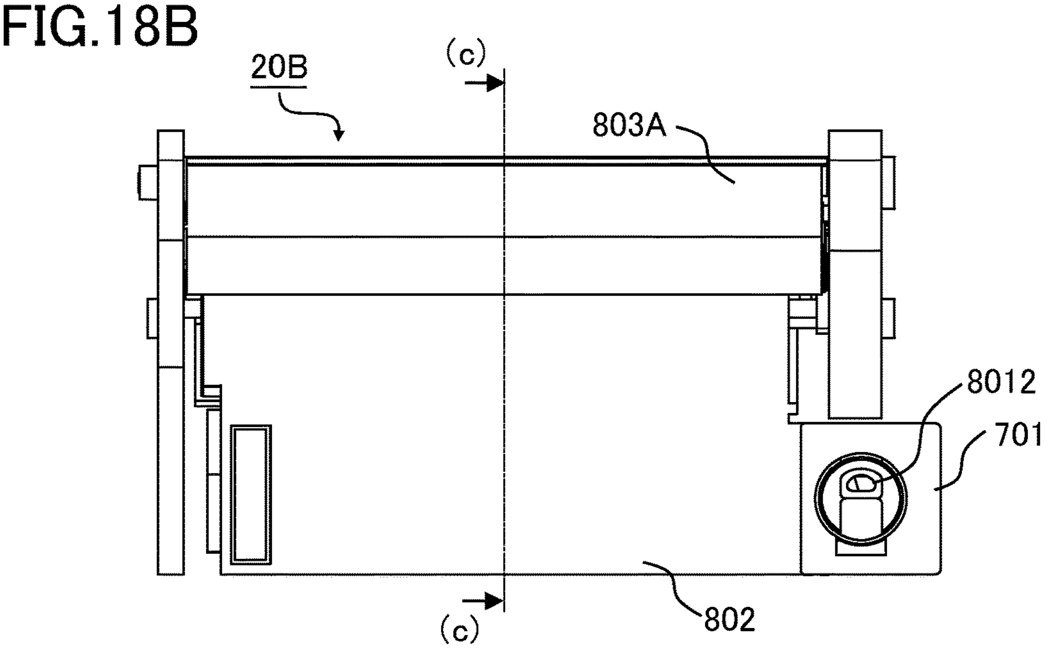
FIG. 18B is a top view of the process cartridge according to the third modification example.
Figure 18C:
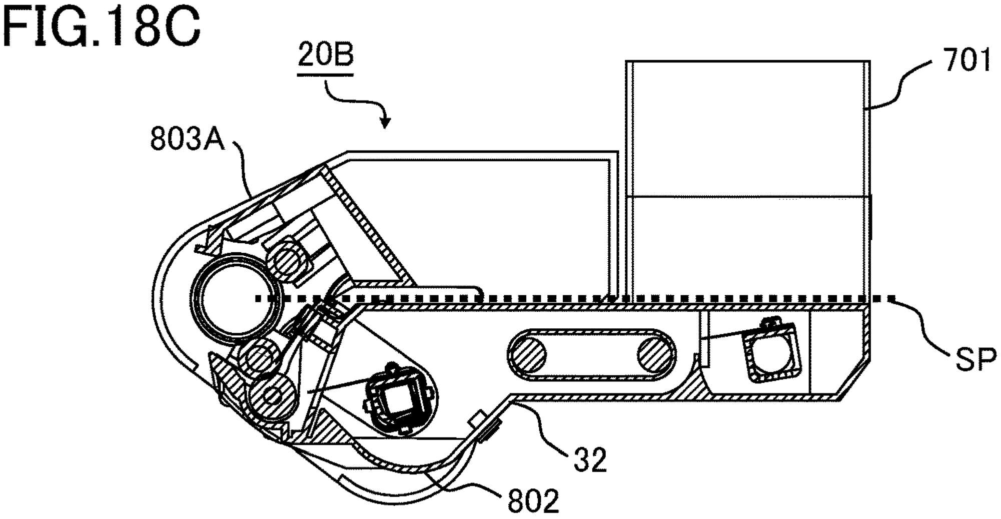
FIG. 18C is a section view of the process cartridge according to the third modification example.

FIGS. 18A to 18C are respectively a perspective view, a side view, and a section view of a process cartridge 20B according to the present modification example. FIG. 18C is a section view taken at a cutting position illustrated in FIG. 18B.

As illustrated in FIGS. 18A to 18C, the process cartridge 20B of the present modification example includes the developing unit 802 and the drum unit 803A. In contrast with the third embodiment, the toner receiving unit 801 is omitted, and the replenishment container attaching portion 701, the first conveyance member 8013, and the second conveyance member 8014 are disposed in the developing unit 802. That is, the present modification example is a configuration in which a replenishment container such as the toner pack 40 or the toner bottle unit 900 is attached to the replenishment port 8012 provided in the developer container 32 from the outside of the image forming apparatus to perform toner replenishment. The configuration of the replenishment container attaching portion 701 is the same as in the first embodiment, and FIGS. 18A to 18C illustrate a simplified shape thereof.

The laser passing space SP serving as a gap for the laser light L emitted from the scanner unit 11 illustrated in FIG. 1A toward the photosensitive drum 21 to pass through is defined between the developing unit 802, the drum unit 803A, and the toner receiving unit 801. In addition, it is preferable that, in the drum unit 803A, a pre-exposing unit for removing the electrostatic latent image by radiating light onto the surface of the photosensitive drum 21 is disposed downstream of the transfer portion and between the transfer portion and the charging roller 22 in the rotation direction of the photosensitive drum 21. A cleanerless configuration is employed in the present modification example. The behavior of toner in the cleanerless configuration is the same as in the second modification example, and therefore the description thereof will be omitted.

(5) Control System of Image Forming Apparatus

Figure 19:
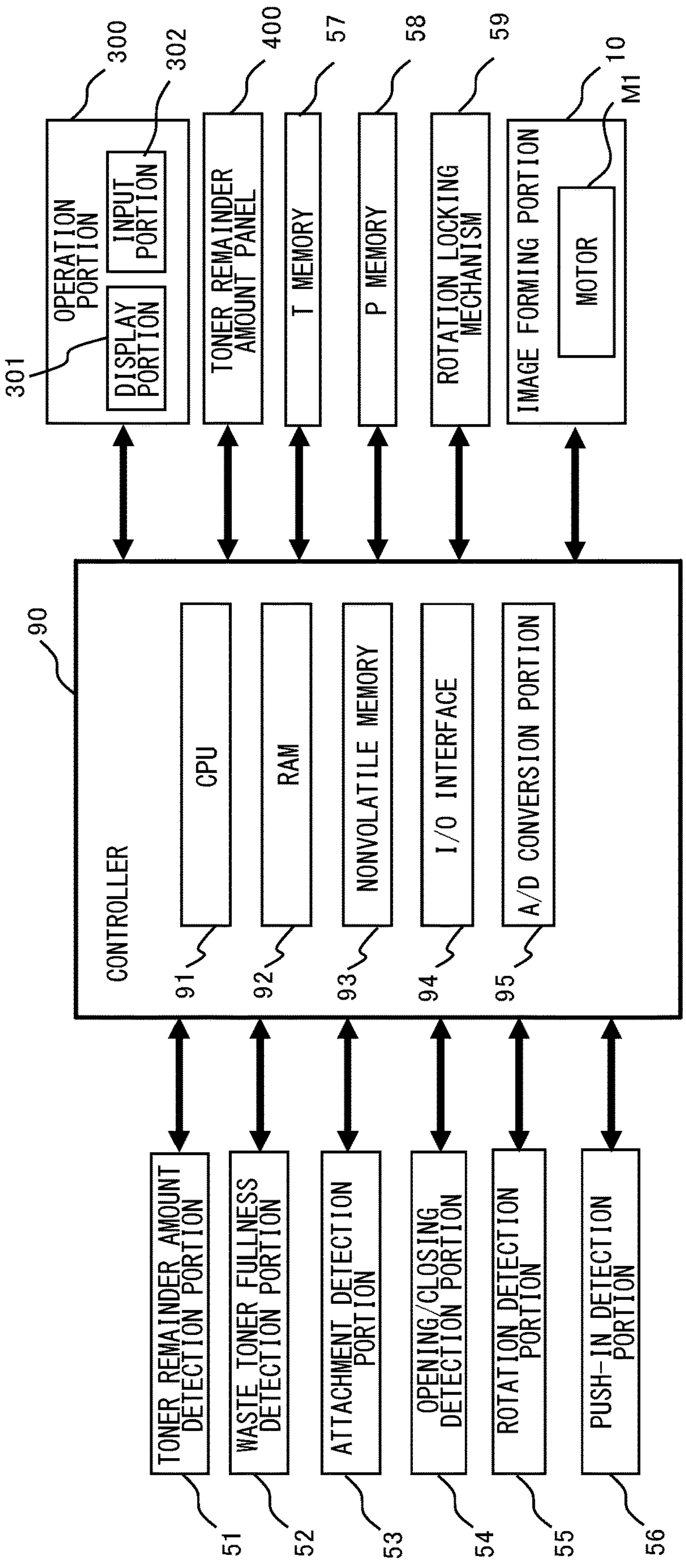
FIG. 19 is a block diagram illustrating a control system of the image forming apparatus according to the first embodiment.

FIG. 19 is a block diagram illustrating a control system of the image forming apparatus 1 according to the first embodiment. The controller 90 serving as a controller of the image forming apparatus 1 includes a central processing unit: CPU 91 serving as a processing device, a random access memory: RAM 92 used as a work area of the CPU 91, and a nonvolatile memory 93 that stores various programs. In addition, the controller 90 includes an I/O interface 94 serving as an input/output port connected to an external device, and an A/D conversion portion 95 that converts an analog signal into a digital signal. The CPU 91 reads out and executes a control program stored in the nonvolatile memory 93, and thus controls each component of the image forming apparatus 1. Therefore, the nonvolatile memory 93 serves as a non-transitory computer-readable recording medium storing a control program for causing an image forming apparatus to operate by a specific method.

In addition, the controller 90 is connected to a T memory 57 and a P memory 58. The T memory 57 is a nonvolatile memory included in a replenishment container such as the toner pack 40 or the toner bottle unit 900, and the P memory 58 is a nonvolatile memory included in the process cartridge 20. Examples of the T memory 57 serving as a storage portion provided in the replenishment container include the memory unit 45 included in the toner pack 40 described above, and the memory unit 911 included in the toner bottle unit 900 described above. In addition, the T memory 57 also stores toner information indicating that the toner stored in the replenishment container such as the toner pack 40 or the toner bottle unit 900 can be supplied to the developer container 32 for replenishment. The toner information is, for example, information describing whether or not the toner pack 40 is unused, and describing the initial amount, expiration date, and the like of the toner. In addition, the P memory 58 stores information of the remainder amount of toner accommodated in the developer container 32, information of the total amount of toner that has been supplied from the replenishment container, information of the lifetime of the photosensitive member, information of the replacement timing of the process cartridge 20, and the like.

Further, the controller 90 is connected to a rotation locking mechanism 59 and the image forming portion 10. Examples of the rotation locking mechanism 59 include the locking member 7014 illustrated in FIGS. 9A to 9C, 11A, and 11B provided in the replenishment container attaching portion 701 and the pressing mechanism 600 illustrated in FIG. 13 that moves the locking member 7014. The image forming portion 10 includes a motor M1 as a drive source that drives the photosensitive drum 21, the developing roller 31, the supply roller 33, the agitation member 34, and the like. To be noted, a single drive source does not have to be shared among these rotary members, and for example, the photosensitive drum 21, the developing roller 31, the supply roller 33, and the agitation member 34 may be respectively driven by different motors. In addition, the image forming portion 10 also includes a power source portion for applying a voltage to each member such as the developing roller 31, and an exposure controller that controls the scanner unit 11.

A toner remainder amount detection portion 51, a waste toner fullness detection portion 52, an attachment detection portion 53, an opening/closing detection portion 54, a rotation detection portion 55, and a push-in detection portion 56 are connected to the input side of the controller 90.

The toner remainder amount detection portion 51 detects the remainder amount of toner accommodated in the developer container 32, and the detection method thereof will be described later. The waste toner fullness detection portion 52 detects that the amount of waste toner accumulated in the waste toner chamber 8033 of the cleaning unit 803 illustrated in FIG. 6A has reached a predetermined upper limit.

The attachment detection portion 53 detects that a replenishment container such as the toner pack 40 is attached to the replenishment container attaching portion 701. For example, the attachment detection portion 53 is constituted by a pressure switch that is provided in the replenishment container attaching portion 701 and outputs a detection signal when pressed by the bottom surface of the toner pack 40. In addition, the attachment detection portion 53 may be a detection circuit that detects that the T memory 57 has been electrically connected to the controller 90 via the contact portion 70133 of the replenishment container attaching portion 701 illustrated in FIGS. 9A to 9C.

The rotation detection portion 55 detects the rotation of the replenishment container attached to the replenishment container attaching portion 701. Examples of the rotation detection portion 55 include the rotation detection portion 7015 constituted by the leaf springs 70151 and 70152 illustrated in FIGS. 9A to 9C and 16A to 16F. The rotation detection portion 7015 is merely an example of the rotation detection portion 55, and alternatively, for example, a photoelectric sensor shielded by a projection portion provided on the replenishment port shutter 7013 may be used as a rotation detection sensor. In addition, as another example of the rotation detection sensor, a configuration in which the conduction between the leaf springs 70151 and 70152 of the rotation detection portion 7015 is caused by a projection portion provided on the discharge portion 42 of the toner pack 40 may be employed.

The push-in detection portion 56 is an element that is additionally provided in the case of using the toner bottle unit 900 as in the first modification example, and detects completion of push-in of the piston 902 of the toner bottle unit 900. Examples of the push-in detection portion 56 include a detection circuit that is provided in the image forming apparatus 1 and detects the change in the state of the push-in detection mechanism illustrated in FIGS. 16A to 16F constituted by the push-in detection rod 907, the first contact plate 908, and the second contact plate 909 provided in the toner bottle unit 900. This detection circuit monitors the value of current generated when a voltage is applied between the metal plates 9111 and 9113 respectively connected to the first contact plate 908 and the second contact plate 909, and thus detects whether the piston 902 has been pushed in or has not been pushed in yet.

In addition, the controller 90 is connected to the operation portion 300 serving as a user interface of the image forming apparatus 1, and the panel 400 serving as a notification portion that notifies the user of information related to the toner remainder amount in the developer container 32. Here, the information related to the toner remainder amount is not limited to information indicating the toner remainder amount itself. In addition to this, examples of the information related to the toner remainder amount include information indicating the amount of toner that has been already supplied from the toner pack 40 or the toner bottle unit 900 for replenishment. In addition, examples of the information related to the toner remainder amount include information indicating the remaining capacity of the developer container 32 that indicates the amount of toner that can be accepted by the developer container 32 for replenishment in terms of the number of toner packs 40 or toner bottle units 900.

The operation portion 300 includes a display portion 301 capable of displaying various setting screens. For example, the display portion 301 is constituted by a liquid crystal panel. Further, the controller 90 is connected to an external device such as a desktop computer of a smartphone via the I/O interface 94.

(6) Control for Calculation of Printable Sheet Number

Next, control performed in toner replenishment in the present embodiment will be described. In the present embodiment, control is performed by converting all parameters related to the amount of usable toner and all parameters related to the amount of wear of members other than toner into printable sheet numbers. Control for calculation of the printable sheet number will be described below. To be noted, although a case where the toner pack 40 is attached to the replenishment port 8012 will be described below as an example, the toner bottle unit 900 may be attached instead of the toner pack 40 as a matter of course.

The controller 90 of the present embodiment includes a counter A01 indicating the printable sheet number obtained from the amount of toner accommodated in the developer container 32, and a counter A02 indicating the printable sheet number obtained from the lifetime of members of the process cartridge 20 other than toner. In addition, the process cartridge 20 includes the P memory 58. The P memory 58 stores a value S01, which is the printable sheet number obtained from the amount of toner accommodated in the developer container 32, and a value S02, which is the printable sheet number obtained from the lifetime of the members of the process cartridge 20 other than toner. In addition, the P memory 58 stores a value D01, which is the printable sheet number obtained from the maximum amount of toner that can be accommodated in the developer container 32 provided in the process cartridge 20.

The toner pack 40 includes the T memory 57. The T memory 57 stores a value PAC02, which is the printable sheet number obtained from the amount of toner accommodated in the toner pack 40. To be noted, the conversion of each toner amount into a printable sheet number is performed on the basis of results of preliminary evaluation on the number of sheets printed until toner of a predetermined amount is completely consumed in the case of performing intermittent printing on regular paper sheets at an image coverage of 4%.

In addition, the printable sheet number obtained from the lifetime of the members of the process cartridge 20 other than toner is calculated on the basis of results of preliminary evaluation made in the conditions of intermittent printing on regular paper sheets at an image coverage of 4% similarly to the case of toner. For example, the printable sheet number representing the number of sheets that can be printed before the photosensitive drum 21 becomes unusable due to wear of a coating layer is set as the value S02. In addition, although the value S02 may be obtained on the basis of the lifetime of any part in the case of not the photosensitive drum 21 but expendable parts of the process cartridge 20, it is preferable that the value S02 is obtained on the basis of the expendable part having the shortest lifetime. For example, the value S02 may be alternatively obtained on the basis of the number of printed sheets, the amount of toner accommodated in the waste toner chamber 8033, and the like after replacing the charging roller 22, the developing roller 31, and the process cartridge 20.

Figure 20:
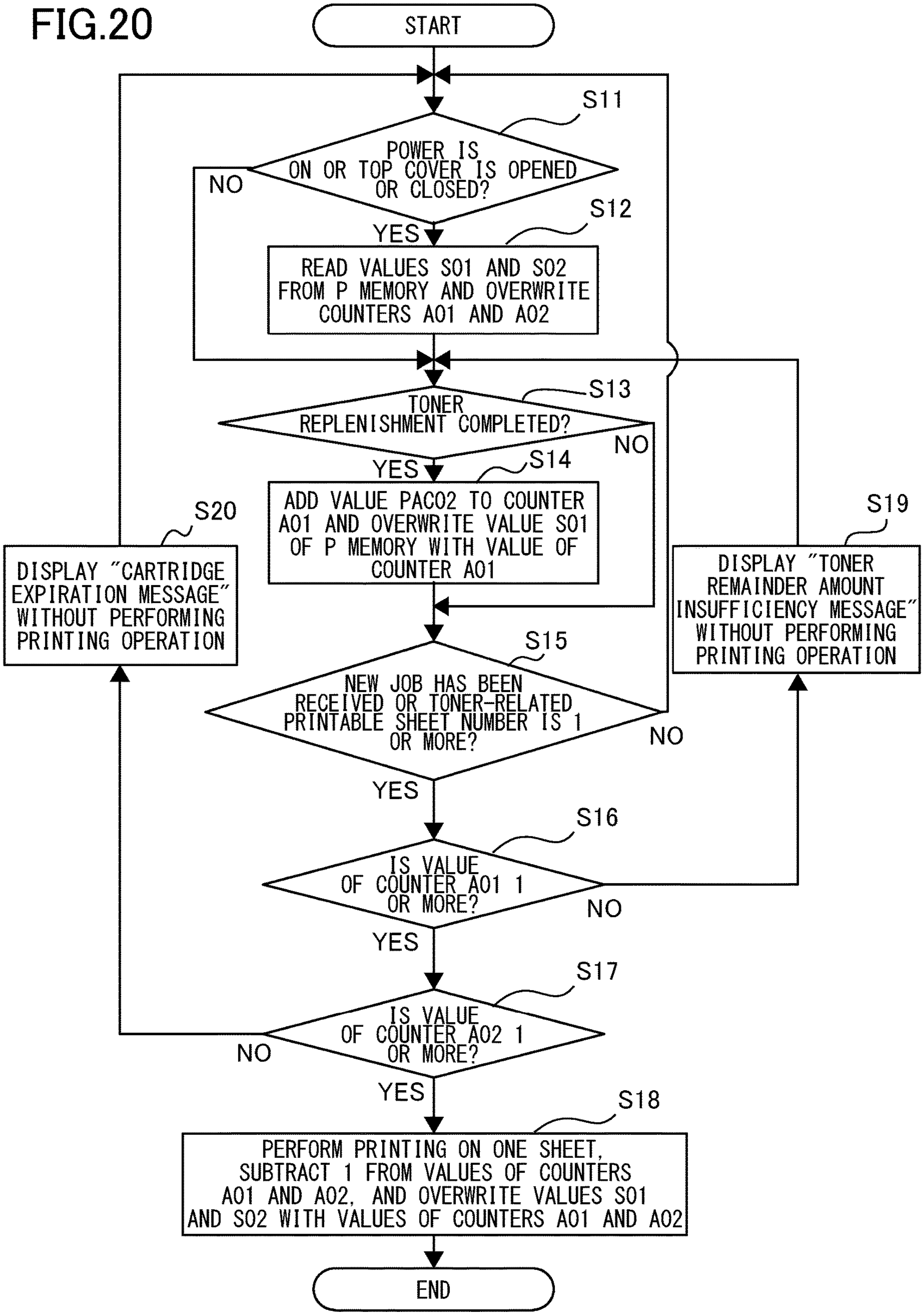
FIG. 20 is a flowchart illustrating calculation control for calculating a counter.

FIG. 20 is a flowchart illustrating calculation control for calculating the values of counters A01 and A02. As illustrated in FIG. 20, when the calculation control is started, the controller 90 determines in step S11 whether or not the power has been turned on or the top cover 82 has been opened or closed. In the case where it has been determined that the power has been turned on or the top cover 82 has been opened or closed, that is, in the case where the result of step S11 is YES, the controller 90 reads out the values S01 and S02 from the P memory 58, and overwrites the counters A01 and A02 respectively with the values S01 and S02 in step S12.

Next, the controller 90 determines in step S13 whether or not the toner replenishment operation that will be described later has been completed. To be noted, in the case where it has not been determined that the power has been turned on or the top cover 82 has been opened or closed in step S11, that is, in the case where the result of step S11 is NO, the controller 90 proceeds to step S13 without performing the processing of step S12.

In the case where it has been determined that the toner replenishment operation has been completed, that is, in the case where the result of step S13 is YES, the controller 90 adds the value PAC02 read from the T memory 57 to the counter A01, and overwrites the value S01 of the P memory 58 with the value of the counter A01 in step S14. Next, the controller 90 determines in step S15 whether or not a new job has been received or a toner-related printable sheet number is 1 or more. The toner-related printable sheet number is a value calculated from the toner remainder amount in the developer container 32 and represents the number of sheets on which printing can be performed before toner in the developer container 32 is consumed to a such a degree that printing can no longer be performed. To be noted, in the case where the toner replenishment operation has not been completed in step S13, that is, in the case where the result of step S13 is NO, the controller 90 proceeds to step S15 without performing the processing of step S14.

In the case where a new job has not been received and the toner-related printable sheet number is not 1 or more, that is, in the case where the result of step S15 is NO, the controller 90 returns to step S11. In the case where a new job has been received or the toner-related printable sheet number is 1 or more, that is, in the case where the result of step S15 is YES, the controller 90 determines in step S16 whether or not the value of the counter A01 is 1 or more. In the case where the value of the counter A01 is 1 or more, that is, in the case where the result of step S16 is YES, the controller 90 determines in step S17 whether or not the value of the counter A02 is 1 or more.

In the case where the value of the counter A02 is 1 or more, that is, in the case where the result of step S17 is YES, the controller 90 performs printing on one sheet, subtracts 1 from the values of the counters A01 and A02, and overwrites the values S01 and S02 with the values of the counters A01 and A02 in step S18.

Figure 21:
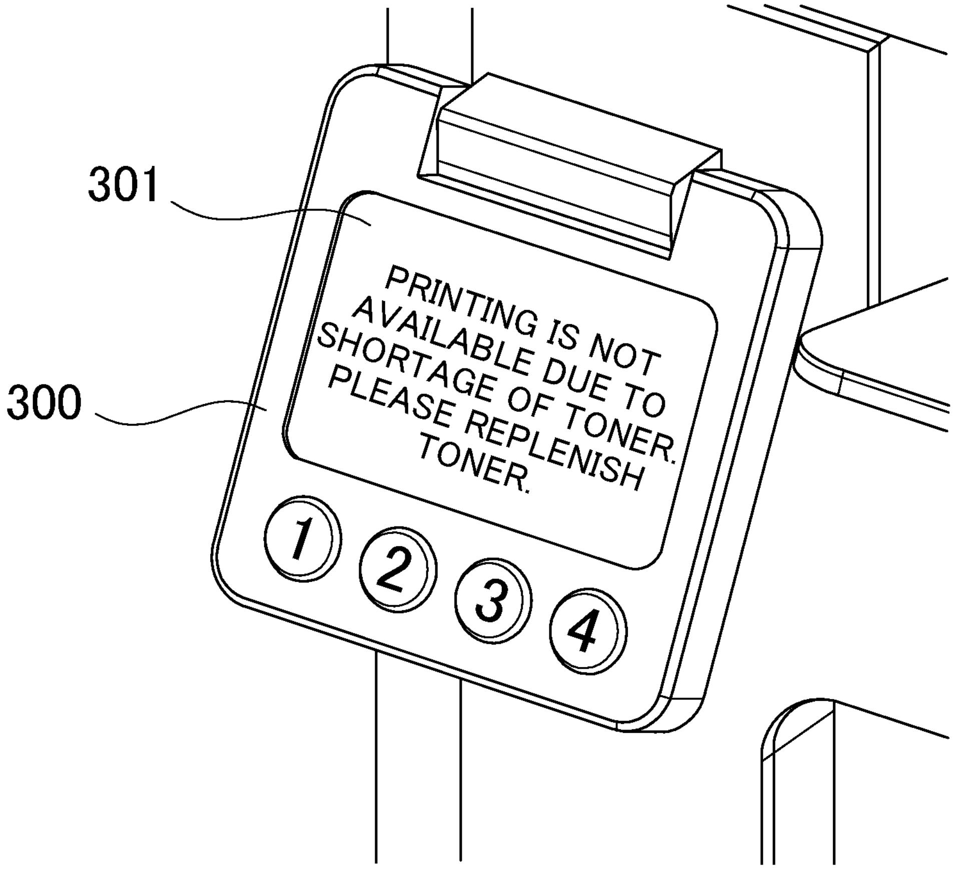
FIG. 21 is a perspective view of a display portion displaying a toner remainder amount insufficiency message.

In the case where the value of the counter A01 is not 1 or more in step S16, that is, in the case where the value of the counter A01 is 0 and the result of step S16 is NO, the controller 90 does not perform the printing operation, and displays a toner remainder amount insufficiency message on the display portion 301 in step S19. The toner remainder amount insufficiency message is a message indicating that the toner remainder amount is insufficient, and for example, "Printing is not available due to shortage of toner. Please replenish toner" is displayed as the toner remainder amount insufficiency message as illustrated in FIG. 21. For example, when the user replenishes the toner in step S13 in response to this message, the value PAC02 is added to the counter A01 in step S14, and it becomes possible to perform the printing operation again in steps S15 to S18.

In the case where the value of the counter A02 is not 1 or more in step S17, that is, in the case where the value of the counter A02 is 0 and the result of step S17 is NO, the controller 90 does not perform the printing operation and displays a cartridge expiration message on the display portion 301 in step S20. The cartridge expiration message is a message indicating that the process cartridge 20 has expired, and for example, "Printing is not available because the process cartridge has expired. Please replace the process cartridge." is displayed as the cartridge expiration message. For example, when the user replaces the process cartridge 20 in step S11 in response to this message, the value of the counter A01 is updated in step S12, and it becomes possible to perform the printing operation again in steps S15 to S18.

After step S19, the controller 90 returns to step S13, and after step S20, the controller 90 returns to step S11. As described above, the calculation control for calculating the values of the counters A01 and A02 is finished. This calculation control is regularly performed each time a predetermined time elapses. In addition, the values S01 and S02 are updated in step S12 when the counters A01 and A02 are updated. Therefore, in the case where the process cartridge 20 itself is replaced, the values in the P memory 58 of the new process cartridge 20 are read, and the counters A01 and A02 are updated. As a result of this, control reflecting the toner amount in the process cartridge 20 and the printable sheet number corresponding to the expendable parts can be performed also in the case where the process cartridge 20 is still in use or has already expired.

(6) Operation Conditions of Locking Member

Next, operation conditions of the locking member 7014 when the toner pack 40 is attached to the replenishment port 8012 will be described. The locking member 7014 is capable of restricting the rotation of the replenishment port shutter 7013 by positioning in the locking position illustrated in FIG. 11A as described above, and allows the rotation of the replenishment port shutter 7013 by positioning in the lock-releasing position illustrated in FIG. 11B. To be noted, the replenishment port shutter 7013 serving as an opening/closing portion and the locking member 7014 constitute a replenishment restriction portion 70134 as illustrated in FIG. 11A. In the description below, an operation of moving the locking member 7014 from the lock-releasing position to the locking position will be referred to as "locking", and an operation of moving the locking member 7014 from the locking position to the lock-releasing position will be referred to as "unlocking". In addition, a state where the locking member 7014 is positioned in the locking position with respect to the replenishment restriction portion 70134 will be referred to as a restricting state, and a state where the locking member 7014 is positioned in the lock-releasing position will be referred to as an allowing state.

Figure 22:
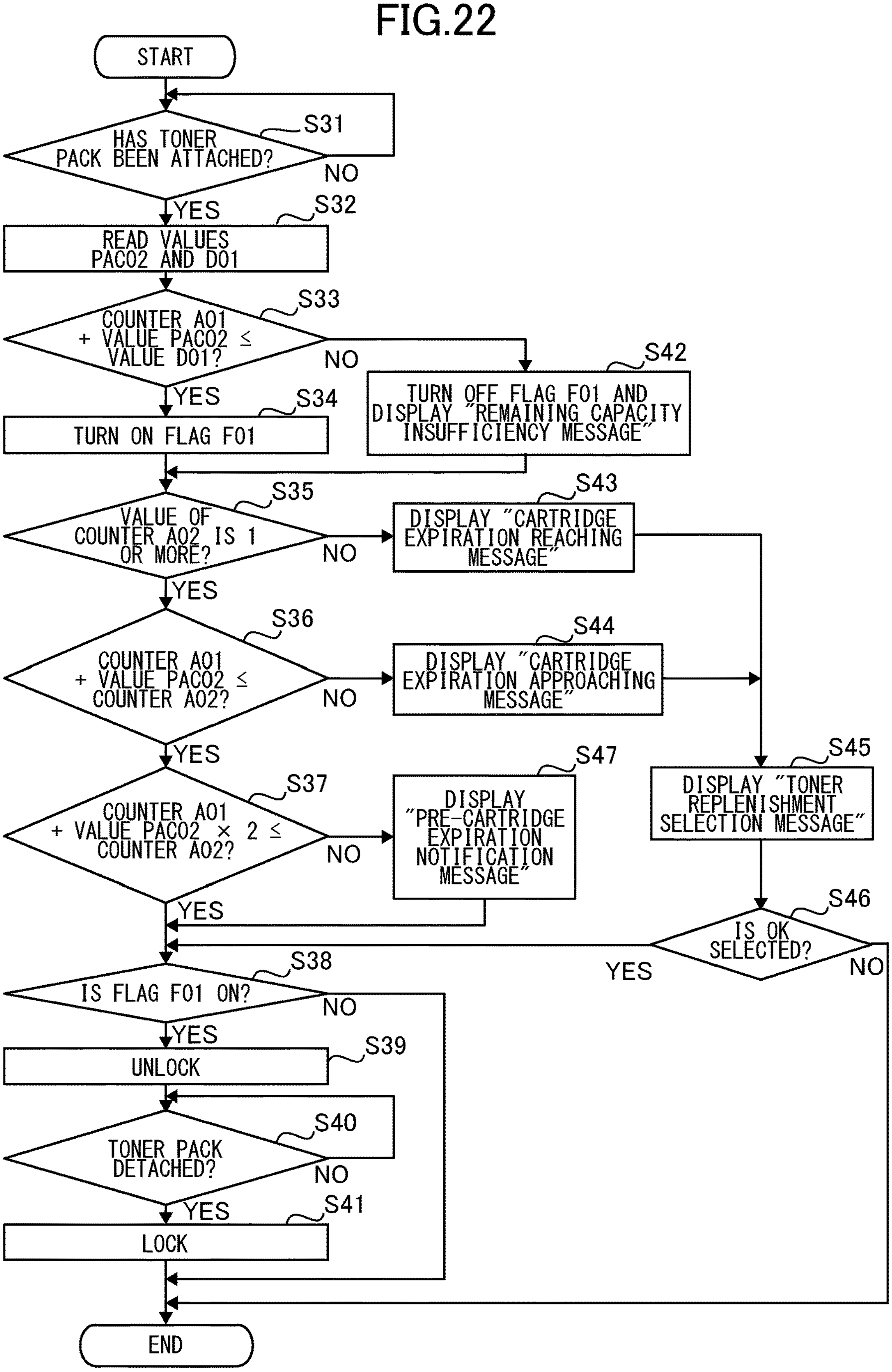
FIG. 22 is a flowchart for describing operation conditions of a locking member.

FIG. 22 is a flowchart for describing the operation conditions of the locking member 7014. In addition, the controller 90 determines in step S31 whether or not the toner pack 40 is coupled to, that is, attached to the replenishment port 8012. In the case where the toner pack 40 is coupled to the replenishment port 8012, that is, in the case where the result of step S31 is YES, the controller 90 reads the value PAC02 from the T memory 57 and the value D01 from the P memory 58 in step S32.

Next, the controller 90 compares a value obtained by adding up the value of the counter A01 and the value PAC02 with the value D01, and determines in step S33 whether or not "counter A01+value PAC02≤value D01" is satisfied. The relationship "counter A01+value PAC02≤value D01" indicates that even if all toner in the currently-attached toner pack 40 is supplied to the developer container 32, the developer container 32 can accommodate the toner without spilling the toner. In the case where "counter A01+value PAC02≤value D01" is satisfied, that is, in the case where the result of step S33 is YES, the controller 90 turns on a flag F01 in step S34, and proceeds to step S35.

In the case where "counter A01+value PAC02≤value D01" is not satisfied, that is, in the case where the result of step S33 is NO, the controller 90 turns off the flag F01 and continuously displays a remaining capacity insufficiency message on the display portion 301 in step S42, and proceeds to step S35. The remaining capacity insufficiency message is a message indicating that the remaining capacity of the developer container 32 is insufficient, and for example, "Toner replenishment is not available due to lack of remaining capacity." is displayed as the remaining capacity insufficiency message.

Next, the controller 90 determines in step S35 whether or not the value of the counter A02 is 1 or more. In the case whether the value of the counter A02 is 1 or more, that is, in the case where the result of step S35 is YES, the controller 90 compares a value obtained by adding up the value of the counter A01 and the value PAC02 with the value of the counter A02, and determines in step S36 whether or not "counter A01+value PAC02≤counter A02" is satisfied. In other words, the controller 90 determines whether or not a second printable sheet number obtained from the value obtained by adding up the value of the counter A01 and the value PAC02 is larger than the value of the counter A02 serving as a first printable sheet number.

The relationship "counter A01+value PAC02≤counter A02" indicates that the process cartridge 20 does not expire even when all toner in the currently-attached toner pack 40 is consumed. Conversely, in the case where "counter A01+value PAC02≤counter A02" is not satisfied, the process cartridge 20 expires before all toner in the currently-attached toner pack 40 is consumed, which means that the replenished toner goes to waste.

In the case where "counter A01+value PAC02≤counter A02" is satisfied, that is, in the case where the result of step S36 is YES, the controller 90 compares a value obtained by adding up the value of the counter A01 and the double of the value PAC02 with the value of the counter A02. Then, the controller 90 determines in step S37 whether or not "counter A01+value PAC02×2≤counter A02" is satisfied. In other words, the controller 90 determines whether or not "counter A01+value PAC02×2" serving as a third printable sheet number is larger than the value of the counter A02 serving as a first printable sheet number.

The relationship "counter A01+value PAC02×2≤counter A02" indicates that the process cartridge 20 does not expire even when all toner in the currently-attached toner pack 40 and all toner in the toner pack 40 to be attached next are consumed. Conversely, in the case where "counter A01+value PAC02×2≤counter A02" is not satisfied, the process cartridge 20 expires before all toner in the toner pack 40 to be attached next is consumed. That is, in the case where "counter A01+value PAC02×2≤counter A02" is not satisfied, it is more economical for the user to prepare a new process cartridge 20 for preparation for the next toner replenishment instead of preparing a new toner pack 40.

Therefore, in the case where "counter A01+value PAC02×2≤counter A02" is not satisfied, that is, in the case where the result of step S37 is NO, the controller 90 displays a pre-cartridge expiration notification message as a warning on the display portion 301 in step S47, and proceeds to step S38. The pre-cartridge expiration notification message is a message indicating that the expiration of the process cartridge 20 is near. For example, "The process cartridge will expire soon and toner replenished next time may be wasted. Please prepare a process cartridge for the next toner replenishment." is displayed as the pre-cartridge expiration notification message.

In the case where "counter A01+value PAC02×2≤counter A02" is satisfied in step S37, that is, in the case where the result of step S37 is YES, the controller 90 determines in step S38 whether or not the flag F01 is ON. In the case where the flag F01 is ON, that is, in the case where the result of step S38 is YES, the controller 90 unlocks the locking member 7014, that is, switches the replenishment restriction portion 70134 to the allowing state in step S39.

Then, the controller 90 determines in step S40 whether or not the toner pack 40 has been detached from the replenishment port 8012. In the case where the toner pack 40 has been detached from the replenishment port 8012, that is, in the case where the result of step S40 is YES, the controller 90 locks the locking member 7014 in step S41, and finishes the processing. To be noted, in the case where the flag F01 is OFF in step S38, that is, in the case where the result of step S38 is NO, the controller 90 does not unlock the locking member 7014, and maintains the locking member 7014 in the locked state, that is, a restricting state. This is performed for suppressing overflow of toner from the developer container 32 caused by replenishment of the developer container 32 with toner from the toner pack 40 as described above.

In addition, in the case where the value of the counter A02 is not 1 or more in step S35, that is, in the case where the value of the counter A02 is 0 and the result of step S35 is NO, the controller 90 displays a cartridge expiration reaching message on the display portion 301 in step S43. The cartridge expiration reaching message is a message indicating that the process cartridge 20 has expired, and for example, "The process cartridge has expired, and toner replenishment cannot be performed because replenished toner will be wasted." is displayed as the cartridge expiration reaching message.

In addition, in the case where "counter A01+value PAC02≤counter A02" is not satisfied in step S36, that is, in the case where the result of step S36 is NO, the controller 90 displays a cartridge expiration approaching message on the display portion 301 in step S44. The cartridge expiration approaching message is a message indicating that the expiration of the process cartridge 20 is near, and for example, "The process cartridge will expire soon, and toner replenishment cannot be performed because replenished toner will be wasted." is displayed as the cartridge expiration approaching message.

After the cartridge expiration reaching message or the cartridge expiration approaching message is displayed, the controller 90 displays a toner replenishment selection message on the display portion 301 in step S45. The toner replenishment selection message is a message for asking the user whether or not to perform an allowing operation of allowing toner replenishment through the replenishment port 8012. For example, "Replenished toner may be wasted. Do you replenish the toner?" is displayed as the toner replenishment selection message. To be noted, the cartridge expiration reaching message or the cartridge expiration approaching message and the toner replenishment selection message may be alternately displayed each time a predetermined time elapses, or may be simultaneously displayed.

Then, the controller 90 determines in step S46 whether or not the user has selected "OK" via the input portion 302. To be noted, although the allowing operation described above in the present embodiment is the selection of "OK" via the input portion 302, the configuration is not limited to this. For example, an "OK" button may be displayed on the display portion 301, and a touch operation on the "OK" button may be used as the allowing operation.

The controller proceeds to step S38 in the case where "OK" has been selected, that is, in the case where the result of step S46 is YES, and finishes the processing in the case where "OK" has not been selected, that is, in the case where the result of step S46 is NO.

As described above, in the present embodiment, in the case where "counter A01+value PAC02≤counter A02" is not satisfied, that is, in the case where the result of step S36 is NO, the locking member 7014 is maintained in the locked state, that is, the restricting state, and the cartridge expiration approaching message is displayed. In other words, the present embodiment is configured such that a warning prompting replacement of the process cartridge 20 can be displayed on the display portion 301 when the toner pack 40 is attached to the replenishment port 8012. As a result of this, a situation in which the process cartridge 20 expires before all the toner replenished from the toner pack 40 is consumed and the toner is wasted can be suppressed. Therefore, the toner replenishment can be performed more economically.

In addition, even in the case where "counter A01+value PAC02≤counter A02" is not satisfied, if the user desires to perform toner replenishment, that is, in the case where the result of step S46 is YES, toner replenishment can be performed at the user's discretion, and thus the usability can be improved.

In addition, in the case where "counter A01+value PAC02×2≤counter A02" is not satisfied, the pre-cartridge expiration notification message is displayed. As a result of this, the user can prepare a new process cartridge 20 for preparation for the next toner replenishment instead of preparing the toner pack 40, and therefore the toner replenishment can be performed more economically. In addition, a mode of an image forming apparatus can be provided.

To be noted, although control of the locking member 7014 and display of a message on the display portion 301 are both performed in the present embodiment, just either one of these may be performed. For example, in the case where "counter A01+value PAC02≤counter A02" is not satisfied, that is, in the case where the result of step S36 is NO, the locking member 7014 may be maintained in the locked state, that is, the restricting state without displaying the cartridge expiration message. For example, in the case where "counter A01+value PAC02≤counter A02" is not satisfied, that is, in the case where the result of step S36 is NO, the cartridge expiration message may be displayed without maintaining the locking member 7014 in the locked state, that is, the restricting state.

In addition, conditions of unlocking of the locking member 7014 may be appropriately modified by considering the usability comprehensively. For example, in the case where "counter A01+value PAC02≤value D01" is not satisfied, that is, in the case where the result of step S33 is NO, the locked state, that is, the restricting state of the locking member 7014 is maintained. Meanwhile, in the case where "counter A01+ value PAC02≤counter A02" is not satisfied, that is, in the case where the result of step S36 is NO, the cartridge expiration approaching message may be displayed on the display portion 301 without performing the control of maintaining the locking member 7014 in the locked state, that is, the restricting state.

In addition, in steps S37 and S47, a case where toner packs 40 of different specifications are available, that is, a case where there are a model of the toner pack 40 accommodating a large amount of toner and a model of the toner pack 40 accommodating a small amount of toner may be considered. Values obtained by converting the toner amounts of these two models into printable sheet numbers will be respectively referred to as values PAC02−1 and PAC02−2, and it is assumed that the model of the toner pack 40 currently attached to the replenishment port 8012 corresponds to the value PAC02−1. In this case, for example, the controller 90 determines in step S37 whether or not "counter A01+value PAC02−1+value PAC02−2≤counter A02" is satisfied. To be noted, steps S37 and S47 may be omitted.

To be noted, although the controller 90, the T memory 57, and the P memory 58 store the printable sheet number itself in the present embodiment, the configuration is not limited to this, and any configuration may be employed as long as data corresponding to the printable sheet number is stored in the controller 90, the T memory 57, and the P memory 58.

Second Embodiment

(7) Second Embodiment

Next, a second embodiment of the present invention will be described. In the second embodiment, control related to a toner consumption amount and expiration of the process cartridge 20 is performed instead of the control for calculation of the printable sheet number of the first embodiment. Therefore, illustration of the same elements as in the first embodiment will be omitted, or the same elements are denoted by the same reference numerals in the illustration and description thereof will be omitted.

In the present embodiment, the following control is performed by using the toner remainder amount detection portion 51 and the waste toner fullness detection portion 52. In addition, control related to deterioration of the photosensitive drum 21 in the process cartridge 20 is performed on the basis of the number of rotations of the photosensitive drum 21. To be noted, the same control as in the first embodiment is performed on parts other than parts related to the above.

First, variables included in the controller 90 will be described. The controller 90 includes, as variables, a toner remainder amount B01 indicating the toner amount in the developer container 32, a total waste toner amount B02 indicating the amount of waste toner in the waste toner chamber 8033, and an accumulated sheet number B03 indicating the number of sheets on which printing has been performed by using the process cartridge 20. In addition, the controller 90 includes, as variables, a total rotation number B04 indicating the total number of rotations of the photosensitive drum 21, a unit toner consumption amount E01 corresponding to a normal amount of toner consumption per printed sheet, and a unit waste toner generation amount E02 indicating a normal amount of generation of waste toner per printed sheet. Further, the controller 90 includes, as variables, a unit drum rotation number E04 corresponding to the amount of rotation of the photosensitive drum 21 per printed sheet, and a waste toner chamber capacity G01 indicating the capacity of the waste toner chamber 8033. The unit toner consumption amount E01 is calculated on the basis of results obtained by making preliminary evaluation in the conditions of intermittently printing at an image coverage of 4% similarly to the first embodiment. The unit waste toner generation amount E02 and the unit drum rotation number E04 are determined in the preliminary evaluation. To be noted, the number of rotations of the photosensitive drum 21 may be the amount of movement of the surface of the photosensitive drum 21 according to the rotation of the photosensitive drum 21.

In addition, the P memory 58 provided in the process cartridge 20 also includes variables similar to those of the controller 90, and the variables included in the P memory 58 will be referred to as a toner remainder amount C01, a total waste toner amount, an accumulated sheet number, and a total drum rotation number. The T memory 57 provided in the toner pack 40 stores a value PAC03 indicating the amount of toner accommodated in the toner pack 40.

(7-1) Detection of Toner Remainder Amount in Developer Container

Next, a method of detecting the toner remainder amount in the developer container 32 by the toner remainder amount detection portion 51 will be described. The toner remainder amount detection portion 51 includes the light emitting portion 51*a* and the light receiving portion 51*b* as illustrated in FIG. 6A, and is provided at such a position that toner starts blocking an optical path 513 thereof when toner of an amount corresponding to one toner pack 40 is added for replenishment. In addition, the agitation member 34 includes a blade portion 34*b* that cleans the light emitting portion 51*a* and the light receiving portion 51*b* each time the agitation member 34 rotates.

The optical response of the toner remainder amount detection portion 51 is 0 when the amount of toner in the developer container 32 is larger than the amount corresponding to one toner pack 40. In the case where the amount of toner in the developer container 32 is smaller than the amount corresponding to one toner pack 40, a time in which the optical path 513 is opened depending on the rotation of the agitation member 34 occurs. This time will be referred to as a detection time. Further, the toner remainder amount detection portion 51 changes one of an electric signal, a current, and a voltage as the output value thereof on the basis of the amount of toner accommodated in the developer container 32. To be noted, such an optical sensor is merely an example of a toner remainder amount detection portion, and a pressure sensor or an electrostatic capacitance sensor may be used.

In the description below, the detection time per one rotation of the agitation member 34 will be referred to as a detection time D1, and the detection time in the case where the amount of toner in the developer container 32 is smaller than the amount corresponding to one toner pack 40 will be referred to as a first toner remainder amount threshold. In addition, when the amount of toner in the developer container 32 is smaller than 10% of the amount corresponding to one toner pack 40, the optical path 513 is open for almost the entire time in which the agitation member 34 is rotating. The detection time of this case will be referred to as a second toner remainder amount threshold T12. The detection time D1 is constantly recorded while the agitation member 34 is rotating, and the detection time D1 is constantly updated in the controller 90 by setting the average value of the latest 20 rotations as the detection time D1 indicating the current toner amount.

(7-2) Detection of Waste Toner Amount in Waste Toner Chamber

Next, a method of detecting the waste toner amount in the waste toner chamber 8033 by the waste toner fullness detection portion 52 serving as a waste toner detection portion will be described. The waste toner fullness detection portion 52 includes a light emitting portion 52*a* and a light receiving portion 52*b* as illustrated in FIG. 6A, and is disposed at such a position that an optical path 522 of the waste toner fullness detection portion 52 starts being blocked when the remaining capacity of the waste toner chamber 8033 reaches 10% of the total capacity thereof. The fifth conveyance member 8032 is formed in a grating shape, and reciprocates in the left-right direction of FIG. 6A along the bottom surface of the waste toner chamber 8033. As a result of this, toner conveyed to the waste toner chamber 8033 is conveyed in an arrow M direction toward the rear portion 8033*a*. Then, when the amount of waste toner accommodated in the waste toner chamber 8033 becomes larger, the time in which the waste toner conveyed while being agitated by the fifth conveyance member 8032 blocks the optical path 522 of the waste toner fullness detection portion 52 becomes longer. The waste toner fullness detection portion 52 changes the output value thereof on the basis of the time in which the optical path 522 is opened in accordance with the reciprocation of the fifth conveyance member 8032. This time will be hereinafter referred to as a detection time. In other words, the waste toner fullness detection portion 52 changes one of an electric signal, a current, and a voltage as the output value thereof on the basis of the amount of waste toner accommodated in the waste toner chamber 8033. In addition, a sheet-shaped cleaning portion 8032*a* is provided at a distal end portion of the fifth conveyance member 8032, and cleans the light receiving portion 52*b* when the fifth conveyance member 8032 reciprocates. To be noted, such an optical sensor is merely an example of the waste toner fullness detection portion, and a pressure sensor or an electrostatic capacitance sensor may be used.

In the description below, the average detection time per one rotation of the fifth conveyance member 8032 will be referred to as a detection time D2, and the detection time in the case where the remaining capacity of the waste toner chamber 8033 is smaller than 10% of the total capacity will be referred to as a first waste toner remainder amount threshold. The detection time in the case where the waste toner chamber 8033 is full and the optical path 522 of the waste toner fullness detection portion 52 is blocked by toner almost the entire time will be referred to as a second waste toner remainder amount threshold.

(7-3) Method of Determining Deterioration of Photosensitive Drum

Next, a method of determining that the photosensitive drum 21 has deteriorated will be described. The number of rotations of the photosensitive drum 21 is calculated from the driving time of the motor M1 that drives the photosensitive drum 21, and is included in the total drum rotation number B04. A total drum rotation number at which the function of a photosensitive layer of the photosensitive drum 21 becomes insufficient due to the wear of the surface of the photosensitive drum 21 will be referred to as a threshold H04.

To be noted, the rotation time of the photosensitive drum 21 includes an image formation rotation time in which the photosensitive drum 21 is rotated while a voltage higher than those of the charging roller 22 and the transfer roller 12 is applied to the photosensitive drum 21, and a non-image formation rotation time in which a high voltage is not applied. The amount of wear of the surface of the photosensitive drum 21 in the non-image formation rotation time is about a half of that in the image formation rotation time. Therefore, the number of rotations in the non-image formation rotation time is included in the total drum rotation number B04 with a weight of 0.5 with respect to the number of rotations in the image formation rotation time.

(7-4) Control Related to Toner Consumption Amount and Expiration of Process Cartridge 20

Figure 23:
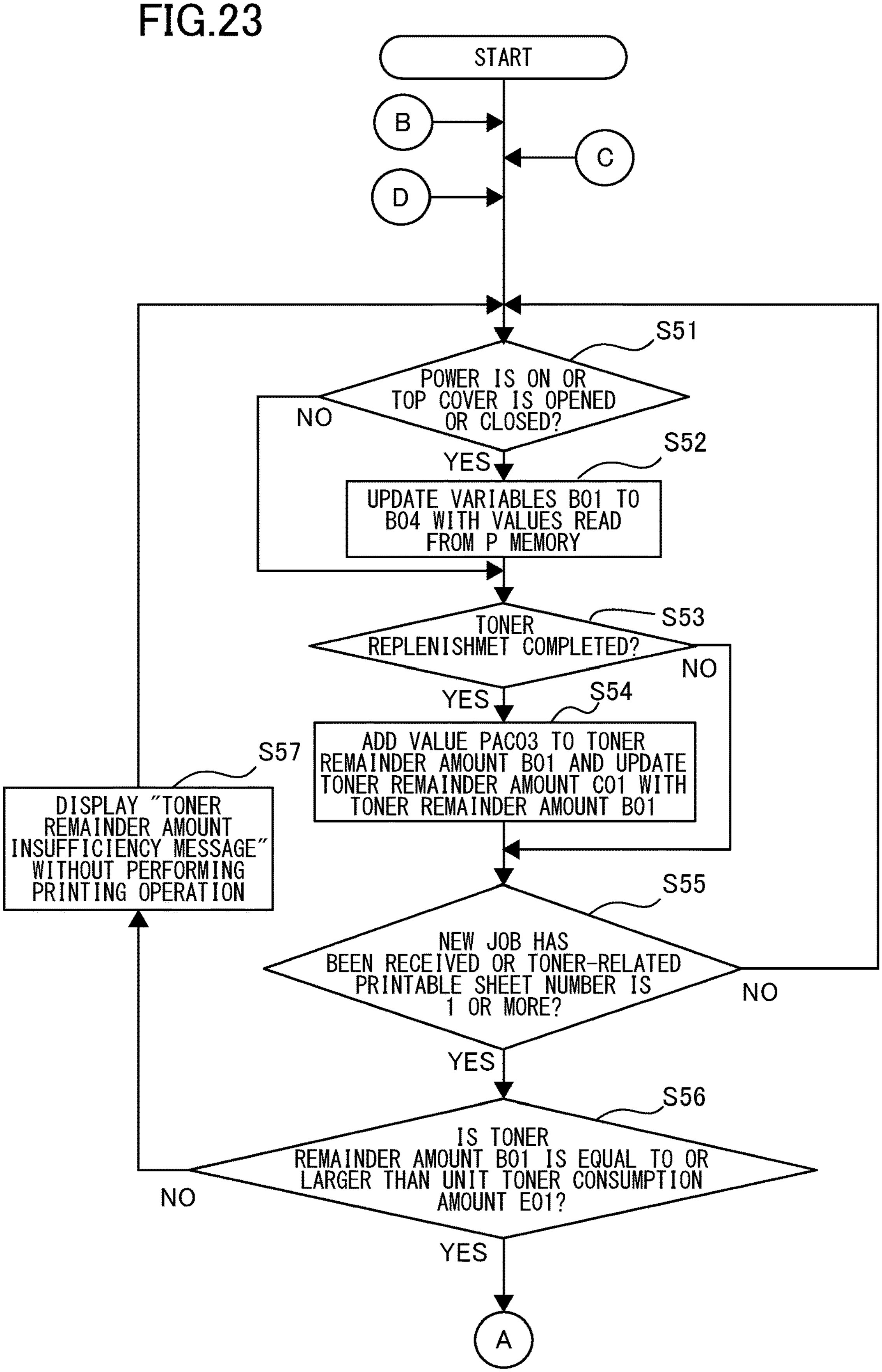
FIG. 23 is a flowchart illustrating control related to a toner consumption amount and expiration of a process cartridge.
Figure 24:
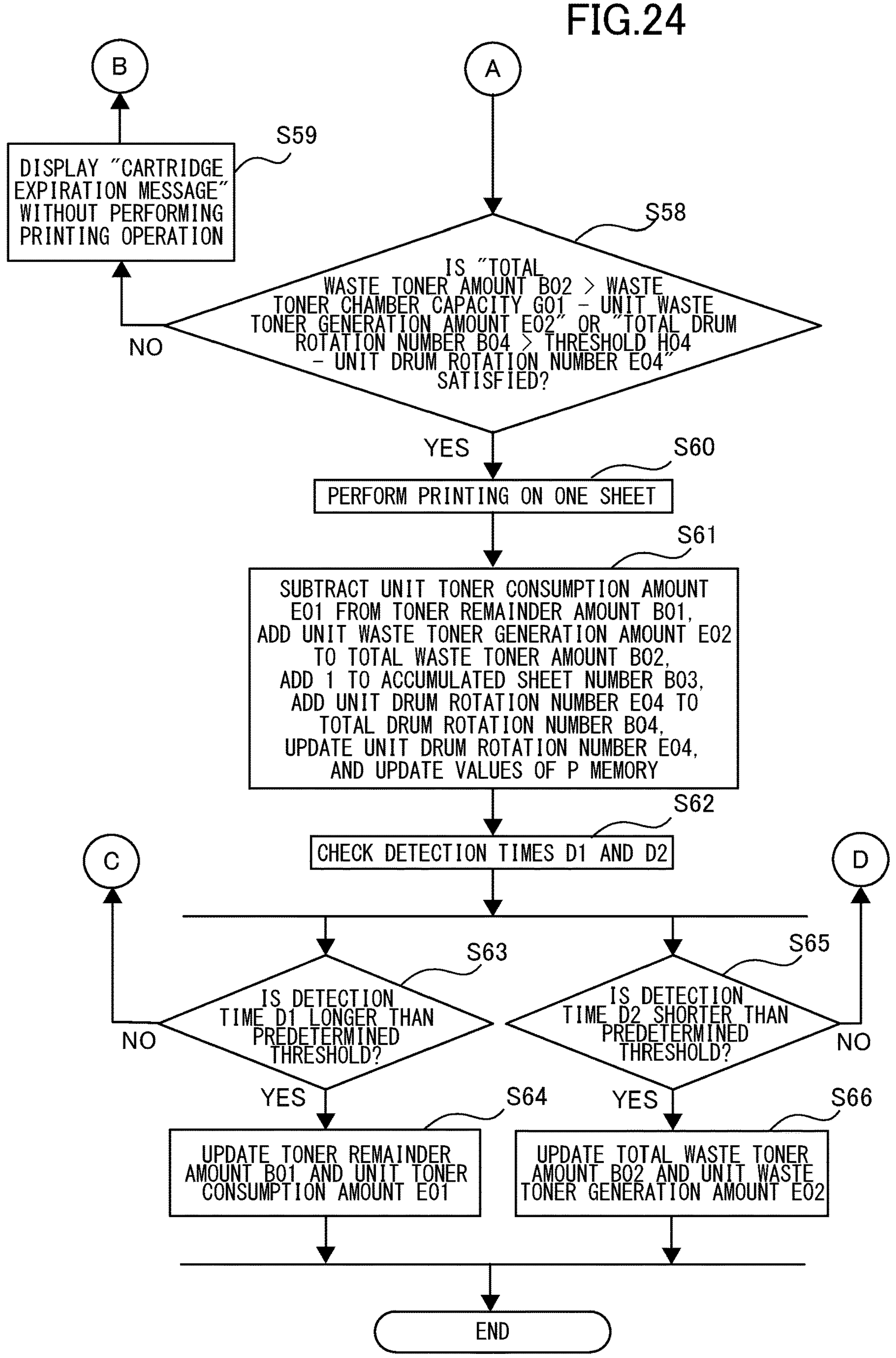
FIG. 24 is a flowchart illustrating control related to the toner consumption amount and expiration of a process cartridge.

Next, control related to the toner consumption amount and expiration of the process cartridge 20 will be described. FIGS. 23 and 24 are flowcharts illustrating the control related to the toner consumption amount and expiration of the process cartridge 20.

When the control related to the toner consumption amount and expiration of the process cartridge 20 is started, as illustrated in FIG. 23, the controller 90 determines in step S51 whether or not the power has been turned on or the top cover 82 has been opened or closed. In the case where it has been determined that the power has been turned on or the top cover 82 has been opened or closed, that is, in the case where the result of step S51 is YES, the controller 90 reads the toner remainder amount C01, the total waste toner amount C02, the accumulated sheet number C03, and the total drum rotation number C04 from the P memory 58. Then, the controller 90 updates the toner remainder amount B01, the total waste toner amount B02, the accumulated sheet number B03, and the total drum rotation number B04 of the controller 90 with these values in step S52.

Next, the controller 90 determines in step S53 whether or not the toner replenishment operation has been completed. To be noted, in the case where it has not been determined in step S51 that the power has been turned on or the top cover 82 has been opened or closed, that is, in the case where the result of step S51 is NO, the controller 90 proceeds to step S53 without performing the processing of step S52.

In the case where it has been determined that the toner replenishment operation has been completed, that is, in the case where the result of step S53 is YES, the controller 90 adds the value PAC03 read from the T memory 57 to the toner remainder amount B01, and updates the toner remainder amount C01 with the toner remainder amount B01 in step S54. Next, the controller 90 determines in step S55 whether or not a new job has been received or the toner-related printable sheet number is 1 or more. To be noted, in the case where the toner replenishment operation has not been completed in step S53, that is, in the case where the result of step S53 is NO, the controller 90 proceeds to step S55 without performing the processing of step S54.

In the case where a new job has not been received and the toner-related printable sheet number is not 1 or more, that is, in the case where the result of step S55 is NO, the controller 90 returns to step S51. In the case where a new job has been received or the toner-related printable sheet number is 1 or more, that is, in the case where the result of step S55 is YES, the controller 90 determines in step S56 whether or not the toner remainder amount B01 is equal to or larger than the unit toner consumption amount E01.

In the case where the toner remainder amount B01 is smaller than the unit toner consumption amount E01, that is, in the case where the result of step S56 is NO, the controller 90 displays a toner remainder amount insufficiency message on the display portion 301 in step S57 without performing the printing operation. The toner remainder amount insufficiency message is a message indicating that the toner remainder amount is insufficient, and for example, a message "Printing is not available due to shortage of toner. Please replenish toner." is displayed as the toner remainder amount insufficiency message. For example, in the case where the user performs toner replenishment in step S53 in response to this message, the value PAC03 is added to the toner remainder amount B01 in step S54, and it becomes possible to perform the printing operation again in steps S55, S56, and S58 to S60. After step S57, the controller 90 returns to step S51.

In the case where the toner remainder amount B01 is equal to or larger than the unit toner consumption amount E01, that is, in the case where the result of step S56 is YES, the controller 90 determines in step S58 whether or not "total waste toner amount B02>waste toner chamber capacity G01−unit waste toner generation amount E02" is satisfied. This condition will be referred to as a first condition. In addition, as illustrated in FIG. 24, the controller 90 also determines in step S58 whether or not "total drum rotation number B04>threshold H04−unit drum rotation number E04" is satisfied. This condition will be hereinafter referred to as a second condition.

In the case where the first condition or the second condition is not satisfied, that is, in the case where the result of step S58 is NO, the controller 90 displays a cartridge expiration message on the display portion 301 in step S59 without performing the printing operation. The cartridge expiration message is a message indicating that the process cartridge 20 has expired, and for example, "Printing is not available because the process cartridge has expired. Please replace the process cartridge." is displayed as the cartridge expiration message. For example, in the case where the user replaces the process cartridge 20 in step S51 in response to this message, the toner remainder amount B01 is updated in step S52, and it becomes possible to perform the printing operation again in steps S55, S56, and S58 to S60.

In the case where the first condition and the second condition are satisfied, that is, in the case where the result of step S58 is YES, the controller 90 performs printing on one sheet in step S60. Then, in step S61, the controller 90 subtracts the unit toner consumption amount E01 from the toner remainder amount B01, adds the unit waste toner generation amount E02 to the total waste toner amount B02, and adds 1 to the accumulated sheet number B03. In addition, in step S61, the controller 90 adds the unit drum rotation number E04 to the total drum rotation number B04, and updates the unit drum rotation number E04 by dividing the total drum rotation number B04 by the accumulated sheet number B03. Then, values of the P memory 58 are updated with these values of the controller 90.

Next, the controller 90 checks the detection times D1 and D2 in step S62. Then, the controller 90 performs processing of steps S63 and S65 in parallel. That is, the controller 90 determines in step S63 whether or not the detection time D1 is longer than a predetermined threshold. Although the second toner remainder amount threshold will be described as the predetermined threshold herein, the first toner remainder amount threshold T11 may be used as the predetermined threshold.

In the case where the detection time D1 is longer than the first toner remainder amount threshold serving as the predetermined threshold, that is, in the case where the result of step S63 is YES, the controller 90 updates the toner remainder amount B01 with 10% of the toner amount of one toner pack 40 in step S64. In addition, in step S64, the controller 90 updates the unit toner consumption amount E01. For example, a case where the use of the image forming apparatus is started in a state after the developer container 32 is replenished with toner of an amount corresponding to one toner pack 40 and the current accumulated sheet number B03 is 1800 is assumed. In this case, toner of an amount obtained by 0.9×value PAC03, which corresponds to 90% of the amount of toner in the toner pack 40, is used in printing on 1800 sheets, and therefore the unit toner consumption amount E01 can be obtained by 0.9×value PAC03÷1800.

In addition, the controller 90 determines in step S65 whether or not the detection time D2 is shorter than the predetermined threshold. Although the first waste toner remainder amount threshold will be described as an example of the predetermined threshold, the second waste toner remainder amount threshold may be used as the predetermined threshold.

In the case where the detection time D2 is shorter than the first waste toner remainder amount threshold serving as the predetermined threshold, that is, in the case where the result of step S65 is YES, the controller 90 overwrites the total waste toner amount B02 with an amount that is 90% of the waste toner chamber capacity G01 in step S66. In addition, in step S66, the controller 90 updates the unit waste toner generation amount E02. For example, a case where the accumulated sheet number B03 is 45000 is assumed. In this case, toner of an amount that is 90% of the waste toner chamber capacity G01 has been accumulated in printing on 45000 sheets, and therefore the unit waste toner generation amount E02 can be obtained by 0.9×waste toner chamber capacity G01÷45000.

In the case where the detection time D1 is equal to or shorter than the predetermined threshold in step S63, that is, in the case where the result of step S63 is NO, or in the case where the detection time D2 is equal to or longer than the predetermined threshold in step S65, that is, in the case where the result of step S65 is NO, the controller 90 returns to step S51. Although the control related to the toner consumption amount and expiration of the process cartridge 20 is finished as described above, this control is performed regularly each time a predetermined time elapses.

In addition, the operation condition of the locking member 7014 when the toner pack 40 is attached to the replenishment port 8012 is the same as that described with reference to FIG. 22. However, the variables used in the operation conditions of the locking member 7014 are calculated as follows.

The value PAC02 is calculated by dividing the value PAC03 by the unit toner consumption amount E01. The value D01 is calculated by dividing the amount of toner that can be accommodated in the developer container 32 by the unit toner consumption amount E01. The value of the counter A01 is calculated by dividing the toner remainder amount B01 by the unit toner consumption amount E01.

The value of the counter A02 is calculated from a smaller one of a printable sheet number obtained from the total waste toner amount B02, the waste toner chamber capacity G01, and the unit waste toner generation amount E02, and a printable sheet number obtained from the total drum rotation number B04, the threshold H04, and the unit drum rotation number E04. The former one of the printable sheet numbers is obtained by (waste toner chamber capacity G01−total waste toner amount B02)÷unit waste toner generation amount E02, and the latter one of the printable sheet numbers is obtained by (threshold H04−total drum rotation number B04)÷unit drum rotation number E04.

To be noted, the value of the counter A02 may be calculated from the number of rotations of the developing roller 31 or the charging roller 22 instead of the photosensitive drum 21. In addition, the value of the counter A02 may be calculated by subtracting the accumulated sheet number B03 from the printable sheet number of a brand-new process cartridge 20. In addition, the value of the counter A02 may be obtained in consideration of the accumulated sheet number B03 at a time point when the toner pack 40 is coupled to the replenishment port 8012, the value PAC03 indicating the amount of toner replenishment from the toner pack 40, and the number of times of toner replenishment performed on the process cartridge 20. The value of the counter A02 may be calculated by subtracting the accumulated sheet number B03 from the printable sheet number of a brand-new process cartridge 20. In addition, a function of suspending the printing operation for a predetermined time may be added for accurately determining the amount of toner in the developer container 32 when the toner pack 40 is coupled to the replenishment port 8012 or when the toner pack 40 is detached from the replenishment port 8012 after the replenishment.

As described above, according to the present embodiment, insufficiency of toner and expiration of the process cartridge 20 can be determined in accordance with the actual use state of the user. Therefore, expiration of the process cartridge 20 can be detected with high precision before all the toner replenished from the toner pack 40 is consumed, and therefore waste of toner can be reduced and toner replenishment can be performed more economically. In addition, a mode of an image forming apparatus can be provided.

Third Embodiment

(8) Third Embodiment

Next, a third embodiment of the present invention will be described. In the third embodiment, the message described in the first embodiment is displayed on a different information processing apparatus connected to the image forming apparatus 1. Therefore, illustration of the same elements as in the first embodiment will be omitted, or the same elements are denoted by the same reference numerals in the illustration and description thereof will be omitted.

Figure 25:
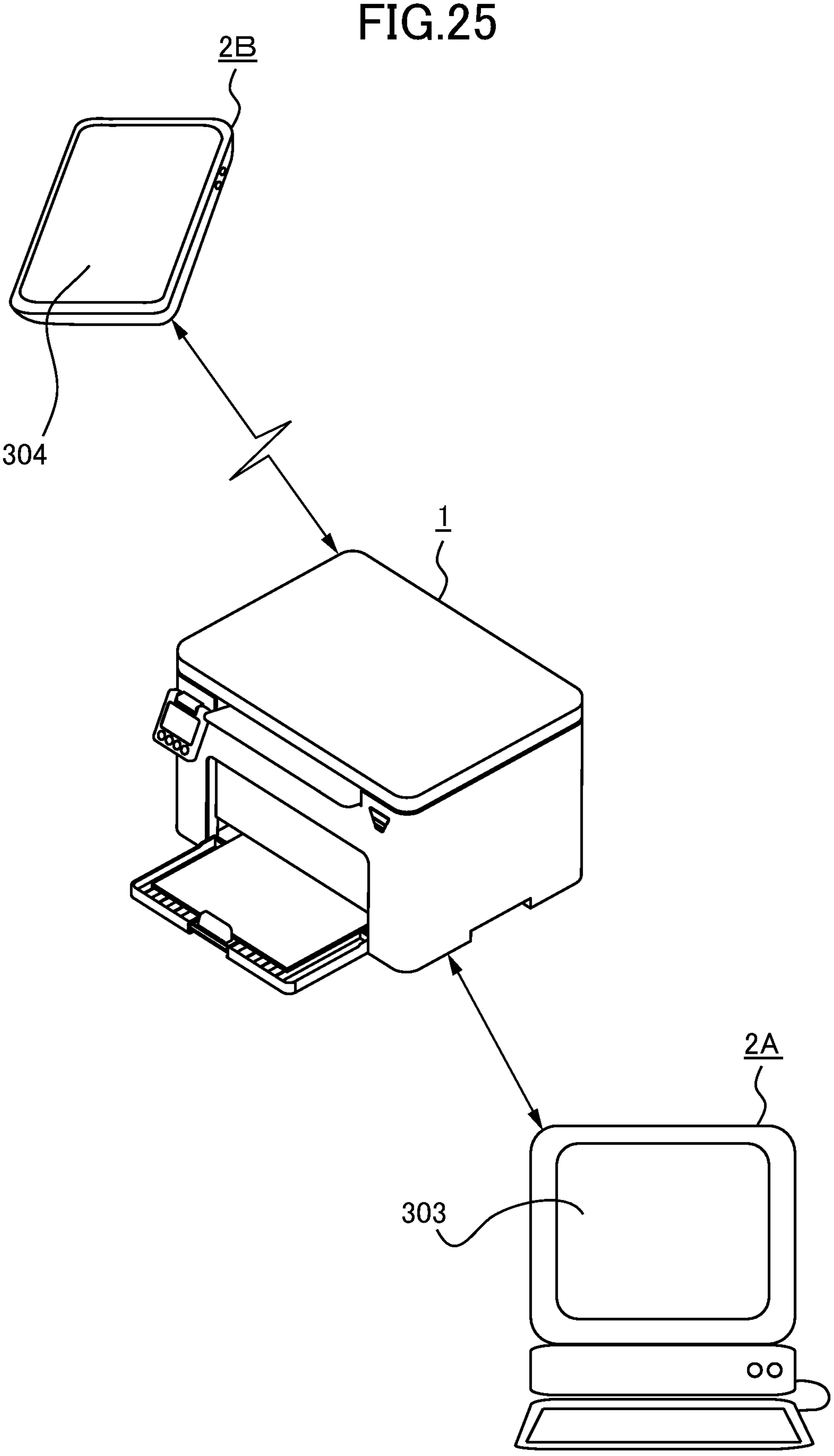
FIG. 25 is a perspective view of a personal computer and a mobile information processing terminal that are connected to an image forming apparatus.

The image forming apparatus 1 according to the present embodiment is communicably connected to a personal computer: PC 2A, a mobile information processing terminal 2B such as a smartphone, and the like as illustrated in FIG. 25. Information transmitted to the image forming apparatus 1 from the PC 2A and the mobile information processing terminal 2B is input to the controller 90 through the I/O interface 94. In addition, information transmitted from the image forming apparatus 1 to the PC 2A or the mobile information processing terminal 2B is input to the PC 2A or the mobile information processing terminal 2B from the controller 90 through the I/O interface 94. To be noted, a sound generating portion such as a loudspeaker may be provided in the PC 2A and the mobile information processing terminal 2B. As a result of this, a mode of an image forming apparatus can be provided.

In the present embodiment, each message of the control described with reference to FIGS. 20 to 24 is displayed on the display portion 301 of the PC 2A or a display portion 304 of the mobile information processing terminal 2B. To be noted, the message described above may be displayed on two or more of the display portions 301 and 304.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-184767, filed Oct. 7, 2019, which is hereby incorporated by reference herein in its entirety.

What is claimed is:

1. An image forming apparatus to and from which a replenishment container accommodating toner is attachable and detachable and which is configured to form an image on a recording material, the image forming apparatus comprising:
- an apparatus body;
- a process unit comprising:
  - an image bearing member;
  - a developer container configured to accommodate toner;
  - a developing portion configured to develop an electrostatic latent image formed on the image bearing member into a toner image by using the toner accommodated in the developer container; and
  - a replenishment port configured to allow replenishment of toner from the replenishment container, which is arranged outside of the image forming apparatus, to the developer container therethrough in a state where the replenishment container is attached to the replenishment port; and
- a controller configured to notify a user of information related to a toner amount in a case where it is determined that a lifetime of the process unit will expire before a sum of toner accommodated in the developer container and toner accommodated in the replenishment container is consumed,
- wherein the replenishment container is a toner pack which is squeezed by the user to promote discharge of toner in the toner pack.

2. The image forming apparatus according to claim 1, wherein the lifetime of the process unit is less than a threshold corresponding to a printable sheet number depending on the sum of toner.

3. The image forming apparatus according to claim 1, wherein the information related to a toner amount is about toner, to be replenished, which goes to waste.

4. An image forming apparatus which is configured to form an image on a recording material, the image forming apparatus comprising:
an apparatus body;
a process unit comprising:
an image bearing member;
a developer container configured to accommodate toner;
a developing portion configured to develop an electrostatic latent image formed on the image bearing member into a toner image by using the toner accommodated in the developer container; and
a replenishment port configured to allow replenishment of toner from a replenishment container, which accommodates toner and is arranged outside of the image forming apparatus, to the developer container therethrough in a state where the replenishment container is attached to the replenishment port;
a display portion; and
a controller configured to display a notification related to a toner amount on the display portion in a case where it is determined that a lifetime of the process unit will expire before a sum of toner accommodated in the developer container and toner accommodated in the replenishment container is consumed,
wherein the replenishment container is a toner pack which is squeezed by a user to promote discharge of toner in the toner pack.

5. The image forming apparatus according to claim 4, wherein the lifetime of the process unit is less than a threshold corresponding to a printable sheet number depending on the sum of toner.

6. The image forming apparatus according to claim 4, further comprising an input portion through which a user performs an allowing operation of allowing toner replenishment after the notification is displayed on the display portion.

7. The image forming apparatus according to claim 4, wherein the notification related to a toner amount on the display portion is a notification about toner, to be replenished, which goes to waste.

8. An image forming apparatus to and from which a replenishment container accommodating toner is attachable and detachable and which is configured to communicate with an information processing apparatus comprising a display portion and form a toner image on a recording material, the image forming apparatus comprising:
an apparatus body;
a process unit comprising:
an image bearing member;
a developer container configured to accommodate toner;
a developing portion configured to develop an electrostatic latent image formed on the image bearing member into a toner image by using the toner accommodated in the developer container; and
a replenishment port configured to allow replenishment of toner from the replenishment container, which is arranged outside of the image forming apparatus, to the developer container therethrough in a state where the replenishment container is attached to the replenishment port; and
a controller configured to display a notification related to a toner amount on the display portion in a case where it is determined that a lifetime of the process unit will expire before a sum of toner accommodated in the developer container and toner accommodated in the replenishment container is consumed,
wherein the replenishment container is a toner pack which is squeezed by a user to promote discharge of toner in the toner pack.

9. The image forming apparatus according to claim 8, wherein the lifetime of the process unit is less than a threshold corresponding to a printable sheet number depending on the sum of toner.

10. The image forming apparatus according to claim 8, further comprising an input portion through which a user performs an allowing operation of allowing toner replenishment after the notification is displayed on the display portion.

11. The image forming apparatus according to claim 8, wherein the notification related to a toner amount on the display portion is a notification about toner, to be replenished, which goes to waste.

* * * * *